US011903892B2

(12) United States Patent
Behnamian

(10) Patent No.: US 11,903,892 B2
(45) Date of Patent: Feb. 20, 2024

(54) HEEL CLAMP FOR FOOTWEAR SOLE ARRANGEMENT

(71) Applicant: Shahriar Behnamian, Washington, DC (US)

(72) Inventor: Shahriar Behnamian, Washington, DC (US)

(73) Assignee: ANTEPES, LLC

( * ) Notice: Subject to any disclaimer, the term of this patent is extended or adjusted under 35 U.S.C. 154(b) by 0 days.

(21) Appl. No.: 17/664,636

(22) Filed: May 23, 2022

(65) Prior Publication Data

US 2022/0369761 A1 Nov. 24, 2022

Related U.S. Application Data

(60) Provisional application No. 63/202,009, filed on May 22, 2021.

(51) Int. Cl.

| | |
|---|---|
| ***A43B 13/14*** | (2006.01) |
| ***A61H 15/00*** | (2006.01) |
| *A43B 13/18* | (2006.01) |
| *A43B 13/12* | (2006.01) |
| *A43B 13/36* | (2006.01) |

(52) U.S. Cl.

CPC ............ *A61H 15/00* (2013.01); *A43B 13/127* (2013.01); *A43B 13/14* (2013.01); *A43B 13/143* (2013.01); *A43B 13/145* (2013.01); *A43B 13/146* (2013.01); *A43B 13/18* (2013.01); *A43B 13/186* (2013.01); *A43B 13/36* (2013.01);

(Continued)

(58) Field of Classification Search

CPC ......... A43B 13/14; A43B 7/20; A43B 7/1495; A43B 7/144; A43B 5/0439

See application file for complete search history.

(56) References Cited

U.S. PATENT DOCUMENTS

| | | | | |
|---|---|---|---|---|
| 2,261,453 A * | 11/1941 | Reinhart | ................ | A43B 23/14 36/89 |
| 5,226,875 A * | 7/1993 | Johnson | ................... | A43B 7/20 36/114 |

(Continued)

FOREIGN PATENT DOCUMENTS

WO 2014/144527 A1 9/2014

OTHER PUBLICATIONS

United States Patent and Trademark Office (ISA), International Search Report and Written Opinion of the International Searching Authority for PCT Application No. PCT/US2022/072508, dated Oct. 10, 2022.

*Primary Examiner* — Jila M Mohandesi

(57) ABSTRACT

A heel clamp, or posterior component, for an article of footwear is provided. The heel clamp may comprise a posterior component height value measuring a height value from a lowest point under the heel of the foot on an upper facing surface to a top of the posterior component. A lateral component and a medial component of the heel clamp may include a predetermined height value or an extension height value. The lateral component may be extending into or through an area in-between a lateral malleolus bone of the foot and an Achilles tendon of the foot, the medial component may be extending into or through an area in-between a medial malleolus bone of the foot and the Achilles tendon of the foot, and the intermediate component may be extending to an area of an end of a top of a calcaneus bone of the foot.

20 Claims, 12 Drawing Sheets

(52) U.S. Cl.
CPC ................ *A61H 2015/0014* (2013.01); *A61H 2201/1284* (2013.01)

(56) References Cited

U.S. PATENT DOCUMENTS

| | | | | | |
|---|---|---|---|---|---|
| 6,012,726 | A * | 1/2000 | Grande | A43B 7/20<br>280/11.221 |
| 6,018,892 | A * | 2/2000 | Acheson | A43B 7/20<br>36/117.6 |
| 6,295,679 | B1 * | 10/2001 | Chenevert | A43B 5/1666<br>280/11.221 |
| 7,013,586 | B1 * | 3/2006 | Hatfield | A43B 7/20<br>36/89 |
| 7,219,450 | B2 * | 5/2007 | Langley | A43B 7/20<br>36/89 |
| 7,740,602 | B2 * | 6/2010 | Christensen | A61F 5/0111<br>602/23 |
| 8,245,419 | B2 * | 8/2012 | Echols | A43B 7/20<br>36/114 |
| 9,504,592 | B2 * | 11/2016 | Schwartz | A61F 5/0111 |
| 9,510,965 | B2 * | 12/2016 | Grim | A43B 7/20 |
| 11,413,180 | B2 * | 8/2022 | Bean | A61F 5/0127 |
| 2010/0269368 | A1 | 10/2010 | Nakatsuka | |
| 2014/0230165 | A1 * | 8/2014 | Stewart | A43B 5/1691<br>12/142 P |
| 2017/0095033 | A1 | 4/2017 | Farina et al. | |
| 2020/0359745 | A1 * | 11/2020 | Tresser | A43B 7/24 |
| 2021/0030107 | A1 * | 2/2021 | Pratt | A43B 11/00 |

* cited by examiner

HEEL CLAMP FOR FOOTWEAR SOLE ARRANGEMENT

CROSS REFERENCE TO RELATED APPLICATIONS

This application claims priority under 35 U.S.C. § 119(e) to U.S. Provisional Application 63/202,009, filed on May 22, 2021. The disclosure of this prior application is considered part of the disclosure of this application and is hereby incorporated by reference in its entirety.

FIELD

The present disclosure relates to footwear, generally an article of athletic footwear, and more particularly to sole arrangement for article of athletic footwear.

BACKGROUND

This section provides background information for the disclosure presented herein without being necessarily prior art. This section further illustrates the inventive entity's observations mixed with the inventive entity's novel and inventive functional steps that precedes the detailed description of the invention.

Footwear articles provide a comfort and protective layer, sole structure or sole arrangement that separates a foot from engaging a ground, where barefoot contact with the ground, which may be of a certain ground surface, may not be ideal. Footwear articles traditionally further include an upper that secures the foot to the sole arrangement as to keep a foot on top of the sole arrangement. Footwear articles, more particularly athletic footwear articles, are thicker in the sole arrangement under a heel and a surrounding area under the heel and thereby generally provide more cushioning for heel contact, and they are thinner in the sole arrangement under a ball of the foot and a surrounding area under the ball of the foot as compared to a thickness of the sole arrangement under the heel and the surrounding area under the heel and thereby provide less cushioning for forefoot contact. This traditional sole arrangement further places the heel of the foot at a raised position relative to an even surface as compared to the forefoot when the foot is placed on top of the sole arrangement and the sole arrangement is placed on the even surface.

SUMMARY

Footwear sole arrangements traditionally include a sole structure of one or more layers. At least one of the one or more layers may include at least one midsole layer that provides foot support and cushioning for gradient weight pressure that comprises a rolling pressure or direct semi-downward pressure. This pressure is generally created by a footwear wearer that is walking, running, exercising on a spot or any other activity. The midsole may therefore be compressed and decompressed at multiple or variable rates with different and variable densities depending on a footwear wearer's weight and a speed of movement. The midsole may undergo different types of pressure based on a position or an angle of the footwear wearer's strike and contact with a ground, or both, a position or an angle of the footwear's takeoff and departure from the ground, or both, movement or running form of the footwear wearer, or a combination thereof, and other factors and scenarios.

The sole arrangement, including the midsole, may be constructed from multiple components, materials, layers or a combination thereof, which may result in a sole arrangement that has various physical properties throughout the sole arrangement at different positions, such as a softer cushioning at a first position of the sole arrangement and a harder cushioning at a second position of the sole arrangement. A choice of component of certain material for different parts, objects, sub-layers, or layers at different positions of the sole arrangement depends on the purpose that the component of certain material is intended to serve, such as softness, compression rate, decompression rate and responsiveness of the component of certain material in a certain environment when it comes under gradient loads over a certain ground surface.

The present invention relates in part to sole arrangements and upper arrangements for articles of footwear that incorporate a gradient cushioning gain. A sole arrangement comprising at least one layer of cushioning, wherein the at least one layer of cushioning of the sole arrangement has a first thickness value in a posterior area of the sole arrangement and a second thickness value in an anterior area of the sole arrangement. The second thickness, which is a thickness in the anterior area of the sole arrangement, is larger than the first thickness, which is a thickness in the posterior area of the sole arrangement. The inventive sole arrangement as described herein and illustrated in the drawings eliminates or reduces an intrusive heel sole cushioning that interferes with a midfoot or forefoot strike of a foot on a surface and further improves the midfoot or forefoot strike of the foot by elevating the forefoot area and/or midfoot area through raising or increasing the forefoot sole cushioning thickness, depth or height to a thicker, larger or higher thickness, depth or height as compared to a hindfoot or heal area sole cushioning thickness, depth or height of the sole arrangement and thereby encouraging and improving a biomechanical ability of the midfoot or forefoot to come in contact with the ground or surface first.

A transition from the posterior area of the sole arrangement, where a heel of the foot would proximately sit on top of, to the anterior area of the sole arrangement, where a ball of the foot would proximately sit on top of, results in a gradient gain in sole thickness. The transition from the posterior area of the sole arrangement to the anterior area of the sole arrangement may be at a smaller rate at one point in the sole arrangement and at a larger rate at another point in the sole arrangement. The transition of the gradient gain in sole depth, height or thickness value may provide a smooth initial and continued ground engagement of the sole arrangement at and around the anterior area of the sole arrangement. Optionally, additionally or interchangeably, the transition of the gradient gain in sole thickness, depth or height value may provide a smooth initial and continued ground engagement of the sole arrangement at and around an intermediate area of the sole arrangement.

DESCRIPTION OF THE DRAWINGS

The description of the drawings herein is for illustrative purposes only and is not intended to limit the scope of the disclosure in any way. Not all possible implementations are described or shown, but only a select few embodiments are provided herein for illustrative purposes.

DETAILED DESCRIPTION

Figure 1:
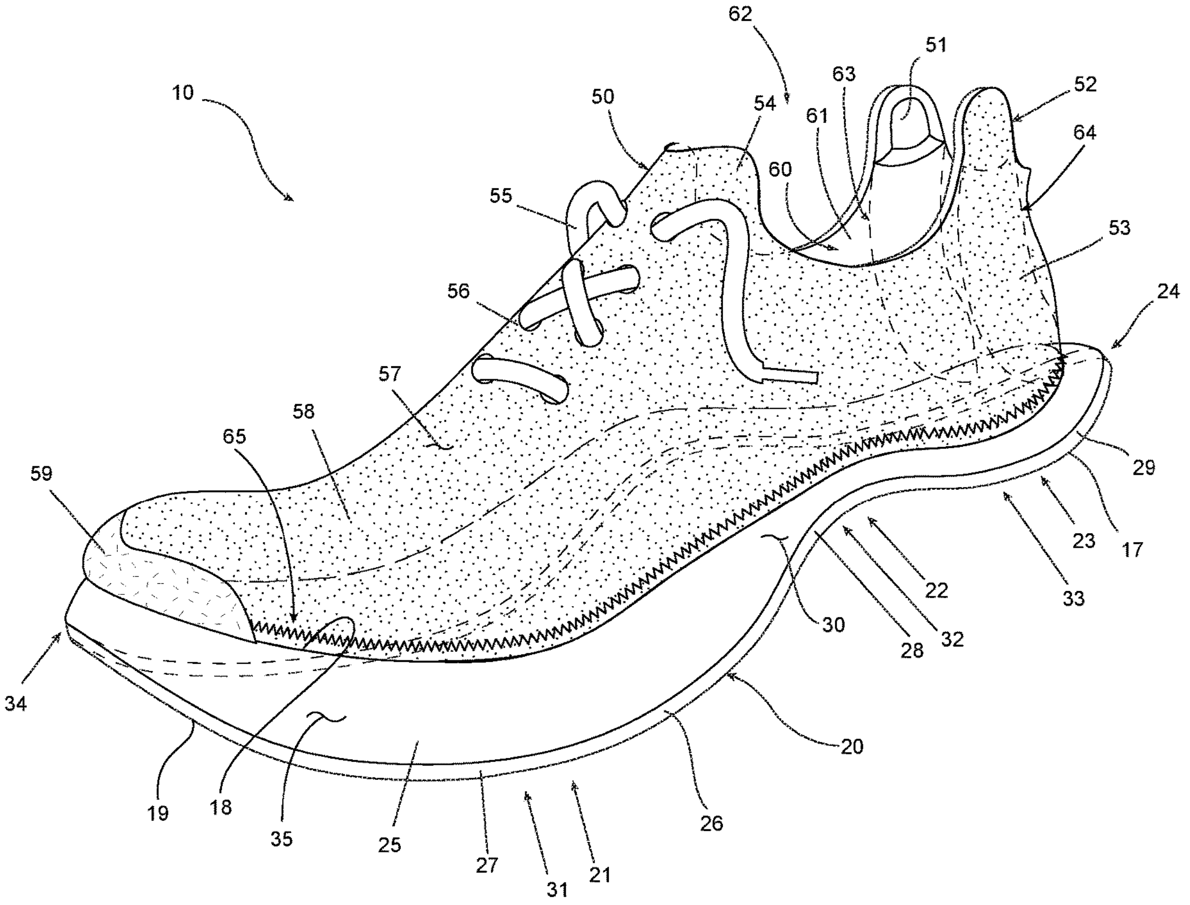
FIG. 1 is a perspective view of an article of footwear incorporating a sole arrangement in accordance with the principles and features of the present disclosure.

The exemplary embodiments that are going to be described within the detailed description are provided for the purpose of a thorough conveyance of the scope of the disclosure to ordinarily skilled individuals in the art. Various specific details regarding the various embodiments in view of specific methods, components and devices are provided for thoroughly and fully enable an ordinarily skilled person in the art with understanding of the present disclosure. The present disclosure entails specific details that do not need to be employed or applied, and that the exemplary embodiments of the present disclosure may take form in various other embodiments that are different from the disclosed embodiments, where the disclosed embodiments may merely be exemplary and are not to limit the scope of the enabling disclosure in any possible way. The ordinarily skilled person in the art will be enabled by the present disclosure to fully and thoroughly understand the exemplary embodiments and their enabled scope without the present disclosure's need to describe details regarding well-known methods, well-known processes, well-known structures and well-known technologies.

For the purpose of describing certain exemplary embodiments, the present disclosure employs select terminology which is not intended to be limiting but merely descriptive and inclusive of other terminology that may have not been used, unless specifically stated to exclude certain terminology. The singular forms "a," "an," and "the" may actually be intended to include the plural forms as well, unless explicitly stated not to do so. Inclusive terms "comprising," "comprises," "including," and "having," specify the presence of functional steps, features, elements, numbers, integers, steps, processes, operations, components or a combination thereof, but do not necessarily exclude the presence or addition of one or more other functional steps, features, elements, numbers, integers, steps, processes, operations, components or a combination thereof. The method steps, processes and operations explained and presented in the present disclosure are not to be understood to necessarily require their execution or performance in the particular order as disclosed or shown in the present disclosure or drawings, unless specifically disclosed or illustrated to be performed in a certain order to achieve an effective result. In any figure, any element disclosed or illustrated in a drawing is not meant to be necessarily drawn to scale or possess relative proportionality to other elements of the drawing and is merely presented to convey a general understanding of the various embodiments of the disclosure. An ordinarily skilled person in the art is enabled by the present disclosure to understand that additional or alternative functional steps may be used or implemented to arrive at the present disclosure's method steps, processes, and operations.

In a case where a component, element or layer is referred to as being "on," "engaged to," "connected to," "coupled to" or "disposed in" another component, element or layer, it is understood that it may be directly on, engaged to, connected to, coupled to or disposed in the other component, element or layer, or intervening one or more components, elements or layers. On the other hand, when a component, element or layer is referred to as being "directly on," "directly engaged to," "directly connected to," "directly couple to" or "directly disposed within" another component, element or layer, there may be no intervening components, elements or layers present. Similar words may be used to describe a relationship between items, components, elements and/or layers should be interpreted in a similar fashion, e.g. "between" as compared to "directly between," "adjacent" as compared to "directly adjacent," and etcetera. Whenever presented herein, the term "and/or" includes at least one or more of all possible combinations of the one or more associated presented items.

Even though the terms first, second, third, fourth and/or etc. may be used throughout the disclosure to describe various components, elements, layers, regions, areas, sections and/or subsections, these components, elements, layers, regions, areas, sections and/or subsections are not to be limited by these terms, unless specifically disclosed otherwise. These aforementioned terms may merely be utilized to differentiate and distinguish one component, element, layer, region, area, section or subsection from another component, element, layer, region, area, section or subsection. Numerical terms "first," "second," "third," etc. and other indications of numbering terms "a)," "b)," "c)" and etc. when used herein are not indicative of a sequence or order, unless specifically indicated and described by the context. Dependent of the context to which it relates, a first component, element, layer, region, area, section or subsection as will be presented within the present disclosure could be termed a second component, element, layer, region, area, section or subsection without departing from the present disclosure's enablement. These numerical terms "first," "second," "third" and etc. are relative to the embodiment or paragraph in which they are presented and may not necessarily carry the same assignment of numerical terms in another embodiment or paragraph without departing from the disclosure of the exemplary embodiments.

Terms that may be relative in space, such as "inner," "outer," "beneath," "above," "under," "lower," "upper," "within," "inside," "between," "adjacent," "close to," "near," "proximate," "around" and other spatially relative terms are used within the present disclosure for ease of description and conveyance of the disclosure to describe a relationship between one or more elements or features with another set of one or more elements or features of the exemplary embodiments, which may also refer to the presented illustrations of the figures. Spatially relative terms may be intended to further encompass different orientations of a device being utilized or an operation in addition to the orientation of the device being utilized or the operation as shown in the figures. As an example, if the device being utilized is turned upside down, then the elements described "below," "beneath," "under" or etc. other elements or features then those elements or features would then be located "above," "on top," "over" or etc. the other elements or features of the device being utilized. Within reasonable interpretation, the example term "under" may also be depicted as "under" or "over" depending on a point of view, and thus may encompass one or more orientations. Other orientations would accordingly prompt for other spatially relative terms accordingly and descriptive of the orientation of the elements and features of the device being utilized. Furthermore, features or functional steps being described with spatially relative terms such as "under," "over" or etc., a particular "device," "area," or etc., merely describes those features or functional steps to be disposed at least partially under, over, or etc., the particular device, area or etc., unless explicitly disclosed otherwise.

A ground surface or ground may refer to any external surface, being disjoint from a sole arrangement, that is generally flat and may be leveled at a certain angle. The generally flat ground surface is being used for generally illustrating sole arrangement depth values at one position as compared to another position, and sole arrangement distances from the generally flat ground surface at a first position as compared to a second position within the sole arrangement. The generally flat ground surface may describe and help determine many aspects of the sole arrangement to a person with ordinary skill in the art, such as heel stack height, toe spring, sole arrangement gait, sole arrangement striking gait, toe roll off, curvature of a forefoot roll off in the sole arrangement, foot arch height of a ground engaging surface of the sole arrangement and etc.

A depth value of the sole arrangement at any particular position may be measured relative to one or more certain surfaces. The depth value may be measured relative to an upper facing surface or a ground engaging surface of the sole arrangement, wherein the ground engaging surface being formed on an opposite side of the sole arrangement than the upper facing surface. The depth value may be measuring a distance value or depth value between the upper facing surface and the ground engaging surface at an angle relative to the upper facing surface or the ground engaging surface. The angle relative to the upper facing or ground engaging surface may be perpendicular to or at 90 degrees from the upper facing or ground engaging surface, wherein a first hypothetical line that is perpendicular to either the upper facing surface, the ground engaging surface, or both, may be drawn at a certain position within the sole arrangement for measuring a depth value at the certain position within the sole arrangement, wherein the distance value of the first hypothetical line extending from the ground engaging surface to the upper facing surface, or vice versa, may be used as the depth value. In another way of measuring the depth value, a second hypothetical line running parallel to the upper facing surface in the posterior area of the sole arrangement and directly under a heel of a foot may be used. Then a third hypothetical line running perpendicular to the second hypothetical line and through the certain position within the sole arrangement may be used for measuring a depth value at the certain position within the sole arrangement between the upper facing surface and the ground engaging surface, wherein the distance value of the third hypothetical line extending from the upper facing surface to the ground engaging surface, or vice versa, may be used as the depth value.

Generally, for calculations or measurements of any value relating to an article of footwear throughout this disclosure, the article of footwear may be placed in a manner where an area directly under a heel of a foot, which may be at a lowest point of the heel of the foot, is substantially parallel to a substantially flat surface, from a direction of an end of a posterior area of the posterior area of a sole arrangement, or a heel area of the foot, to an end of an anterior end of the sole arrangement, or a forefoot area of the foot. As another result, relative to the substantially flat surface, a set of axes such as a longitudinal axis, a lateral axis and a vertical axis are to be defined. Additionally to the article of footwear being placed in a parallel manner along the longitudinal axis, the article of footwear may be placed on the substantially flat surface in a manner where the area directly under the heel of the foot, which may be at the lowest point of the heel of the foot, is also substantially parallel to the substantially flat surface from a direction of an end of a lateral side of the sole arrangement, or a smallest metatarsal bone of the foot, to an end of a medial side of the sole arrangement, or a largest metatarsal bone of the foot, and along the lateral axis. FIGS. 3-16 may contain at least partially an article of footwear being positioned consistent with the foregoing methodology and process of performing measurements and calculations.

A maximum depth value of the sole arrangement, posterior area of the sole arrangement, anterior area of the sole arrangement or intermediate area of the sole arrangement may be calculated according to one of the above described methods with the additional requirement where the maximum depth value measuring a thickest position or a position with a largest depth value within the sole arrangement or a prescribed area of the sole arrangement, wherein the thickest position or the position with the largest depth value being measured at a lowest position of the upper facing surface along a cross-sectional or lateral axis and at any position of the upper facing surface or the ground engaging surface along a longitudinal axis directly under the foot within the sole arrangement or the prescribed area of the sole arrangement. A thickness at a point, a thickness at a position, a thickness value at or of a point, a thickness value at or of a position, depth or depth value, height or height value, stack height, stack height value, depth value at a certain position or similar wording thereof may essentially refer to a similar or same meaning regarding a measuring process. Similarly, the same reasoning applies to adjectives, comparatives and superlatives of the forementioned phrases and words, or similar thereof, apply throughout the specification.

With reference to the figures, a sole arrangement for an article of footwear with gradient depth value is provided. In one aspect of the disclosure, the sole arrangement extending from an end of a posterior area of the sole arrangement to an end of an anterior area of the sole arrangement, wherein the posterior area of the sole arrangement being disposed or formed proximate to and at least partially under a heel area of a foot and the anterior area of the sole arrangement being formed, being disposed or formed proximate to and at least partially under a forefoot area of the foot. The sole arrangement having an upper facing surface and a ground engaging surface, wherein the upper facing surface being on an opposite side of the sole arrangement than the ground engaging surface. The sole arrangement having a maximum posterior depth value, wherein the maximum posterior depth value measuring a thickest or largest depth value between a ground engaging surface of the sole arrangement and an upper facing surface of the sole arrangement within the posterior area of the sole arrangement. The sole arrangement having a maximum anterior depth value, wherein the maximum anterior depth value measuring a thickest or largest depth value within the anterior area of the sole arrangement. The maximum posterior depth value may be smaller than the maximum anterior depth value by a first margin.

In another aspect of the disclosure, a sole arrangement for an article of footwear is disclosed. The sole arrangement extending from an end of a posterior area of the sole arrangement to an end of an anterior area of the sole arrangement, wherein the posterior area of the sole arrangement being formed proximate to and at least partially under a heel area of a foot and the anterior area of the sole arrangement being formed proximate to and at least partially under a forefoot area of the foot. The posterior area of the sole arrangement extending from the end of the posterior area of the sole arrangement to an intermediate area of the sole arrangement, wherein the intermediate area of the sole arrangement being formed proximate to and at least partially under an arch area of the foot. The intermediate area of the sole arrangement connecting the posterior area of the sole arrangement with the anterior area of the sole arrangement. The sole arrangement having an upper facing surface and a ground engaging surface, wherein the upper facing surface being formed on an opposite side of the sole arrangement than the ground engaging surface. The sole arrangement having a maximum posterior depth value, wherein the maximum posterior depth value measuring a largest depth value or thickest point or position of the posterior area of the sole arrangement directly below the heel area of the foot. The sole arrangement having a maximum anterior depth value, wherein the maximum anterior depth value measuring a point or position with a largest thickness or depth value in the anterior area of the sole arrangement under the forefoot area of the foot. The sole arrangement having a maximum intermediate depth value, wherein the maximum intermediate depth value measuring a thickest point of the intermediate area of the sole arrangement under the arch area of the foot. The maximum anterior depth value may be at least partially disposed in the intermediate area of the sole arrangement and within an intersecting area of the anterior area of the sole arrangement and intermediate area of the sole arrangement. The maximum posterior depth value being smaller than the maximum anterior depth value by a first margin. The maximum posterior depth value being substantially a same, smaller or larger than the maximum intermediate depth value by a second margin. The maximum intermediate depth value being smaller than the maximum anterior depth value by a third margin or being equal to the maximum anterior depth value, wherein, in an exemplary embodiment, the third margin is equal to (=) the maximum anterior depth value being subtracted with (−) the maximum intermediate depth value. The maximum intermediate depth value being larger than the maximum posterior depth value by a fourth margin or being equal to the maximum posterior depth value, wherein, in an exemplary embodiment, the fourth margin being equal to the maximum posterior depth value being subtracted from the maximum intermediate depth value.

In some implementations, the posterior area of the sole arrangement being capable of being compressed, absorb or receive a force or weight through contact with a ground or surface through a posterior segment of the ground engaging surface, wherein the posterior segment of the ground engaging surface being disposed at least below and/or at least partially around the posterior area of the sole arrangement. The posterior segment of the ground engaging surface being disposed above no other element, object, segment or part of the sole arrangement or an object extending from the upper and being able of coming in contact with the ground or surface.

In some of the implementations, the anterior area of the sole arrangement extending from the end of the anterior area of the sole arrangement to the intermediate area of the sole arrangement. The posterior area of the sole arrangement transitioning to the intermediate area of the sole arrangement in a substantially convex shaped form in view of the ground engaging surface in relation to the upper facing surface. The intermediate area of the sole arrangement transitioning to the anterior area of the sole arrangement in a substantially concave shaped form in view of the ground engaging surface in relation to the upper facing surface. The posterior area of the sole arrangement transitioning to the intermediate area of the sole arrangement in a substantially concave shaped form in view of the upper facing surface in relation to, or a perspective from, the ground engaging surface. The intermediate area of the sole arrangement transitioning to the anterior area of the sole arrangement in a substantially convex shaped form in view of the upper facing surface in relation to, or a perspective from, the ground engaging surface. The intermediate area of the sole arrangement connecting the posterior area of the sole arrangement and the anterior area of the sole arrangement in a substantially diagonal form or along a substantially straight line of transition.

Implementations of the disclosure may include one or more of the following features. The intermediate area of the sole arrangement comprising an intermediate depth transition rate, wherein the intermediate depth transition rate representing a starting depth of the intermediate area of the sole arrangement in relation to an ending depth of the intermediate area of the sole arrangement. The starting depth of the intermediate area of the sole arrangement being disposed in an area of the intermediate area of the sole arrangement connecting to the posterior area of the sole arrangement, and the ending depth of the intermediate area of the sole arrangement being disposed in an area of the intermediate area of the sole arrangement connecting to the anterior area of the sole arrangement, wherein the intermediate depth transition rate is calculated by having the beginning depth of the intermediate area of the sole arrangement divided by the ending depth of the intermediate area of the sole arrangement (the third depth value=the beginning depth of the intermediate area of the sole arrangement/the ending depth of the intermediate area of the sole arrangement). The intermediate depth transition rate may be a value between substantially close to 0 (such as in an exemplary embodiment having a value of 0.01) and a value of 1 (the intermediate depth transition rate=(equal to) or <(less than) 1).

The intermediate depth transition rate may in some implementations be between 0.98 and 0.04. In an exemplary embodiment, the intermediate depth transition rate of 0.98 representing an exemplary beginning depth of the intermediate area of the sole arrangement having a value of 49 mm (millimeters) and an exemplary ending depth of the intermediate area of the sole arrangement having a value of 50 mm. In another exemplary embodiment, the intermediate depth transition rate of 0.04 representing an exemplary beginning depth of the intermediate area of the sole arrangement having a value of 2 mm and an exemplary ending depth of the intermediate area of the sole arrangement having a value of 50 mm.

In some further or other implementations, the intermediate depth transition rate may relate to a intermediate forefoot gain value, wherein the intermediate forefoot gain value comprising an increase in value from the beginning depth of the intermediate area of the sole arrangement to the ending depth of the intermediate area of the sole arrangement, wherein the beginning depth of the intermediate area of the sole arrangement is equal to or smaller than the ending depth of the intermediate area of the sole arrangement.

The intermediate forefoot gain value may in some implementations be between 0 mm and 10 mm. In an exemplary embodiment, the intermediate forefoot gain value may be 6 mm, representing an exemplary beginning depth of the intermediate area of the sole arrangement having a value of about or exactly 5 mm (millimeters) and an exemplary ending depth of the intermediate area of the sole arrangement having a value of about or exactly 21 mm. In another exemplary embodiment, the intermediate forefoot gain value may be about or exactly 2 mm, representing an exemplary beginning depth of the intermediate area of the sole arrangement having a value of about or exactly 5 mm and an exemplary ending depth of the intermediate area of the sole arrangement having a value of about or exactly 7 mm.

In one or more other implementations, the sole arrangement has a main depth transition rate, wherein the main depth transition rate representing a rate of the maximum posterior depth value in relation to the maximum anterior depth value, wherein the main depth transition rate being calculated by having the maximum posterior depth value divided by the maximum anterior depth value (the main depth transition rate=the maximum posterior depth value/the maximum anterior depth value). The main depth transition rate may be a value between substantially close to 0 (such in an exemplary embodiment having a value of 0.01) and a value of 1 (the main depth transition rate=(equal to) or <(less than) 1).

In some further or other implementations, the main depth transition rate may relate to a main forefoot gain value, wherein the main forefoot gain value representing an increase in value from the maximum posterior depth value to the anterior posterior depth value, wherein the maximum posterior depth value is equal to or smaller than the maximum anterior posterior depth value. The main forefoot gain value further representing a difference in depth value between the maximum posterior depth value and the maximum anterior depth value. In an exemplary embodiment, the main forefoot gain value may be calculated by subtracting the maximum posterior depth value from the maximum anterior depth value (the main forefoot gain value=the maximum anterior depth value−the maximum posterior depth value).

The sole arrangement may incorporate the intermediate depth transition rate and the main depth transition rate. The intermediate depth transition rate representing a depth transition rate between the posterior area of the sole arrangement and the anterior area of the sole arrangement, wherein the intermediate depth transition rate is descriptive of a shape, slope, structure or form of the intermediate area of the sole arrangement. The sole arrangement comprises the intermediate area of the sole arrangement disposed between the posterior area of the sole arrangement and the anterior area of the sole arrangement.

In some implementations, the main depth transition rate may be smaller than or equal to the intermediate depth transition rate. The main forefoot gain value may be larger than or equal to the intermediate forefoot gain value. The main forefoot gain value may be larger than the intermediate forefoot gain value by a first gain difference rate, wherein the first gain difference rate is calculated by taking the intermediate forefoot gain value and dividing it by the main forefoot gain value (i.e., the first gain difference rate=the intermediate forefoot gain value/the main forefoot gain value). The first gain difference rate may be a value between substantially close to 0 (such as in an exemplary embodiment having a value of 0.01) and a value of 1 (the first gain difference rate=(equal to) or <(less than) 1).

In some further implementations, the first gain difference rate may describe a sole strike angle, form, position or area. The first gain difference rate may further describe a sole arrangement strike or takeoff angle, curvature, pitch, rotation, form, position or area, or a combination thereof. The sole arrangement comprising an interior posterior area of the sole arrangement disposed within a posterior area of the upper facing surface and below a heel. In an exemplary embodiment, when comparing a first sole arrangement comprising the first gain difference rate having a value of 0.8 with a second sole arrangement comprising the first gain difference rate having a value of 0.5, then the first sole arrangement comprises a smaller sole arrangement strike angle facing a vacuum as compared to the second sole arrangement, wherein an interior posterior area of the first sole arrangement and an interior posterior area of the second sole arrangement are positioned relative to an even surface and being perpendicular to the even surface while having an angle of 0 degree (i.e., angle of 0 degree comprising of a rotational angle of 0 degrees and being parallel to a flat surface).

In some particular implementations, the sole arrangement comprises a second forefoot gain value, wherein the second forefoot gain value is a difference between the maximum anterior depth value and the maximum intermediate depth value. The sole arrangement further comprising a first forefoot gain value, wherein the first forefoot gain value is a difference between the maximum posterior depth value and the maximum intermediate depth value. An addition of the first forefoot gain value with the second forefoot gain value is equal to the main forefoot gain value.

In some other implementations, the sole arrangement comprises a second depth transition rate, wherein the second depth transition rate represents a percentage value or ratio of the maximum posterior depth value over the maximum intermediate depth value. The second depth transition rate is calculated by dividing the maximum posterior depth value with the maximum intermediate depth value (second depth transition rate=maximum posterior depth value/maximum intermediate depth value). The sole arrangement further comprising a first depth transition rate, wherein the first depth transition rate represents a percentage value or ratio of the maximum intermediate depth value over the maximum anterior depth value. The first depth transition rate is calculated by dividing the maximum intermediate depth value with the maximum anterior depth value (first depth transition rate=maximum intermediate depth value/maximum anterior depth value).

In some implementations, the second forefoot gain value is within a predetermined range of the first forefoot gain value. In an exemplary embodiment, the second forefoot gain value may be larger or smaller than the first forefoot gain value by a ratio between 0% to 25% of the second forefoot gain value. In another exemplary embodiment, if the second forefoot gain value has a value of 2.5 mm then the first forefoot gain value has a value between 1.875 mm (i.e., 25% smaller than the second forefoot gain value) and 3.125 mm (i.e., 25% larger than the second forefoot gain value). Therefore, the main forefoot gain value, for this exemplary embodiment, is between 4.375 mm and 5.625 mm. In yet another exemplary embodiment, the second forefoot gain value is larger or smaller than the first forefoot gain value by a ratio between 25% to 60% of the second forefoot gain value.

In other embodiments, the sole arrangement comprising a second forefoot gain ratio, wherein the second forefoot gain ratio depicting a ratio between the second forefoot gain value over the main forefoot gain value. The second forefoot gain ratio being calculated by dividing the second forefoot gain value by the main forefoot gain value (second forefoot gain ratio=second forefoot gain value/main forefoot gain value). Furthermore, the sole arrangement comprising a first forefoot gain ratio, wherein the first forefoot gain ratio depicting a ratio between the first forefoot gain value over the main forefoot gain value. The second forefoot gain ratio being calculated by dividing the first forefoot gain value by the main forefoot gain value (first forefoot gain ratio=first forefoot gain value/main forefoot gain value).

In some implementations, the second forefoot gain ratio is within a predetermined range of the first forefoot gain ratio. In an exemplary embodiment, the second forefoot gain ratio may be larger or smaller than the first forefoot gain ratio by a ratio between 0 to 30 percentage points or 0% to 30% in view of a depth gain difference over the main forefoot gain value, wherein the depth gain difference is an absolute difference between the second forefoot gain value and the first forefoot gain value. In another exemplary embodiment, if the second forefoot gain ratio has a ratio of 65 percentage points or 65%, then the first forefoot gain ratio has a ratio of 35 percentage points or 35%, or vice versa. In yet another exemplary embodiment, the second forefoot gain ratio is larger or smaller than the first forefoot gain ratio by a ratio between 30 to 60 percentage points or 30% to 60% in view of the depth gain difference over the main forefoot gain value.

In some implementations, the sole arrangement includes at least one plate. In some of the implementations, the at least one plate may be at least partially coupled to or proximate to the upper facing surface of the sole arrangement, at least partially coupled to or proximate to the ground engaging surface of the sole arrangement, at least partially disposed within the sole arrangement, or a combination thereof. The plate may also be coupled to or proximate to the upper facing surface of the sole arrangement entirely, the plate may be coupled to or proximate to the ground engaging surface of the sole arrangement entirely, the plate may be disposed within the sole arrangement entirely, or a combination thereof. The plate may be disposed within the sole arrangement in the anterior area of the sole arrangement, in the posterior area of the sole arrangement, in the intermediate area of the sole arrangement, or a combination thereof.

In other implementations, the at least one plate may be coupled proximate or adjacent to the upper facing surface in the posterior area of the sole arrangement and the plate may be coupled proximate or adjacent to the ground engaging surface in the anterior area of the sole arrangement, or vice versa. The plate may also be coupled to or proximate to the upper facing surface in the anterior area of the sole arrangement and coupled to or proximate to the ground engaging surface in the posterior area of the sole arrangement, or vice versa. The plate extending from the posterior area of the sole arrangement to the anterior area of the sole arrangement.

In yet other implementations, the at least one plate my extend from a second segment of the posterior area through the intermediate area and into the anterior area. The second segment of the posterior area extending from an area directly below an interior end of a posterior area of an upper that is at least partially encapsulating a heel. The interior end of the posterior area of the upper at least partially encapsulates the heel and keeps the heel from moving substantially beyond the interior end of the posterior area of the upper and substantially farther away from the intermediate area or the anterior area. The upper connects to the sole arrangement via one or more intermediate layers, segments, materials, objects, a combination thereof, or directly.

In some implementations, the at least one plate extends at least partially through the intermediate area and has a first length, wherein the first length is between 15% and 60% of a length of an interior surface of the upper. The interior surface of the upper being disposed above or on the upper facing surface of the sole arrangement and extending from the interior end of the posterior area of the upper to an interior end of the anterior area of the upper. The interior end of the anterior area of the upper is disposed in an area above or on the upper facing surface in the anterior area of the sole arrangement. The interior end of the posterior area of the upper is disposed in an area above or on the upper facing surface in the posterior area of the sole arrangement and inside one or more walls of the upper.

In another aspect of the disclosure, a sole arrangement for an article of footwear having an upper is disclosed. The sole arrangement extending from an end of a posterior area of the sole arrangement to an end of an anterior area of the sole arrangement, wherein the posterior area of the sole arrangement being disposed proximate to and at least partially under a heel area of a foot and the anterior area of the sole arrangement being disposed proximate to and at least partially under a forefoot area of the foot. The posterior area of the sole arrangement extending from a heel area of the upper to an intermediate area of the sole arrangement, wherein the intermediate area of the sole arrangement being disposed proximate to or at least partially under an arch area of the foot. The intermediate area of the sole arrangement being joined to and connecting the posterior area of the sole arrangement and the anterior area of the sole arrangement. The anterior area of the sole arrangement extending from a forefoot area of the upper to the intermediate area of the sole arrangement. The intermediate area of the sole arrangement extending from the posterior area of the sole arrangement to the anterior area of the sole arrangement.

The sole arrangement having an upper facing surface and a ground engaging surface, wherein the upper facing surface being on an opposite side of the sole arrangement than the ground engaging surface. The sole arrangement comprising a maximum posterior depth value, wherein the maximum posterior depth value measuring a thickest point of the posterior area of the sole arrangement under the heel area of the foot. The sole arrangement comprising a maximum anterior depth value, wherein the maximum anterior depth value measuring a thickest point of the anterior area of the sole arrangement under the forefoot area of the foot. The sole arrangement having a maximum intermediate depth value, wherein the maximum intermediate depth value measuring a thickest point of the intermediate area of the sole arrangement under the arch area of the foot or below the foot intermediately disposed between the posterior area of the sole arrangement and the anterior area of the sole arrangement. The maximum posterior depth value being smaller than the maximum anterior depth value by a first margin. The maximum posterior depth value being smaller than the maximum intermediate depth value by a second margin. The maximum intermediate depth value being smaller than the maximum anterior depth value by a third margin or being equal to the maximum anterior depth value. In an exemplary embodiment, the third margin is equal to (=) the maximum anterior depth value being subtracted with (−) the maximum intermediate depth value. The maximum intermediate depth value being larger than the maximum posterior depth value by the second margin or being equal to the maximum posterior depth value. In an exemplary embodiment, the fourth margin being equal to the maximum posterior depth value being subtracted from the maximum intermediate depth value.

The sole arrangement being capable of being at least partially compressed, absorb or receive a force or weight through contact with a ground or surface through at least one or more segments of the ground engaging surface, wherein the at least one or more segments of the ground engaging surface being disposed at least below and/or at least partially around the anterior area of the sole arrangement, the intermediate area of the sole arrangement, and/or the posterior area of the sole arrangement. The posterior segment of the ground engaging surface being disposed above no other element, object, segment or part of the sole arrangement or an object extending from the upper and being able of coming in contact with the ground or surface directly or without interference from any element, object, segment or part of the sole arrangement or an object extending from the upper.

In some of the implementations, the posterior area of the sole arrangement transitioning to the intermediate area of the sole arrangement in a substantially convex shaped form in view of the ground engaging surface in relation to the upper facing surface. The intermediate area of the sole arrangement transitioning to the anterior area of the sole arrangement in a substantially concave shaped form in view of the ground engaging surface in relation to the upper facing surface. The posterior area of the sole arrangement transitioning to the intermediate area of the sole arrangement in a substantially concave shaped form in view of the upper facing surface in relation to, or a perspective from, the ground engaging surface. The intermediate area of the sole arrangement transitioning to the anterior area of the sole arrangement in a substantially convex shaped form in view of the upper facing surface in relation to, or a perspective from, the ground engaging surface. The intermediate area of the sole arrangement connecting the posterior area of the sole arrangement and the anterior area of the sole arrangement in a substantially diagonal form or along a substantially continuous line of transition.

In another aspect of the disclosure, a sole arrangement for an article of footwear having an upper is disclosed. The sole arrangement extending from an end of an intermediate area of the sole arrangement to an end of an anterior area of the sole arrangement, wherein the intermediate area of the sole arrangement being disposed proximate to and at least partially under an arch area of a foot and the anterior area of the sole arrangement being disposed proximate to and at least partially under a forefoot area of the foot. The intermediate area of the sole arrangement extending from an end of an intermediate area of the upper in a direction toward the anterior area of the sole arrangement, wherein the intermediate area of the upper is disposed at least proximate to or around the arch area of the foot. The intermediate area of the sole arrangement being joined to and connecting to the anterior area of the sole arrangement, wherein the intermediate area of the sole arrangement is disposed on an opposite end of the sole arrangement than the anterior area of the sole arrangement. The anterior area of the sole arrangement extending from a forefoot area of the upper to the intermediate area of the sole arrangement. The intermediate area of the sole arrangement may not be extending beyond, behind and/or directly under a heel of the foot.

The sole arrangement having an upper facing surface and a ground engaging surface, wherein the upper facing surface being on an opposite side of the sole arrangement than the ground engaging surface. The sole arrangement comprising a maximum intermediate depth value, wherein the maximum intermediate depth value measuring a thickest point of the intermediate area of the sole arrangement under the arch area of the foot. The sole arrangement comprising a maximum anterior depth value, wherein the maximum anterior depth value measuring a thickest point of the anterior area of the sole arrangement under the forefoot area of the foot. The maximum intermediate depth value being smaller than the maximum anterior depth value by a third margin or being equal to the maximum anterior depth value. In an exemplary embodiment, the third margin is equal to (=) the maximum anterior depth value being subtracted with (−) the maximum intermediate depth value.

In some implementations, the sole arrangement or the upper comprising a heel strap, wherein the heel strap may be attaching to a medial side of the sole arrangement or the upper and lateral side of the sole arrangement or the upper. The heel strap may loop around the back of the heel area of the foot. The heel strap may pass through or be connected to at least one fastening joint on the medial side of the sole arrangement or the upper and at least one fastening joint on the lateral side of the sole arrangement or the upper. Each of the at least one fastening joints are joined to, attached to, be part of the sole arrangement or the upper, or a combination thereof.

In another aspect of the disclosure, a sole arrangement for an article of footwear having an upper is disclosed. The sole arrangement extending from an end of a posterior area of the sole arrangement to an end of an anterior area of the sole arrangement, wherein the posterior area of the sole arrangement being disposed proximate to and at least partially under a heel area of a foot and the anterior area of the sole arrangement being disposed proximate to and at least partially under a forefoot area of the foot. The posterior area of the sole arrangement extending from a heel area of the upper to an intermediate area of the sole arrangement, wherein the intermediate area of the sole arrangement being disposed proximate to or at least partially under an arch area of the foot. The intermediate area of the sole arrangement being joined to and connecting the posterior area of the sole arrangement and the anterior area of the sole arrangement. The anterior area of the sole arrangement extending from a forefoot area of the upper to the intermediate area of the sole arrangement. The intermediate area of the sole arrangement extending from the posterior area of the sole arrangement to the anterior area of the sole arrangement. The sole arrangement further comprising at least one or more anchor points, wherein the one or more anchor points may be fixed or attached to the sole arrangement or the upper. The one or more anchor points may be interconnected by at least one or more anchor links.

In some embodiments, the one or more anchor points may move in a direction that may be along a line, rotational, multidirectional, a combination thereof or any other form. The one or more anchor links may interconnect the one or more anchor joints by passing at least through or along the at least one or more anchor points and may terminate at least at one or more of the one or more anchor joints. The anchor link may extend along or around at least one or more sides of the upper, the sole arrangement, or a combination thereof. In one example, the anchor link may at least extend to, extend from or loop around the heel area of the upper, an exterior facing surface of the upper, the intermediate area of the upper, the anterior area of the upper, the posterior area of the sole arrangement, the intermediate area of the sole arrangement, the anterior area of the sole arrangement, the ground engaging surface, or a combination thereof. The exterior facing surface of the upper is on an opposite side of the upper than an interior face surface. The interior facing surface of the upper may be at least partially facing an upper cavity of the upper. The upper cavity comprising a cavity for at least partially receiving or encompassing the foot.

In some other embodiments, the anchor links in conjunction with the anchor joints may create a tension of at least the upper and may partially reduce a cavity size of the upper cavity, and thereby may at least partially tighten the upper, where the upper then may at least partially surround at least parts of the foot with a higher tension when the ground engaging surface becomes engaged with the ground or surface and/or the sole arrangement at least partially becomes engaged through a force, weight, flex, tension, or any other externally induced pressure unto the sole arrangement and/or the upper. The higher tension induced unto the upper and/or the sole arrangement may be relieved through a redaction of the force, weight, flex, tension, or any other externally induced pressure unto the sole arrangement and/or the upper. The higher tension induced unto the upper and/or the sole arrangement may in some of the embodiments be induced during ground or surface engagement by the ground engaging surface and may be relieved incrementally during ground or surface disengagement by the ground engaging surface and the higher tension may be relieved by a predetermined degree, percentage or amount during a complete disengagement of the ground engaging surface from the ground or surface.

In some of the embodiments, the higher tension may be induced by a first anchor link extending from a first anchor joint to a second anchor joint, and a tension in the first anchor link may translate and at least partially forward the higher tension to a second anchor link. The second anchor link may ultimately translate and at least partially forward the higher tension on the upper, the sole arrangement or the foot directly or through one or more other anchor links. The one or more anchor joints may be stationary, wherein the one or more anchor links may run through or along the one or more anchor joints. The one or more anchor joints may also be dynamic or moveable and comprise one or more moving parts and may further comprise at least one or more rotational anchor joint components.

In some further embodiments, a first medial anchor link may extend from a first medial anchor joint to a second medial anchor joint, wherein the first medial anchor joint may be disposed in or on a forefoot transition area or within a proximity of a maximum anterior depth. The maximum anterior depth being an area encompassing the anterior area of the sole arrangement having the maximum anterior depth value. The forefoot transition area extending from within the intermediate area of the sole arrangement into the anterior area of the sole arrangement and encompassing an area where the intermediate area of the sole arrangement joining the anterior area of the sole arrangement. The second medial anchor joint may be disposed in the anterior area of the sole arrangement or in or on the upper above the anterior area of the sole arrangement and between the first medial anchor joint and the end of the anterior area of the sole arrangement. The second medial anchor joint being furthermore disposed proximate to an area of the anterior area of the sole arrangement not having the maximum anterior depth value. A second medial anchor link extending from the second medial anchor joint in a direction towards or beyond the tongue area of the upper or in a direction of the upper above the posterior area of the sole arrangement. The first medial anchor joint and the second medial anchor joint may comprise one or more intermediate medial anchor joints that may be disposed on or within the sole arrangement or the upper and between the first medial anchor joint and the second medial anchor joint.

In some other further embodiments, a first lateral anchor link may extend from a first lateral anchor joint to a second lateral anchor joint, wherein the first lateral anchor joint may be disposed in or on a forefoot transition area or within a proximity of a maximum anterior depth. The maximum anterior depth being an area encompassing the anterior area of the sole arrangement having the maximum anterior depth value. The forefoot transition area extending from within the intermediate area of the sole arrangement into the anterior area of the sole arrangement and encompassing an area where the intermediate area of the sole arrangement joining the anterior area of the sole arrangement. The second lateral anchor joint may be disposed in the anterior area of the sole arrangement or in or on the upper above the anterior area of the sole arrangement and between the first lateral anchor joint and the end of the anterior area of the sole arrangement. The second lateral anchor joint being furthermore disposed proximate to an area of the anterior area of the sole arrangement not having the maximum anterior depth value. A second lateral anchor link extending from the second lateral anchor joint in a direction towards or beyond the tongue area of the upper or in a direction of the upper above the posterior area of the sole arrangement. The first lateral anchor joint and the second lateral anchor joint may comprise one or more intermediate lateral anchor joints that may be disposed on or within the sole arrangement or the upper and between the first lateral anchor joint and the second lateral anchor joint.

In some embodiments, one or more medial anchor links may connect with one or more lateral anchor links and/or one or more lateral anchor joints. Also, one or more lateral anchor links may connect with one or more medial anchor links and/or one or more medial anchor joints. The higher tension generated by compression of the sole arrangement or force exercised on the sole arrangement and/or the upper and through the one or more anchor joints and the one or more anchor links help to better secure the foot within the upper and prevent the foot from moving beyond or more than desirable over the sole arrangement. The higher tension may be adjustable to a desired or predetermined tension. The higher tension may be further adjustable to a predetermined number of predetermined tension values.

In another aspect of the disclosure, a sole arrangement for an article of footwear being attached to an upper is disclosed. The sole arrangement extending from an end of a posterior area of the sole arrangement to an end of an anterior area of the sole arrangement, wherein the posterior area of the sole arrangement being disposed proximate to and at least partially under a heel area of a foot and the anterior area of the sole arrangement being disposed proximate to and at least partially under a forefoot area of the foot. The posterior area of the sole arrangement extending from the end of the posterior area of the sole arrangement to an intermediate area of the sole arrangement, wherein the intermediate area of the sole arrangement being disposed proximate to or at least partially under an arch area of the foot. The anterior area of the sole arrangement extending from the end of the anterior area of the sole arrangement to an intermediate area of the sole arrangement. The intermediate area of the sole arrangement joining the posterior area of the sole arrangement with the anterior area of the sole arrangement. The sole arrangement having an upper facing surface and a ground engaging surface, wherein the upper facing surface being disposed on an opposite side of the sole arrangement than the ground engaging surface. The sole arrangement having a maximum posterior depth value, wherein the maximum posterior depth value measuring a thickest cross section of the posterior area of the sole arrangement under the heel area of the foot. The sole arrangement having a maximum anterior depth value, wherein the maximum anterior depth value measuring a thickest cross section of a first predetermined anterior area. The first predetermined anterior area may be extending from substantially 20% into a longitudinal length of an upper facing surface measuring from an end of an anterior area of the upper facing surface to 40% to 70% into the longitudinal length of the upper facing surface measuring from the end of the anterior area of the upper facing surface. The sole arrangement having a maximum intermediate depth value, wherein the maximum intermediate depth value measuring a thickest cross section of the intermediate area of the sole arrangement under the arch area of the foot. The anterior area of the sole arrangement extending and/or covering under the upper between 40% to 70% of the longitudinal length of the upper facing surface, measuring from the end of the anterior area of the upper facing surface in a direction towards the end of the posterior area of the sole arrangement. The intermediate area of the sole arrangement extending and/or covering under the upper between 0% to 20% of the longitudinal length of the insole top facing surface of the upper, measuring from the anterior area of the upper facing surface joining an intermediate area of the upper facing surface in a direction towards the end of the posterior area of the sole arrangement. The posterior area of the sole arrangement extending and/or covering under the upper between 20% to 60% of the longitudinal length of the upper facing surface, measuring from the intermediate area of the upper facing surface, or the anterior area of the upper facing surface if there is no intermediate area, in a direction towards the end of the posterior area of the sole arrangement.

In some embodiments, the maximum posterior depth value being smaller than the maximum anterior depth value by a first margin. The maximum posterior depth value being larger than the maximum intermediate depth value by a second margin. The maximum intermediate depth value being smaller than the maximum anterior depth value by a third margin or being equal to the maximum anterior depth value, wherein, in an exemplary embodiment, the third margin is equal to (=) the maximum anterior depth value being subtracted with (−) the maximum intermediate depth value. The posterior area of the sole arrangement may be disconnected from the intermediate area of the sole arrangement and there may or may not be a gap between the posterior area of the sole arrangement and the intermediate area of the sole arrangement. The posterior area of the sole arrangement may or may not transition towards and into the intermediate area of the sole arrangement in a smooth manner. The intermediate area of the sole arrangement transitioning towards and into the anterior area of the sole arrangement in a smooth manner, wherein the ground engaging surface may transition from the intermediate area of the sole arrangement in a smooth, continuous and rolling manner towards and into the anterior area of the sole arrangement. An area of the ground engaging surface under the upper facing surface, excluding an upper facing wall surface, may not lay substantially flat on an even ground or surface. The upper facing wall surface being disposed higher than the upper facing surface and may partially surround or encompass the upper above an area directly below the foot.

In some other embodiments, the maximum posterior depth value being equal to the maximum anterior depth value. The maximum posterior depth value being equal to the maximum intermediate depth value. The maximum intermediate depth value being equal to the maximum anterior depth value. The thickness of the sole arrangement may be substantially uniform directly under the upper facing surface. The intermediate area of the sole arrangement transitioning towards and into the anterior area of the sole arrangement in a smooth manner, wherein the ground engaging surface may transition from the intermediate area of the sole arrangement in a smooth, continuous and rolling manner towards and into the anterior area of the sole arrangement. The area of the ground engaging surface directly under the upper facing surface, excluding the upper facing wall surface, may not lay substantially flat on an even ground or surface.

In various implementations, the sole arrangement may be capable of being compressed, absorb or receive a force or weight through contact with the ground or surface through the ground engaging surface. The entirety of the ground engaging surface may not be substantially uniform or flat and when the posterior area of the upper facing surface is positioned substantially flat or parallel to the ground or surface. When the posterior area of the upper facing surface is positioned substantially flat or parallel to the ground or surface then the posterior area of the ground engaging surface may be transitioning to the intermediate area of the ground engaging surface or the anterior area of the ground engaging surface in a curved form, wherein the intermediate area of the ground engaging surface may be disposed at a level that is higher, even or lower than the posterior area of the ground engaging surface and/or the anterior area of the ground engaging surface may be disposed at a level that is even or lower than the posterior area of the ground engaging surface. Furthermore in some various embodiments, the intermediate area of the ground engaging surface may be transitioning to the anterior area of the ground engaging surface via a downward curved form, wherein the anterior area of the ground engaging surface may be disposed at a level that is lower than the intermediate area of the ground engaging surface than the posterior area of the ground engaging surface when the posterior area of the upper facing surface is positioned, maintained, kept or held substantially flat or parallel to the ground or surface.

In some of the implementations, the ground engaging surface transitioning from the posterior area of the sole arrangement to the intermediate area of the sole arrangement in a substantially convex shaped form in view of the ground engaging surface from a perspective of the sole arrangement. The ground engaging surface transitioning from the intermediate area of the sole arrangement to the ground engaging surface of the anterior area of the sole arrangement in a substantially concave shaped form in view of the ground engaging surface from the perspective of the sole arrangement. The upper facing surface transitioning from the posterior area of the sole arrangement to the intermediate area of the sole arrangement in a substantially concave shaped form in view of the upper facing surface from the perspective of the sole arrangement. The upper facing surface transitioning from the intermediate area of the sole arrangement to the anterior area of the sole arrangement in a substantially convex shaped form in view of the upper facing surface from the perspective of the sole arrangement. The intermediate area of the sole arrangement connecting the posterior area of the sole arrangement and the anterior area of the sole arrangement in a substantially diagonal form and/or along the ground engaging surface with a substantially connected line of transition without a presence of a gap that is larger than 15% of a longitudinal length of the sole arrangement and/or a gap that is larger than 25% of the maximum anterior depth value.

In some other implementations, the ground engaging surface transitioning from the posterior area of the sole arrangement to the intermediate area of the sole arrangement in a uniform or substantially straight line at a predetermined angle or a predetermined slope. The ground engaging surface transitioning from the intermediate area of the sole arrangement to the ground engaging surface of the anterior area of the sole arrangement in a substantially concave shaped form in view of the ground engaging surface from the perspective of the sole arrangement. The upper facing surface transitioning from the posterior area of the sole arrangement to the intermediate area of the sole arrangement in a substantially concave shaped form in view of the upper facing surface from the perspective of the sole arrangement. The upper facing surface transitioning from the intermediate area of the sole arrangement to the anterior area of the sole arrangement in a substantially convex shaped form in view of the upper facing surface from the perspective of the sole arrangement.

In some further implementations, the posterior area of the sole arrangement may comprise a first posterior segment and a second posterior segment. The first posterior segment may be disposed in an area proximate to the end of the posterior area of the sole arrangement. The second posterior segment may be extending from the first posterior segment to the intermediate area of the sole arrangement. The second posterior segment may be disconnected from the first posterior segment or connected with the first posterior segment in a continuous form or discontinuous manner. The first posterior segment is tilted or angled relative to a second forefoot striking zone, wherein the first posterior segment may be disposed in the sole arrangement so that the ground engaging surface of the first posterior segment may lay substantially flat or parallel to the ground or surface when the second forefoot striking zone comes into contact with the ground or surface as to provide better stability with increased ground or surface contact area and traction in the posterior area of the sole arrangement and thereby reduce risk of slipping. The second forefoot striking zone may be disposed proximate to a main forefoot striking zone. The second forefoot striking zone may be an area of the ground engaging surface between the first posterior segment and the end of the anterior area of the sole arrangement. The main forefoot striking zone may be an area of the ground engaging surface extending from the second forefoot striking zone to the end of the anterior area of the sole arrangement. The second forefoot striking zone may overlap with the main forefoot striking zone with a predetermined overlap striking area, percentage, ratio, distance, amount or value. The main forefoot striking zone and/or the second forefoot striking zone may be disposed under the intermediate area of the sole arrangement and/or the anterior area of the sole arrangement.

The intermediate area of the sole arrangement may be constructed or comprise a second set of at least one component that is softer than a first set of at least one component, wherein the first set of at least one component comprise and make up the posterior area of the sole arrangement and the anterior area of the sole arrangement. The first set of at least one component and the second set of at least one component may be comprising a selection of one or more materials, elements, compounds or other tangible constituents. The one or more compounds may be comprising at least one or more or a combination of polymers, polyamide, ethylene vinyl acetate (EVA), poly-ethylene-vinyl acetate (PEVA), thermoplastic polyurethane (TPU), polyethylene terephthalate (PET), castor bean based materials, sugar cane based materials, corn based materials, algae based materials, plastic, crude oil based material, PEBAX, SWEETFOAM, or any other naturally based or artificially created cushioning material that may or may not incorporate recycled, recyclable or renewable materials.

In other implementations, the sole arrangement may comprise a wire separator, wherein the wire separator may be disposed within the sole arrangement, proximate to the upper facing surface or on the upper facing surface. The wire separator may furthermore be disposed at least partially below, above, attached to or within a Strobel or the insole. Throughout the disclosure, the terms Strobel and insole may be used interchangeably, due to the nature of a construction of a shoe where the shoe may or may not incorporate a Strobel but may incorporate an insole, both or vice versa. In situations where the shoe does not comprise a separate Strobel that may be attached to the upper or an insole then the Strobel may be construed as the portion of the upper that attaches to the sole arrangement.

The wire separator may be accessed from within the cavity of the upper or from an exterior portion of the sole arrangement or the upper. The wire separator extending from an area within or proximate to the posterior area of the sole arrangement to an area within or proximate to the anterior area of the sole arrangement. The wire separator may further extend across a width of the sole arrangement or the upper at any longitudinal position from a medial side of the sole arrangement or the upper to a lateral side of the sole arrangement or the upper. In some implementations, the wire separator may be a closed loop wire.

In some other implementations, the wire separator may be an open loop wire that a set of wire separator end points that do not interconnect. The wire separator end points may terminate proximate to one another and may enable separating the sole arrangement, a predetermined set of elements of the sole arrangements, the upper or a combination thereof from each other to a certain point along the longitudinal and/or a transversal direction. Then a remainder of the sole arrangement, predetermined set of elements of the sole arrangements, the upper or a combination thereof that may have not been separated from one another by the wire separator may then be separated by an external force if desired or may be left to be separated over time. The wire separator may be of other forms, shapes and material that may be located between different types of material of the sole arrangement and the upper, where the sole arrangement and the upper may have different after life recycling processes, renewable processes, degrading processes or disposable processes.

In various other implementations, the sole arrangement may further comprise a first rail, wherein the first rail may be utilized to attach the sole arrangement to the upper. The upper may comprise a second rail, wherein the second rail may be utilized to attach or connect the upper to the sole arrangement via at least the first rail. The first rail may be at least partially attached, embedded or extending out of the sole arrangement, and thereby creating a barrier separating a lower outer wall surface from the upper facing surface and/or a higher outer wall surface. The lower outer wall surface being a section of an outer wall surface of the sole arrangement disposed below the first rail, wherein the lower outer wall surface may be exposed to natural elements of an environment also after the sole arrangement being connected to, attached to or joined with the upper. The higher outer wall surface being a section of the outer wall surface of the sole arrangement disposed above the first rail, wherein the higher outer wall surface may be at least partially shielded, hidden or protected from natural elements of the environment after the sole arrangement being connected to, attached to or joined with the upper. The higher outer wall surface may be separate from the upper facing surface or may be one or more parts or sections of the upper facing surface.

In some various other implementations, the first rail may be connected to or be part of a plate that is disposed at least partially within the sole arrangement. The plate extending from the anterior area of the sole arrangement in a direction towards the posterior area of the sole arrangement or the midfoot area of the sole arrangement. The plate may be constructed from a material having properties such as being harder, less flexible, more rigid, having higher bounce back rate, molecular or element density, or a combination thereof than the majority of other materials and/or sections of the sole arrangement and/or the other materials immediately encompassing the plate. The plate may be passing through the sole arrangement and at least provide a transversal connection between a medial section of the first rail and a lateral section of the first rail. The plate may thereby be of structural support for the sole arrangement and at the same time comprise the first rail for joining the sole arrangement with the upper.

In yet other implementations, the sole arrangement may be comprising a heel clamp, wherein the heel clamp providing support and stability for a foot that's being placed within a cavity of the upper and on top of the sole arrangement. The heel clamp may comprise at least a medial heel clamp, at least a lateral heel clamp, at least a hind heel clamp, at least a heel clamp link, or a combination thereof. In some of the implementations, the heel clamp comprises a medial heel clamp and a lateral heel clamp, wherein the medial heel clamp and the lateral heel clamp may be interconnected by a hind clamp link at around a midsection area or a bottom section area of the medial heel clamp and at around a midsection area or a bottom section area of the lateral heel clamp. The heel clamp may be extruding from or out of the sole arrangement, may be a part of the sole arrangement, may be collocated with the upper, be a part of the upper, or a combination thereof.

The medial heel clamp and the lateral heel clamp may be disposed within a first heel clamp height range and may be at a first heel clamp height. The hind clamp link may be disposed within a second heel clamp height range and may be at a second heel clamp height, wherein the second heel clamp height may be shorter than the first heel clamp height by a predetermined amount. A height of the upper may be at the first heel clamp height at or within a vicinity of the medial heel clamp. While transitioning from the medial heel clamp to the hind clamp link, the height of the upper may gradually decrease to the second heel clamp height. Furthermore, while transitioning from the hind clamp link to the lateral heel clamp, the height of the upper may gradually increase to being within the first heel clamp height range or the first heel clamp height. The lateral heel clamp may be disposed within the first heel clamp height and may furthermore be disposed at a lateral heel clamp height which may be different than a medial heel clamp height or may have a similar height. The medial heel clamp may be disposed higher or may have a larger height value than the hind clamp link. The hind clamp link may be disposed within a hind clamp link height range and at a hind clamp link height, wherein the hind clamp link height may be a height value of a shortest section or point of the hind clamp link. The hind clamp link may comprise one or more hind clamp sub-links, may extend from the medial heel clamp to the lateral heel clamp and may be disposed at least partially behind and at least partially around the back of the heel of the foot.

The medial heel clamp and/or the lateral heel clamp may be pushed upon by a foot from a direction above the cavity of the upper and a force generated by the push of the foot may stretch or push the medial heel clamp away from the lateral heel clamp, or vice versa, and enlarge a size of an opening of the upper for receiving the foot into the cavity of the upper. A reduction or elimination of the push of the foot against the heel clamp, including the medial heel clamp, the lateral heel clamp and/or the heel clamp link, may enable the heel clamp to move back and regain an uninhibited form, wherein the heel clamp may be uninhibited to return to its unstretched form. In an exemplary embodiment, the foot having entered the cavity of the upper, the heel clamp may at least partially return to its unstretched form by moving at least partially back and regaining the uninhibited form. The heel clamp may continue to be under stress caused by the foot while being placed within the cavity, wherein the heel clamp may at least partially or with a certain degree of force push against a medial heel side of the foot and/or a lateral heel side of the foot and keep the foot within the cavity.

The heel clamp may comprise a heel clamp cushion at least partially along a top segment of the heel clamp to assist with keeping the foot within the cavity, wherein the heel clamp cushion may be larger, bigger, denser, having more volume or a combination thereof than a remaining set of segments of the heel clamp. The medial heel clamp, lateral heel clamp, heel clamp link or a combination thereof may each comprise a top segment where the top segment may be larger, bigger, denser, having more volume or a combination thereof than their remaining sets of segments below their top segments. In some examples, a top segment of the medial heel clamp and a top segment of the lateral heel clamp each may at least partially be larger, bigger, denser, having more volume, extrude out farther, lay closer to the medial side of the foot, lay closer to the lateral side of the foot, or a combination thereof than other segments of the medial heel clamp below the top segment of the medial heel clamp and other segments of the lateral heel clamp below the top segment of the lateral heel clamp. Additionally or instead, in some other examples, the top segment of the medial heel clamp may be curved inward towards a medial malleolus bone and past a back of an Achilles heel, and the top segment of the lateral heel clamp may be curved inward towards a lateral malleolus bone and past the back of the Achilles heel. The top segment of the medial heel clamp may at least partially be disposed between the Achilles heel and the medial malleolus bone, and the top segment of the lateral heel clamp may at least partially be disposed between the Achilles heel and the lateral malleolus bone.

In various embodiments, a tip area of the top segment of the medial heel clamp may bend backwards in a direction away from the foot, an ankle and/or the heel. A tip area of the top segment of the lateral heel clamp may bend backwards in a direction away from the foot, the ankle and/or the heel. The heel clamp comprising the inwards curved top segment of the medial heel clamp, e.g. in a direction towards the medial malleolus bone, further comprising the tip area of the top segment of the medial heel clamp bent backwards, e.g. in a direction away from the ankle, and/or comprising the inwards curved top segment of the lateral heel clamp, e.g. in a direction towards the lateral malleolus bone, further comprising the tip area of the top segment of the lateral heel clamp bent backwards, e.g. in a direction away from the ankle, enables the foot to push or produce a force or pressure on the medial heel clamp and/or the lateral heel clamp to spread or move in a direction away from a front segment of the opening of the upper and increase the size of the opening of the upper for the foot entering the cavity of the upper. After the foot having entered the cavity of the upper, the heel clamp, including at least the medial heel clamp, lateral heel clamp and/or the heel clamp link, to at least partially retract or move back towards a predetermined heel clamp position, where the predetermined heel clamp position may be a position of the heel clamp during a period of time in which no force or pressure is being exhibited upon by an external force, e.g., the foot, ankle or heel.

The heel clamp may comprise a heel clamp plate, wherein the heel clamp plate having one or more properties comprising at least a flexibly, rigidity, hardness, softness, rebound or any other material property factor, or a combination thereof. The heel clamp plate may be embedded within, on a surface, or a combination thereof, of a posterior area or a heel area of the upper. The heel clamp plate may be separate or disjoint from one or more plates being embedded within the, on a surface of, or a combination thereof, the sole arrangement.

In yet some other embodiments, the heel clamp may be connected to or be part of a plate, wherein the plate may be disposed at least partially within, on a surface of, or a combination thereof, the sole arrangement. The plate may extend from underneath the heel to at least partially around the lateral side of the heel, at least partially around the medial side of the heel, at least partially around the back of the heel or a combination thereof and may furthermore at least partially extend to over the medial side of the heel, over the lateral side of the heel, over the back of the heel or a combination thereof. In some examples, the plate may furthermore extend from underneath the heel in a direction towards the anterior area of the sole arrangement. In some other examples, the plate may include a second plate, wherein the second plate may be connected or attached to the plate and may extend from underneath the heel in direction away from the anterior area of the sole arrangement and beyond the back of the heel for a predetermined distance value, angle value, curvature value, radial value or a combination thereof.

In various other embodiments, the sole arrangement comprising a modular sole device. The modular sole device may be attached to the sole arrangement via one or more attachment mechanisms, comprising a magnetic, rail, clipping, twisting, interlocking, sliding, a combination thereof or any other one or more mechanisms. The modular sole device comprising a posterior modular sole device depth or height value, a modular sole device width value and a modular sole device length value. When the modular sole device being attached or connected to the sole arrangement, the modular sole device extending from the posterior area of the sole arrangement in a direction towards the anterior sole arrangement and may terminate in a posterior end of the anterior sole arrangement, proximate to the anterior sole arrangement, within the midfoot area of the sole arrangement or within the posterior area of the sole arrangement. When the modular sole device being attached to the sole arrangement, the posterior modular sole device depth value being combined with the maximum posterior depth value, producing a combined posterior depth value. The posterior depth value being larger than the maximum posterior depth value and may be substantially similar to the maximum intermediate depth value, substantially similar to the maximum anterior depth value or larger than the maximum intermediate depth value.

In some of various other implementations, the modular sole device may be embedded within the midfoot area of the sole arrangement or the posterior area of the sole arrangement. The modular sole device may be activated to gain a functionality, e.g., posterior modular device depth value or extra support, cushioning or etc., through being capable of being popped out, pushed out, pulled out, folded out or a combination thereof, or any other mechanism enabling an increase in depth, cushioning or support in the posterior area of the sole arrangement.

In some embodiments, the sole arrangement further comprising one or more plates. A plate, being one of the one or more plates, may be at least partially coupled to or proximate to the upper facing surface of the sole arrangement, at least partially coupled to or proximate to the ground engaging surface of the sole arrangement, at least partially disposed within the sole arrangement, or a combination thereof for various locations of the sole arrangement. The plate may also be coupled to or proximate to the upper facing surface of the sole arrangement entirely, coupled to or proximate to the ground engaging surface of the sole arrangement entirely, disposed within the sole arrangement entirely, or a combination thereof. The plate may be disposed within the sole arrangement in the anterior area of the sole arrangement, in the posterior area of the sole arrangement, in the intermediate area of the sole arrangement, or a combination thereof. In one implementation, the plate may extend from the anterior area of the sole arrangement in a direction towards the posterior area of the sole arrangement. In another implementation, the plate may be disposed within the midfoot area of the sole arrangement and extend from a direction of the anterior area of the sole arrangement in a direction towards the posterior area of the sole arrangement. In yet another implementation, the plate may extend from the anterior area of the sole arrangement in a direction towards the posterior area of the sole arrangement, through the midfoot area of the sole arrangement and beyond or past a back of the heel.

In some of the embodiments, the plate may be disposed at a first location in the anterior area of the sole arrangement at a first plate distance, wherein the first plate distance is a distance between the plate and the upper facing surface, and at a second location in the posterior area of the sole arrangement at a second plate distance, wherein the second plate distance is a distance between the plate and the upper facing surface, further comprising that the first plate distance may be larger than the second plate distance. The plate may be disposed at a third location in the midfoot area of the sole arrangement at a third plate distance, wherein the third plate distance is a distance between the plate and the upper facing surface.

In some further embodiments, the plate may be disposed at the first location in the anterior area of the sole arrangement at a fourth plate distance, wherein the fourth plate distance is a distance between the plate and the ground facing surface, and at the second location in the posterior area of the sole arrangement at a fifth plate distance, wherein the fifth plate distance is a distance between the plate and the ground facing surface, further comprising that the fourth plate distance may be shorter than, larger than or the same as the fifth plate distance. The plate may be disposed at the third location in the midfoot area of the sole arrangement at a sixth plate distance, wherein the sixth plate distance is a distance between the plate and the ground facing surface.

In some other embodiments, the plate may further comprise at least a first plate segment in the anterior area of the sole arrangement, wherein the first plate segment may be substantially of a uniform structure that may or may not comprise one or more voids. The plate may comprise at least a second plate segment and a third plate segment, wherein the second plate segment may be disposed on a lateral side of a posterior area of the plate and the third plate segment may be disposed on a medial side of an anterior area of the plate. The second plate segment and the third plate segment may be disjoint and comprise a gap between them across at least 75% of a longitudinal length of the second plate segment or the third plate segment, collectively, which may be in the posterior area of the plate and immediately beneath the heel and/or at least partially in a midfoot area of the plate. The second plate segment and the third plate segment may be interconnected and comprise a joint connecting them to one another in an area behind the back of the heel or an area above a bottom surface of the heel, wherein the area above the bottom surface of the heel comprising an area proximate to the medial side, the lateral side, the back and around the heel which may not be disposed immediately beneath the heel. The plate being described as disjoint or comprising a gap is related to being disjoint or comprising a gap of a same or similar plate material. The gap between the second plate segment and the third plate segment may be filled with a material not having similar material characteristics as the plate and being disposed across a length of at least 75% of the longitudinal length of the second plate segment or the third plate segment.

In yet some other embodiments, the plate comprises at least a first plate segment and an external plate segment. The first plate segment extending from the anterior area of the sole arrangement in a direction towards the posterior area of the sole arrangement. In one implementation, the exterior plate segment may be connected to, joined with or attached to the first plate segment via at least one joint, point of connection or a first plate link. There may be at least a second plate link between and thereby connecting the exterior plate segment and the first plate segment, wherein the second plate link may be of a similar material comprised of similar material properties as the first plate segment or the exterior plate segment.

The exterior plate segment extending from the anterior area of the sole arrangement in a direction towards the posterior area of the sole arrangement. The sole arrangement comprising a gap between a posterior area of the exterior plate segment and at least partially the midfoot area of the sole arrangement and the posterior area of the sole arrangement. An end of the posterior area of the exterior plate segment being disconnected, disjoined or separated from the posterior area of the sole arrangement and at least partially from the midfoot area of the sole arrangement. The posterior area of the exterior plate segment comprising at least partially the ground facing surface and may or may not be disposed within at least one cushion of the sole arrangement. The end of the posterior area of the sole arrangement may be encompassed by the at least one cushion, connected with the ground facing surface, may not connect directly to the posterior area of the sole arrangement through any cushion, plate or other links, and may only be connected with the posterior area of the sole arrangement through the anterior area of the sole arrangement and the midfoot area of the sole arrangement. The posterior area of the exterior plate segment, including the end of the posterior area of the exterior plate segment, having to travel, move or bend by a certain degree with a predetermined force before the end of the posterior area of the exterior plate segment and at least partially the posterior area of the exterior plate segment may come in contact, touch or exercise a direct force onto the posterior area of the sole arrangement.

In another implementation, the exterior plate segment may be disconnected, disjoined or separate from the first plate segment. The exterior plate segment comprising at least an end of an anterior area of the exterior plate segment, wherein the end of the anterior area of the exterior plate segment may comprise at least one bend or joint with a second plate segment forming an angle of between 20 to 160 degrees in a direction towards the posterior area of the sole arrangement. The anterior area of the exterior plate segment may come in contact with or touch the first plate segment by applying a predetermined force to the exterior plate segment but may not be attached to the first plate segment, in this implementation.

With reference to FIGS. 1-4, an article of footwear 10 including a sole arrangement 20 being attached to an upper 50 is provided. The article of footwear 10 may be divided into multiple areas, regions, or segments. The article of footwear 10 may be comprising an anterior area 21, an intermediate area 22 and a posterior area 23. The anterior area 21 may be associated with a forefoot area of a foot, wherein the forefoot area may correspond with metatarsal bones and phalanx bones connecting with toes through joints of the foot. The intermediate area 22 may be associated with an area connecting the anterior area 21 with the posterior area 23, wherein the intermediate area 22 may furthermore be an area associated with a midfoot, an arch of the foot or may be a similar or a same area as the posterior area 23. The intermediate area 22 may vary depending on the embodiment, but generally is disposed between the anterior area 21 and the posterior area 23 as described within each aspect or embodiment of the disclosure. The posterior area of the soul arrangement 23 may be associated with a heel area, wherein the heel area may furthermore be an area associated with a heel of the foot, including a calcaneus bone and/or malleolus bone. An anterior area of the sole arrangement 31 may be thicker than a posterior area of the sole arrangement 33 by a predetermined amount or value, wherein the anterior area of the sole arrangement 31 may be a section of the sole arrangement 20 being disposed in the anterior area 21 and the posterior area of the sole arrangement 33 may be a section of the sole arrangement 20 being disposed in the posterior area 23.

The sole arrangement 20 may furthermore be comprising one or more layers. The sole arrangement 20 may comprise at least one or multiple of an outsole 26, a midsole 25, a plate 36, a midfoot shank 69, a strobel that may be connected via a seam 65, or a combination thereof. A posterior area of the outsole 29 may be thicker than an anterior area of the outsole 27. The sole arrangement 20 extending from an end of the anterior area of the sole arrangement 34 in a direction towards the posterior area of the sole arrangement 33 and may be terminating at an end of the posterior area of the sole arrangement 24. The end of the posterior area of the sole arrangement 24 may extend beyond or past the end of the back of the heel and/or a heel counter or a heel clamp 53.

The article of footwear 10 comprising a cavity 60 where an opening 62 is provided for allowing a foot to enter the cavity 60. The upper 50 includes an interior surface 61 at least facing the cavity 60 of the article of footwear 10. The upper 50 further including loops, apertures, or eyelets 56 providing one or more anchor points for one or more fasteners 55. The upper 50 comprising an upper exterior surface 58 and may further comprise a toe tab and/or toe counter 59. The article of footwear 10 may be comprising the heel clamp 53, wherein the heel clamp 53 may be attached to, connected to and/or embedded within the upper 50, the sole arrangement 20 or both. A medial heel clamp 51 may be disposed between a medial malleolus bone and a calcaneal tendon or Achilles tendon. A lateral heel clamp 52 may be disposed between the lateral malleolus bone and the calcaneal tendon or Achilles heel. The upper 50 may comprise a tongue 54 which may or may not be embedded within the upper 50 and may comprise one or more hinges, loops and or apertures 56 to secure and keep the tongue in place and may be supplemented with loops, hinges, apertures or eyelets being proximate to the sole arrangement 20 performing as means for anchoring down the one or more fasteners 55 and in some embodiments at least enabling the fasteners 55 to cross over an entire cross-lateral width of the tongue 54 and holding the tongue stable, firm and/or above the upper exterior surface 58. The upper 50 further comprising one or more upper layers 57 that may provide cushioning and/or protection against a variety of impacts by an environment including but not limited to wetness, rain, dust, sharp objects, other external forces, or a combination thereof. The one or more upper layers 57 may furthermore provide a factor of breathability, moisture absorption, moisture evaporation, heat absorption, heat dissipation, or a combination of these factors. The upper 50 may be attached, stitched to, combined with, or joined with the sole arrangement 20 via the strobel or directly to one or more of the layers 35 of the sole arrangement 20. The article of footwear 10 may comprise a rail system, wherein the rail system may comprise a first rail being integrated into sole arrangement 20 for an enablement to be connected to, attached to, or joined with the upper 50 via a second being integrated into of the upper 50.

The midsole 25 may incorporate materials with certain factors and characteristics that define or result in a predetermined energy absorption factor or value at various impact locations of the sole arrangement 20, such materials may include, for example, polymer foams. The one or more layers 35 of the sole arrangement 20 may incorporate at least one plate 36, wherein the plate 36 may be at least partially embedded within the midsole 25, or a bottom surface of the plate 38 may at least partially be attached to a top surface of the midsole 40 and a top surface of the plate 37 may at least partially be attached to a bottom surface of the strobel 39 or the plate 36 may at least partially be directly attached to the upper 50, for example, through the seam 65.

The sole arrangement 20 may comprise an outsole 26, wherein the outsole may at least partially be attached to a bottom surface of the midsole 41. The outsole 26 may encompass the bottom surface of the midsole 41 in its entirety or partially, for example, the outsole may cover some portions of the bottom surface of the midsole 41 in the anterior area of the sole arrangement 31, in the posterior area sole arrangement 33 and/or at least partially the posterior area 23 of the upper 50, such as an area of the heel clamp 53. The posterior area of the outsole 29 may be thicker or have a larger depth value than the anterior area of the outsole 27. An end of the anterior area of the outsole 43 may extend over an end of the anterior area of the sole arrangement 42 and may at least partially extend over an end of the anterior area of the upper 45. An end of the posterior area of the outsole 44 may extend over an end of the posterior area of the midsole 43 and/or may at least partially extend over an end of the posterior area of the upper 46. The anterior area of the midsole 42 may at least partially extend over the anterior area of the upper 45 and the posterior area of the midsole 43 may at least partially extend over the posterior area of the upper 46. Additionally, the midsole 25 may extend at least partially over a lateral side 47 of the upper 50 and/or at least partially over a medial side 48 of the upper 50.

As shown in FIG. 1, the article of footwear 10 is shown in an isometric view for illustrative purposes. The sole arrangement 20 may be extending from an end of a posterior area of the sole arrangement 24 to an end of an anterior area of the sole arrangement 34, wherein the posterior area of the sole arrangement 33 being formed proximate to and at least partially under a heel area of a foot, and the anterior area of the sole arrangement 31 being formed proximate to and at least partially under a forefoot area of the foot. The posterior area of the sole arrangement 33 extending from the end of the posterior area of the sole arrangement to an intermediate area of the sole arrangement 32, wherein the intermediate area of the sole arrangement 32 being formed proximate to and at least partially under an arch area of the foot. The intermediate area of the sole arrangement 32 connecting the posterior area of the sole arrangement 33 with the anterior area of the sole arrangement 31. The sole arrangement having an upper facing surface 18 and a ground engaging surface 19, wherein the upper facing surface 18 being on an opposite side of the sole arrangement 20 than the ground engaging surface 19.

Figure 2:
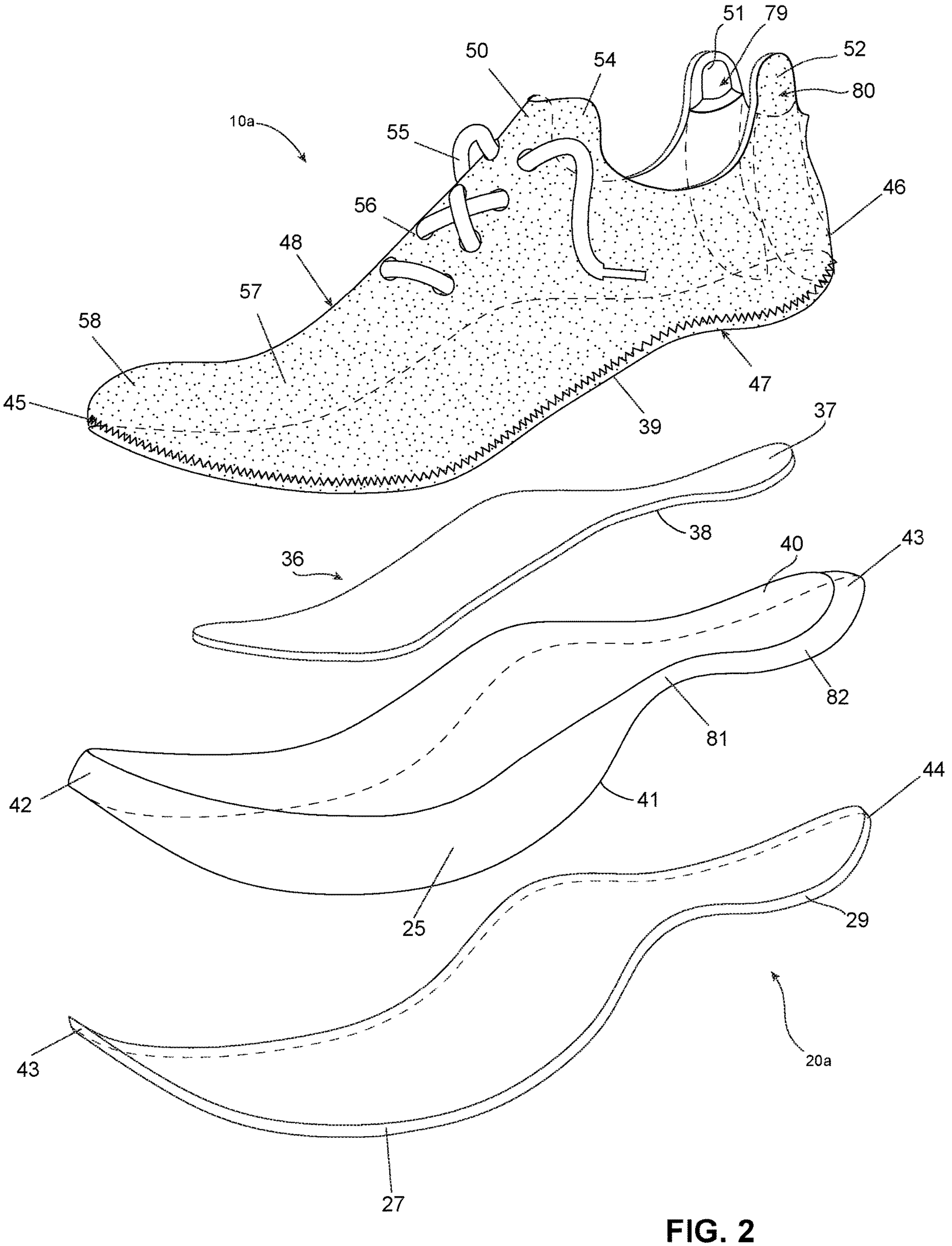
FIG. 2 is an exploded view of the article of footwear of FIG. 1.
Figure 3:
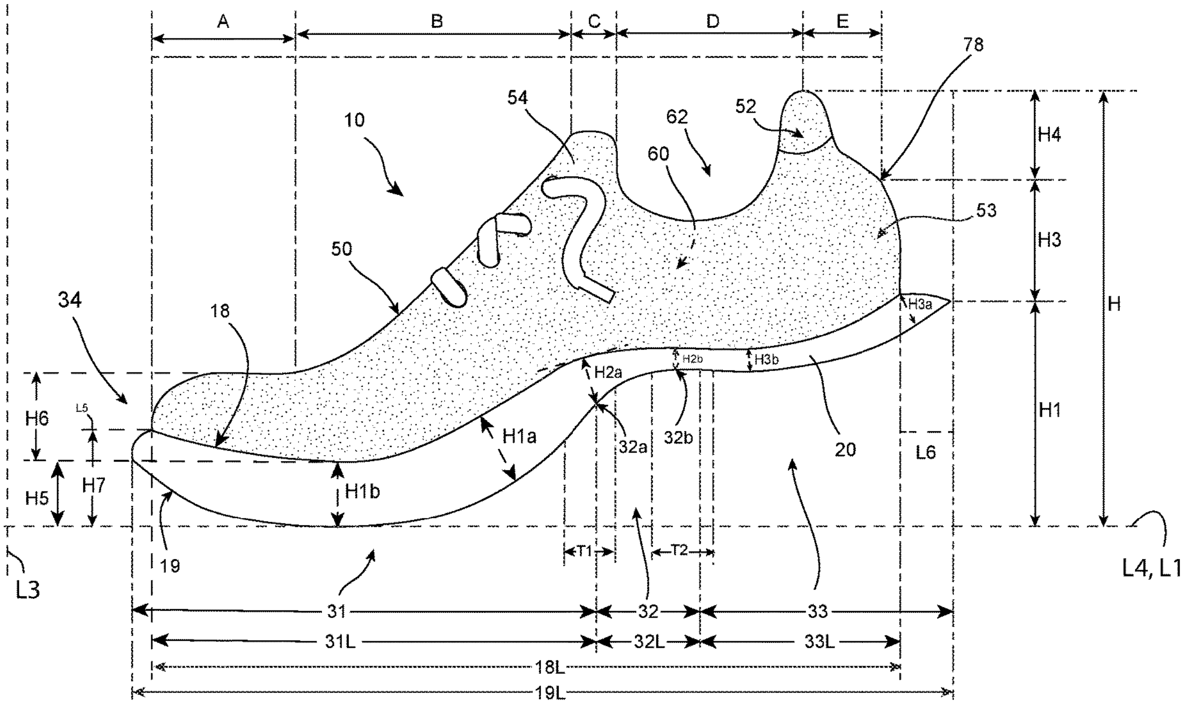
FIG. 3 is a side view of a lateral face of the article of footwear of FIG. 1.

In particular reference to FIGS. 1-3, the sole arrangement 20 having a maximum posterior depth value, e.g. having a height or depth value H3*a* or H3*b*, wherein the maximum posterior depth value H3*a* measuring a thickest point of the posterior area of the sole arrangement 33 under the heel area of the foot or the ground engaging surface and extending to or under a lowest point of a heel of the foot or a lowest point of the posterior area 23 of the upper facing surface 18. Possible maximum posterior depth values may be at proximate locations of H3*a* or H3*b* of FIG. 3. A depth value of the sole arrangement 20 being measured by a cross sectional line being substantially perpendicular to the upper facing surface 19 at a point of measurement. The sole arrangement 20 having a maximum anterior depth H1*a* value, wherein the maximum anterior depth H1*a* value measuring a thickest point of the anterior area of the sole arrangement 31 directly under the forefoot area of the foot, possible maximum anterior depth values may be at proximate locations of H1*a* or H1*b* of FIG. 3. The sole arrangement 20 having a maximum intermediate depth H2*a* value, wherein the maximum intermediate depth H2*a* value measuring a thickest point of the intermediate area of the sole arrangement 32 which may be under the arch area of the foot, or within a transition area of the anterior area 21 to the intermediate area 22 or to the posterior area 23. A transition area is an area where a convex curve changes to a substantially flat line or a concave curve, where a concave curve changes to a substantially flat line or a convex curve, or where a substantially flat line changes to a convex curve or a concave curve over a predetermined distance or length.

The maximum posterior depth H3*b* value being smaller than the maximum anterior depth H1*a* value by a first margin. In an exemplary embodiment, the first margin is equal to (=) the maximum anterior depth H1*a* value being subtracted with (–) the maximum posterior depth H3*b* value. The maximum posterior depth H3*b* value being smaller than the maximum intermediate depth H2*a* value by a second margin. The maximum intermediate depth H2*a* value being smaller than the maximum anterior depth H1*a* value by a third margin or being equal to the maximum anterior depth value. In an exemplary embodiment, the third margin is equal to (=) the maximum anterior depth H1*a* value being subtracted with (–) the maximum intermediate depth H2*a* value. The maximum intermediate depth H2*a* value being larger than the maximum posterior depth H3*b* value by a fourth margin or being equal to the maximum posterior depth H3*b* value. In an exemplary embodiment, the fourth margin being equal to the maximum posterior depth H3*b* value being subtracted from the maximum intermediate depth H2*a* value (fourth margin=H2*a*-H3*a*).

In some implementations, the posterior area of the sole arrangement 33 being capable of being compressed, absorb or receive a force or weight through contact with a ground or surface through at least a posterior area 23 of the ground engaging surface 19, wherein the posterior area 23 of the ground engaging surface 19 being may be disposed at least below and/or at least partially around the posterior area of the sole arrangement 33. The posterior area 23 of the ground engaging surface 19 being disposed above no other element, object, segment or part of the sole arrangement or an object extending from the article of footwear and being capable of coming in direct contact with the ground or surface.

In some of the implementations, the anterior area of the sole arrangement 31 extending from the end of the anterior area of the sole arrangement 34 to the intermediate area of the sole arrangement 32. The anterior area of the sole arrangement 33 transitioning to the intermediate area of the sole arrangement 32 or the posterior area of the sole arrangement 33, if the intermediate area of the sole arrangement 32 may not be significantly different than the posterior area of the sole arrangement 33 (see the embodiments regarding the sole arrangement comprising only an anterior area of the sole arrangement 31 and a posterior area of the sole arrangement 33). The anterior area of the sole arrangement 31 may be transitioning to the intermediate area of the sole arrangement 32 in a substantially concave shaped form in view of the ground engaging surface 19 in relation to the upper facing surface 18. The intermediate area of the sole arrangement 32 transitioning to the posterior area of the sole arrangement 33 in a substantially convex shaped form in view of the ground engaging surface 19 in relation to the upper facing surface 18. In some additional embodiments, the anterior area of the sole arrangement 31 transitioning to the intermediate area of the sole arrangement 32 in a substantially convex shaped form in view of the upper facing surface 18 in relation to, or a perspective from, the ground engaging surface 19. The intermediate area of the sole arrangement transitioning to the posterior area of the sole arrangement 33 in a substantially concave shaped form in view of the upper facing surface 18 in relation to, or a perspective from, the ground engaging surface 19. The intermediate area of the sole arrangement 32 connecting the posterior area of the sole arrangement 33 and the anterior area of the sole arrangement 31 in a substantially diagonal form or along a substantially straight line of transition, wherein the intermediate area of the sole arrangement 32 may comprise a substantially steadily decreasing or increasing thickness or depth. In some various embodiments, the intermediate area of the sole arrangement 32 may comprise a substantially steady or flat thickness or depth.

In some other embodiments, the ground engaging surface 19 may be transitioning from the anterior area of the sole arrangement 31 to the intermediate area of the sole arrangement 32 in a substantially concave shaped form in view of the ground engaging surface 19 from a viewpoint of the upper facing surface 18. The ground engaging surface 19 of the intermediate area of the sole arrangement 32 transitioning to the posterior area of the sole arrangement 33 in a substantially convex shaped form in view of the ground engaging surface 19 from a perspective of the upper facing surface 18.

As shown in FIG. 3, a sideview of the article of footwear is shown for illustrative purposes. The intermediate area of the sole arrangement 33 comprises an intermediate depth transition rate, wherein the intermediate depth transition rate representing an anterior depth of the intermediate area of the sole arrangement 32*a* in relation to a posterior depth of the intermediate area of the sole arrangement 32*b*. The anterior depth of the intermediate area of the sole arrangement 32*a* being disposed within a center area of an area of anterior to intermediate sole arrangement interconnection T1. The area of anterior to intermediate sole arrangement interconnection T1 may be an area connecting the anterior area of the sole arrangement 31 with the intermediate area of the sole arrangement 32, and a sideview of a substantially continuous outline of the ground engaging surface 19 along the area of the anterior to intermediate sole arrangement interconnection may be comprising the substantially continuous outline to change from a concave or convex shaped form to a substantially straight line, from a concave shaped form to a convex shaped form, or from a convex shaped form to a concave shaped form. The posterior depth of the intermediate area of the sole arrangement 32*b* being disposed within a center area of an area of the intermediate to posterior sole arrangement interconnection T2. The area of intermediate to posterior sole arrangement interconnection T2 may be an area connecting the intermediate area of the sole arrangement 32 with the posterior area of the sole arrangement 33, and a sideview of an substantially continuous outline of the ground engaging surface 19 along the area of the intermediate to posterior sole arrangement interconnection may be comprising the substantially continuous outline to change from a concave or convex shaped form to a substantially straight line, from a concave shaped form to a convex shaped form, or from a convex shaped form to a concave shaped form. The intermediate depth transition rate may be calculated by having the anterior depth of the intermediate area of the sole arrangement 32*a* divided by the posterior depth of the intermediate area of the sole arrangement 32*b*

(intermediate depth transition rate=the posterior depth of the intermediate area of the sole arrangement 32*b*/the anterior depth of the intermediate area of the sole arrangement 32*a*). The intermediate depth transition rate may be a value between substantially close to 0 (such as in an exemplary embodiment having a value of 0.01) and a value of 1 (the intermediate depth transition rate=(equal to) or <(less than) 1).

In this embodiment, a beginning depth of the intermediate area of the sole arrangement may be the anterior depth of the intermediate area which may be within the area of the anterior to intermediate sole arrangement interconnection T1, wherein the beginning depth of the intermediate area of the sole arrangement may be closer to the end of the anterior area of the sole arrangement than an ending depth of the intermediate area of the sole arrangement, which may be a posterior depth of the intermediate area, herein. Each embodiment may comprise a beginning depth of a section area of the sole arrangement based on a different perspective of the article of footwear, and therefore is required to be interpreted, or an interpretation to be modified, in view of the embodiment.

The intermediate depth transition rate may in some implementations be between 0.33 and 0.67. In an exemplary embodiment, the intermediate depth transition rate of around or substantially 0.51, with a margin of production variation of plus or minus 0.05, representing an exemplary posterior depth of the intermediate area of the sole arrangement 32*b* having a value of about 17 mm (millimeters) and an exemplary anterior depth of the intermediate area of the sole arrangement 32*a* having a value of about 33 mm. In another exemplary embodiment, the intermediate depth transition rate of around or substantially 0.77, with a margin of production variation of plus or minus 0.05, representing an exemplary posterior depth of the intermediate area of the sole arrangement 32*b* having a value of around 27 mm and an exemplary anterior depth of the intermediate area of the sole arrangement 32*a* having a value of around 35 mm.

In some further or other implementations, the intermediate depth transition rate may relate to an intermediate forefoot gain value, wherein the intermediate forefoot gain value comprising an increase in value from the posterior depth of the intermediate area of the sole arrangement 32*b* having a height or depth value of H2*b*, to the anterior depth of the intermediate area of the sole arrangement 32*a*, having a height or depth value of H2*a*, wherein the posterior depth of the intermediate area of the sole arrangement is equal to or smaller than the anterior depth of the intermediate area of the sole arrangement. The intermediate forefoot gain value may be calculated by deducting the height or depth value H2*b* of the posterior depth of the intermediate area of the sole arrangement 32*b* from height or depth value H2*a* of the anterior depth of the intermediate area of the sole arrangement 32*b*.

The intermediate forefoot gain value, e.g. H2*a*-H2*b*, may in some implementations be between 0 mm and 26 mm. In an exemplary embodiment, the intermediate forefoot gain value may be 7 mm, representing a posterior depth of the intermediate area of the sole arrangement having a value of about or around 5 mm (millimeters) and an anterior depth of the intermediate area of the sole arrangement having a value of about or around 12 mm. In another exemplary embodiment, the intermediate forefoot gain value may be about or exactly 1 mm, representing an exemplary posterior depth of the intermediate area of the sole arrangement having a value of about or around 21 mm and an exemplary anterior depth of the intermediate area of the sole arrangement having a value of about or exactly 22 mm.

Furthermore, the sole arrangement 20 may comprise a main depth transition rate, wherein the main depth transition rate representing a rate of the maximum posterior depth value, e.g. H3*a* or H3*b*, in relation to the maximum anterior depth value, e.g. H1*a* or H1*b*. The main depth transition rate being calculated by having the maximum posterior depth value, e.g. H3*a*, divided by the maximum anterior depth value, e.g. H1*a*, (the main depth transition rate=the maximum posterior depth value (e.g. H3*a* or H3*b*)/the maximum anterior depth value (e.g. H1*a* or H1*b*)). The main depth transition rate may be a value between close to 0 (e.g. in an exemplary embodiment having a value of 0.01) and a value of 1 (the main depth transition rate may be equal to (=) or less than (<) 1).

The main depth transition rate may relate to a main forefoot gain value, wherein the main forefoot gain value representing an increase in value from the maximum posterior depth value, e.g. H3*a* or H3*b*, to the anterior posterior depth value, e.g. H1*a* or H1*b*, wherein the maximum posterior depth value, e.g. H3*a*, may be smaller than the maximum anterior posterior depth value, e.g. H1*a*. The main forefoot gain value further representing a difference in depth value between the maximum posterior depth value, e.g. H3*a*, and the maximum anterior depth value, e.g. H1*a*. In an exemplary embodiment, the main forefoot gain value may be calculated by subtracting the maximum posterior depth value, e.g. H3*a*, from the maximum anterior depth value, e.g. H1*a* (the main forefoot gain value=the maximum anterior depth value (e.g. H1*a* or H1*b*)−the maximum posterior depth value (e.g. H3*a* or H3*b*)).

The main depth transition rate may be smaller than, larger than or equal to the intermediate depth transition rate. The main forefoot gain value may be smaller than, larger than or equal to the intermediate forefoot gain value. The main forefoot gain value may be larger than the intermediate forefoot gain value by a main to intermediate gain difference value, wherein the main to intermediate gain difference value is calculated by subtracting the intermediate forefoot gain value from the main forefoot gain value (i.e., the main to intermediate gain difference value=(is equal to) the main forefoot gain value−(minus) the intermediate forefoot gain value). The main to intermediate gain difference value may be an absolute value between substantially close to 0 (such as in an exemplary embodiment having a value of 0.01) and a value of 30 mm (the absolute value of the first gain difference rate=(equal to) or <(less than) 30 mm).

The main to intermediate gain difference value may be related to a main to intermediate gain difference rate. The main to intermediate gain difference rate may be calculated by dividing the intermediate forefoot gain value by the main forefoot gain value (i.e., main to intermediate gain difference rate=intermediate forefoot gain value/main forefoot gain value). The main to intermediate gain difference rate may be a value between substantially close to 0 (such as in an exemplary embodiment having a value of 0.01) and a value of 1 (the first gain difference rate=(equal to) or <(less than) 1).

The intermediate area of the sole arrangement 32 may be an area connecting the anterior area of the sole arrangement 31 with the posterior area of the sole arrangement 33. A first outline of a sideview, wherein the first outline of the sideview is an outline of a sideview of the ground engaging surface 19, may be substantially continuous at least along the area between a proximate area of the maximum anterior depth value, e.g. H1*a* or H1*b*, and a proximate area of the maximum posterior depth value, e.g. H3*a* or H3*b*, wherein the first outline of the sideview may change from a concave or convex shaped form to a substantially straight line, from a concave shaped form to a convex shaped form, from a convex shaped form to a concave shaped form, or a combination thereof, including a repeat of a similar change. As shown in FIG. 3, the first outline of the sideview may change from the anterior area of the sole arrangement 31 to the intermediate area of the sole arrangement 32 through a first substantially concave shaped form, from a perspective of the upper facing surface 18, and the first outline of the sideview may change from the substantially concave shaped form to a substantially convex shaped form, from a perspective view of the upper facing surface 18, within the intermediate area of the sole arrangement 32. Furthermore, from within the intermediate area of the sole arrangement 32 the outline of the sideview may change from the substantially convex shaped form to a second substantially concave shaped form, from a perspective of the upper facing surface 18, within the posterior area of the sole arrangement 33. From within the posterior area of the sole arrangement 33 the second concave shaped form of the first outline of the sideview may remain a concave shaped form, may change to a substantially straight line or may rise above a back of the upper 50 in a direction towards a top of the upper proximate to a back of the heel.

The main depth transition rate may in some implementations be between 0.19 and 0.91. In an exemplary embodiment of FIG. 3, the main depth transition rate may be around or substantially 0.51, with a margin of fluctuation of plus or minus 0.05, representing a maximum depth of the posterior area of the sole arrangement, e.g. H3*a* or H3*b* or within an area or location within the posterior area of the sole arrangement, having a value of about 17 mm (millimeters) and a maximum depth of the anterior area of the sole arrangement, e.g. H1*a* or H1*b* or within an area or location within the posterior area of the sole arrangement, having a value of about 33 mm. In another exemplary embodiment of FIG. 3, the main depth transition rate of around or substantially 0.77, with a margin of production variation of plus or minus 0.05, representing an maximum posterior depth of the intermediate area of the sole arrangement, e.g. H3*a* or H3*b*, having a value of around 27 mm and an maximum depth of the anterior area of the sole arrangement, e.g. H1*a* or H1*b*, having a value of around 35 mm.

The main depth transition rate may relate to a main forefoot gain value, wherein the main forefoot gain value comprises an increase in value from the maximum depth of the posterior area of the sole arrangement, having a height or depth value within the posterior area of the sole arrangement 33 at e.g. H3*a* or H3*b*, to the maximum depth of the anterior area of the sole arrangement, having a height or depth value within the anterior area of the sole arrangement 31 at e.g. H1*a* or H1*b*, wherein the maximum depth of the posterior area of the sole arrangement (e.g. H3*a*) may be smaller than the anterior depth of the intermediate area of the sole arrangement (e.g. H1*a*). The main forefoot gain value may be calculated by deducting the maximum depth of the posterior area of the sole arrangement (e.g. H3*a*) from maximum depth of the anterior area of the sole arrangement (e.g. H3*a*).

The main forefoot gain value (e.g. H1*a*-H3*a*) may, in some embodiments of FIG. 3, be between 0 mm and 26 mm. In an exemplary embodiment of FIG. 3, the main forefoot gain value may be 7 mm, representing a maximum depth of the posterior area of the sole arrangement, e.g. H3*a*, having a value of about or around 5 mm (millimeters) and a maximum depth of the anterior area of the sole arrangement, e.g. H1*a*, having a value of about or around 12 mm. In another exemplary embodiment of FIG. 3, the intermediate forefoot gain value may be about or exactly 1 mm, representing an forefoot gain value may be 7 mm, representing a maximum depth of the posterior area of the sole arrangement, e.g. H3*a*, having a value of about or around 21 mm and a maximum depth of the anterior area of the sole arrangement, e.g. H1*a*, having a value of about or exactly 22 mm.

The sole arrangement 20 may comprise the intermediate depth transition rate and the main depth transition rate. The intermediate depth transition rate representing a depth transition rate between a posterior end of the intermediate area of the sole arrangement and an anterior end of the intermediate area of the sole arrangement, wherein the intermediate depth transition rate may at least partially be descriptive of a shape, slope, structure, or form of an outline of a sideview of the intermediate area of the sole arrangement. The main depth transition rate representing a depth transition rate between the posterior area of the sole arrangement and the anterior area of the sole arrangement, wherein the main depth transition rate may at least partially be descriptive of a shape, slope, structure, or form of an outline of a sideview of the sole arrangement. The sole arrangement comprises the intermediate area of the sole arrangement being disposed between the posterior area of the sole arrangement and the anterior area of the sole arrangement.

An area of anterior to posterior sole arrangement transition T3 may be an area connecting the anterior area of the sole arrangement 31 with the intermediate area of the sole arrangement 32, and the intermediate area of the sole arrangement 32 with the posterior area of the sole arrangement 33. The area of anterior to posterior sole arrangement transition T3 may be related to the main depth transition rate and the main forefoot gain value. A substantially continuous first outline of a sideview of the ground engaging surface 19 along the area of the anterior to posterior sole arrangement interconnection T3 may be comprising the substantially continuous first outline to at least partially change, starting from the anterior area of the sole arrangement 31 in a direction towards the posterior area of the sole arrangement 33, from a concave shaped form (from a perspective of the upper facing surface 18) to a substantially straight line, a convex shaped form (from a perspective of a ground touching the ground engaging surface 19) to a substantially straight line, from a concave shaped form (from a perspective of the upper facing surface 18) to a convex shaped form (from a perspective of the upper facing surface 18), or from a concave shaped form (from a perspective of the upper facing surface 18) to a convex shaped form (from a perspective of the upper facing surface 18) and then at least to a substantially straight line or a second concave shaped form (from a perspective of the upper facing surface 18). When viewed from a perspective of the upper facing surface 18, the substantially continuous first outline may start from a concave shaped form at least partially disposed within the anterior area of the sole arrangement 31, and gradually turn into a convex shaped form within an area being at least partially disposed within the intermediate area of the sole arrangement 32, and then turn into a second concave shaped form within an area being at least partially disposed within the posterior area of the sole arrangement 33.

The ground engaging surface 19 of the posterior area of the sole arrangement 33 may extend beyond an end of the upper facing surface 18 of posterior area of the sole arrangement 33. The upper facing surface 18 may be disposed on an opposite side of the sole arrangement 20 than the ground engaging surface 19. A length of the posterior area of the sole arrangement 33L may be a length of up to 45% of a length of the upper facing surface 18L. A length of the intermediate area of the sole arrangement 32L may be a length of up to 40% of the length of the upper facing surface 18L. A length of the anterior area of the sole arrangement 31L may be a length of up to 75% of the length of the upper facing surface 18L.

With continued reference to FIG. 3, the length of the anterior area of the sole arrangement 31L may be between 55% and 65% of the length of the upper facing surface 18L, the length of the intermediate area of the sole arrangement 32L may be between 15% and 25% the length of the upper facing surface 18L, and the length of the posterior area of the sole arrangement 33L may be between 20% and 30% of the length of the upper facing surface 18L.

The article of footwear 10 may comprise a vertical overall height value H measuring a height value along a vertical axis (L3) between a lowest point of the article of footwear 10 and a highest point of the article of footwear 10. The article of footwear 10 or the sole arrangement 20 may include a heel level height value H1 measuring a height value of a heel of a foot being raised to when positioned in a manner consistent with measurement prerequisites of the disclosure, which may also be consistent with a measuring process of a person with ordinary skill in the art positioning an article of footwear for performing measurements. A heel clamp, or posterior component, 53 may comprise a posterior component height value H3 measuring a height value from a lowest point under the heel of the foot on an upper facing surface 18 to a top of the posterior component 78. The terms heel clamp and posterior component essentially refer to the same component and may be used interchangeably throughout the disclosure. A lateral component 52 and a medial component 51 of the posterior component 53 may include a predetermined height value or an extension height value H4 measuring a height value along the vertical axis (L3) from the top of the posterior component 78 to a top of the lateral component 52 or the medial component 51, or to the top of a top area of the lateral component 52 or the medial component 51. The heel level height value H1, the posterior component height value H3 and the extension height value H4 may be substantially equal to the vertical overall height value H of the article of footwear 10 along the vertical axis (L3).

The sole arrangement 20 may include a toe spring height value H7 measuring a height value along the vertical axis between a bottom of a ball of the foot and a toe level (L5) at a front of a set of toes, wherein the sole arrangement 20 raising the front of the set of toes to. The sole arrangement 20 may further include a forefoot rocker height value H5 measuring a height value along the vertical axis between a ground engaging surface 19 under the ball of the foot and a front of the ground engaging surface 19 under the front of the set of toes, wherein a thickness of the sole arrangement 20 gradually decreasing in a direction from the ball of the foot towards the front of the set of toes to.

The article of footwear 10 may include a toe box height value H6 along the vertical axis (L3) measuring a height value between a top of an upper 50 above the set of toes and the toe level (L5) or under the ball of the foot. The article of footwear 10 may also include a toe box length value A measuring a distance along a longitudinal axis (L1) between under the ball of the foot and the front of the set of toes. The article of footwear 10 may furthermore include a instep length value B measuring a distance along the longitudinal axis (L1) between the ball of the foot and a top of a tongue 54 of the upper 50. The upper 50 may include a longitudinal length value C measuring a distance along the longitudinal axis (L1) between a front end of the tongue 54 of the upper 50 and a rear end of the tongue 54 of the upper 50. The upper 50 may further include an upper aperture 62 providing an opening for the foot to enter a cavity 60 of the article of footwear 10. The upper aperture 62 may include a first upper aperture length D measuring a distance along the longitudinal axis (L1) between the rear end of the tongue 54 and the top of the medial component 51 or the lateral component 52. The upper aperture 62 may also include a posterior component opening length E measuring a distance along the longitudinal axis (L1) between the top of the posterior component 78 and a top of the lateral component 52, a top of the medial component 51, a top area of the lateral component 80 or a top area of the medial component 79. Furthermore, combining length values of the longitudinal length value C, the first upper aperture length D and the posterior component opening length E may result in an overall upper aperture length, wherein the overall upper aperture length measuring a distance along the longitudinal axis (L1) between the front end of the tongue 54 and the top of the posterior component 78.

Figure 4:
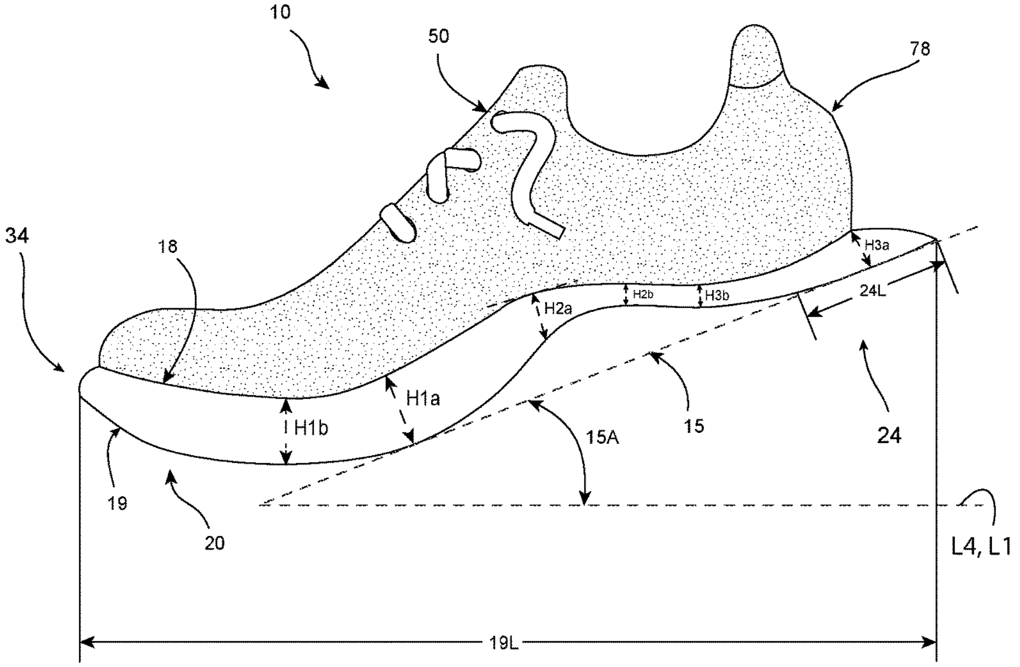
FIG. 4 is a side view of the lateral face of the article of footwear of FIG. 1.
Figure 5:
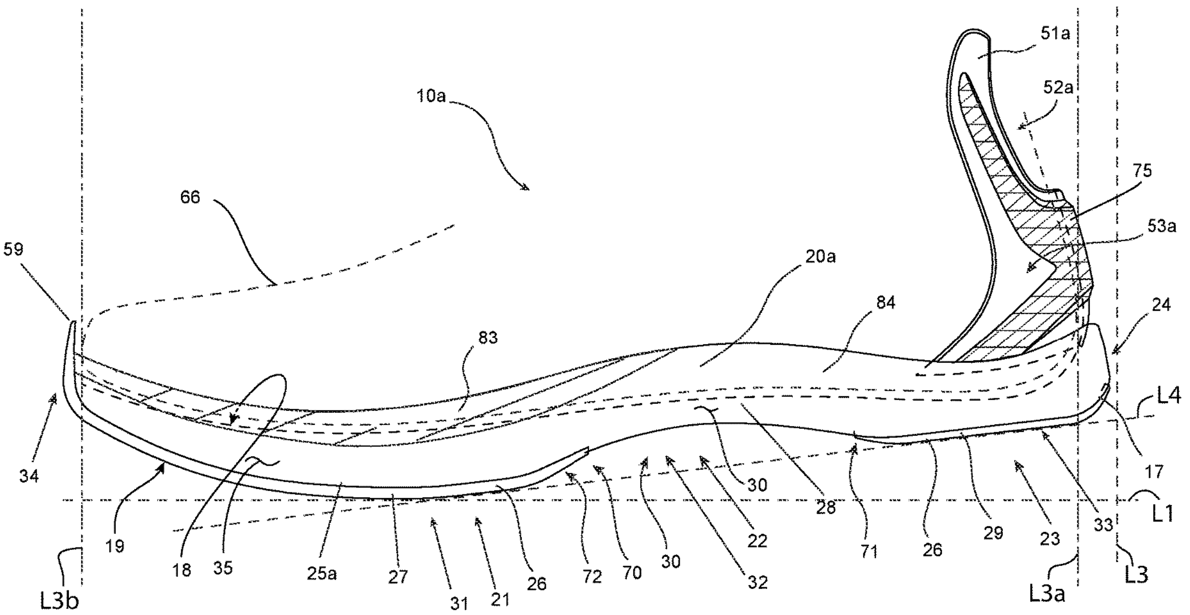
FIG. 5 is a side view of a medial face of an article of footwear incorporating a sole arrangement in accordance with the principles and features of the present disclosure.

As shown in FIG. 4, a reference ground plane 15 is drawn to illustrate an embodiment of the disclosure where the sole arrangement's 20 ground contact may be at a first angle 15A. At the first angle 15A the end of the posterior area of the sole arrangement 24 may be substantially flat for an end of the posterior of the sole arrangement 24L. A length of the end of the posterior of the sole arrangement length 24L may be at least 5% of a length of the ground engaging surface 19L. With particular reference to FIG. 4, the length of the end of the posterior of the sole arrangement 24L may be between 5% and 15% of the length of the ground engaging surface 19L.

With reference to FIGS. 5-8, an article of footwear 10 *a* including a sole arrangement 20, that may be attached to an upper, is provided. Due to the substantial similarity between the article of footwear 10 and article of footwear 10 *a* in arrangement and functionality of their components, same reference numerals are used hereinafter and in the drawings to identify same or similar components, wherein same reference numerals including letter extensions are used to identify components that may have been modified.

The article of footwear 10 *a* may be divided into multiple areas, regions, or segments. The article of footwear 10 *a* may be comprising an anterior area 21 *a* an intermediate area 22 *a* and a posterior area 23 *a*. The anterior area 21 *a* may be associated with a forefoot area of a foot, wherein the forefoot area may correspond with metatarsal bones and phalangeal bones connecting with toes through joints of the foot. The intermediate area 22 *a* may be associated with an area connecting the anterior area 21 *a* with the posterior area 23 *a*, wherein the intermediate area 22 *a* may furthermore be an area associated with a midfoot, an arch of the foot or may be a similar or a same area as the posterior area 23 *a*. The intermediate area 22 *a* may vary depending on the embodiment, but generally is disposed between the anterior area 21 and the posterior area 23 *a*. The posterior area of the sole arrangement 23 *a* may be associated with a heel area, wherein the heel area may furthermore be an area associated with a heel of the foot, including a calcaneus bone and/or one or more malleolus bones. An anterior area of the sole arrangement 31 *a* may be thicker than a posterior area of the sole arrangement 33 *a* by a predetermined amount or value on average or at one or more specific positions, including one or more sub-areas of the anterior area of the sole arrangement 31 *a*, wherein the anterior area of the sole arrangement 31 *a* may be a section of the sole arrangement 20 *a* being disposed in the anterior area 21 *a*, wherein in some implementations the anterior area of the sole arrangement 31 *a* may be the same as the anterior area 21 *a*, and the posterior area of the sole arrangement 33 *a* may be a section of the sole arrangement 20 *a* being disposed in the posterior area 23 *a*, wherein in some implementations the posterior area of the sole arrangement 33 *a* may be the same as the anterior area 23 *a*.

The sole arrangement 20 *a* may furthermore comprise one or more layers. The sole arrangement 20 *a* may comprise an outsole 26 *a*, a midsole 25 *a*, at least one plate 36, a shank 69, a strobel, or a combination thereof. A posterior area of the outsole 29 may be thicker than an anterior area of the outsole 27. The sole arrangement 20 *a* extending from an end of the anterior area of the sole arrangement 34 in a direction towards the posterior area of the sole arrangement 33 and may be terminating at an end of the posterior area of the sole arrangement 24. The end of the posterior area of the sole arrangement 24 may extend beyond or past the end of the back of the heel and/or a heel counter, heel cup, heel seat or a heel clamp 53 *a*. The heel counter, heel cup, heel seat or a heel clamp may be used interchangeably and refer to the same components. The heel clamp 53 *a* may be created as part of the sole arrangement 20 *a* or may be attached to the sole arrangement 20 *a* through other means such as, for example, gluing, knitting, over-molding or any other means known to a person with ordinary skill in the art.

The sole arrangement 20 *a* for the article of footwear 10 *a* comprising, the sole arrangement extending from an end of a posterior area of the sole arrangement 24 to an end of an anterior area of the sole arrangement 34, wherein the posterior area of the sole arrangement 33 being disposed under a heel area of a foot and the anterior area of the sole arrangement 31 being disposed under a forefoot area of the foot, the sole arrangement including an upper facing surface 18 and a ground engaging surface 19, wherein the upper facing surface 18 being on an opposite side of the sole arrangement than the ground engaging surface19. The sole arrangement including a maximum posterior depth value, wherein the maximum posterior depth value measuring a thickest position or a position with a largest depth value within the posterior area of the sole arrangement, the thickest position or a position with a largest depth value being measured at a lowest position of the upper facing surface along a lateral axis (L2) and at any position of the upper facing surface or the ground engaging surface along a longitudinal axis (L1) directly under the heel area of the foot. For example, the maximum posterior depth value may be formed within the posterior area 23 at a position of H3*a*, H3*b* or at any position within the posterior area of the sole arrangement 33 at a lowest position of the upper facing surface 18 along a lateral axis (L2) and at any position of the upper facing surface 18 or the ground engaging surface 19 along a longitudinal axis (L1) directly under a heel area of the foot, or according to a requirement for measuring a maximum depth value, described in detail above. The sole arrangement 20 *a* including a maximum anterior depth value, wherein the maximum anterior depth value measuring a thickest position within the anterior area of the sole arrangement 31, the thickest position being measured at a lowest position of the upper facing 18 surface along a lateral axis (L2) and at any position of the upper facing surface 18 or the ground engaging surface 19 along a longitudinal axis (L1) directly under the forefoot area of the foot. For example, the maximum anterior depth value may be formed within the posterior area of the sole arrangement 31 at a position of H1*a*, H1*b* or at any position within the anterior area of the sole arrangement 33 at a lowest position of the upper facing surface 18 along a lateral axis (L2) and at any position of the upper facing surface 18 or the ground engaging surface 19 along a longitudinal axis (L1) directly under a forefoot area of the foot, or according to a requirement for measuring a maximum depth value, described in detail above. The maximum anterior depth value being larger than the maximum posterior depth value by a difference depth value, the difference depth value being a predetermined depth value, the posterior area of the sole arrangement extending from the end of the posterior area of the sole arrangement 24 to an intermediate area of the sole arrangement 32, wherein the intermediate area of the sole arrangement 32 connecting the posterior area of the sole arrangement 33 with the anterior area of the sole arrangement 31, the anterior area of the sole arrangement extending from the end of the anterior area of the sole arrangement 34 to the intermediate area of the sole arrangement 32, the ground engaging surface 19 transitioning from the posterior area of the sole arrangement 33 to the intermediate area of the sole arrangement 32 in a substantially concave shaped form from a view of the upper facing surface 18, the ground engaging surface 19 being shaped in the intermediate area of the sole arrangement 32 in a substantially convex shaped form from the view of the upper facing surface 18, and the ground engaging surface 19 transitioning from the intermediate area of the sole arrangement 32 to the anterior area of the sole arrangement 31 in a substantially concave shaped form from the view of the upper facing surface 18.

The maximum posterior depth value may be located within the posterior area of the sole arrangement 33 at or at a similar position to a position of H1*a* or H1*b*. The maximum posterior depth value measuring a thickest position or a position with a largest depth value within the posterior area of the sole arrangement 33, wherein the thickest position or the position with the largest depth value being measured at a lowest position of the upper facing surface 18 along a lateral axis (L2) and at any position of the upper facing surface 18 or the ground engaging surface 19 along a longitudinal axis (L1) directly under a foot 66 or the bottom surface of the interior void or a bottom surface of an interior void within the posterior area of the sole arrangement 33. An area directly under the foot 66 or the bottom surface of the interior void or the bottom surface of the interior void may be an area that is directly under the foot 66 or the bottom surface of the interior void or the bottom surface of the interior void extending from an end of the posterior area 23 of the foot 66 or the bottom surface of the interior void along a longitudinal axis (L1) to an end of the anterior area 21 of the foot 66 or the bottom surface of the interior void along the longitudinal axis (L1) and in between an end of a lateral side of the foot 66 or the bottom surface of the interior void and an end of a medial side of the foot 66 or the bottom surface of the interior void along a lateral axis (L2). For example, the area directly under the foot 66 or the bottom surface of the interior void may include any position within the sole arrangement 20 or 20 *a* from a first position along the longitudinal axis (L1) establishing a first vertical line (L3 *a*) to a second position along the longitudinal axis (L1) creating a second vertical line (L3 *b*), wherein the first position along the longitudinal axis (L1) being the end of the anterior area of the foot 66 or the bottom surface of the interior void and the second position along the longitudinal axis (L1) being the end of the posterior area of the foot 66 or the bottom surface of the interior void. Furthermore, the area directly under the foot 66 or the bottom surface of the interior void may be similarly constrained along a lateral axis (L2).

Figure 6:
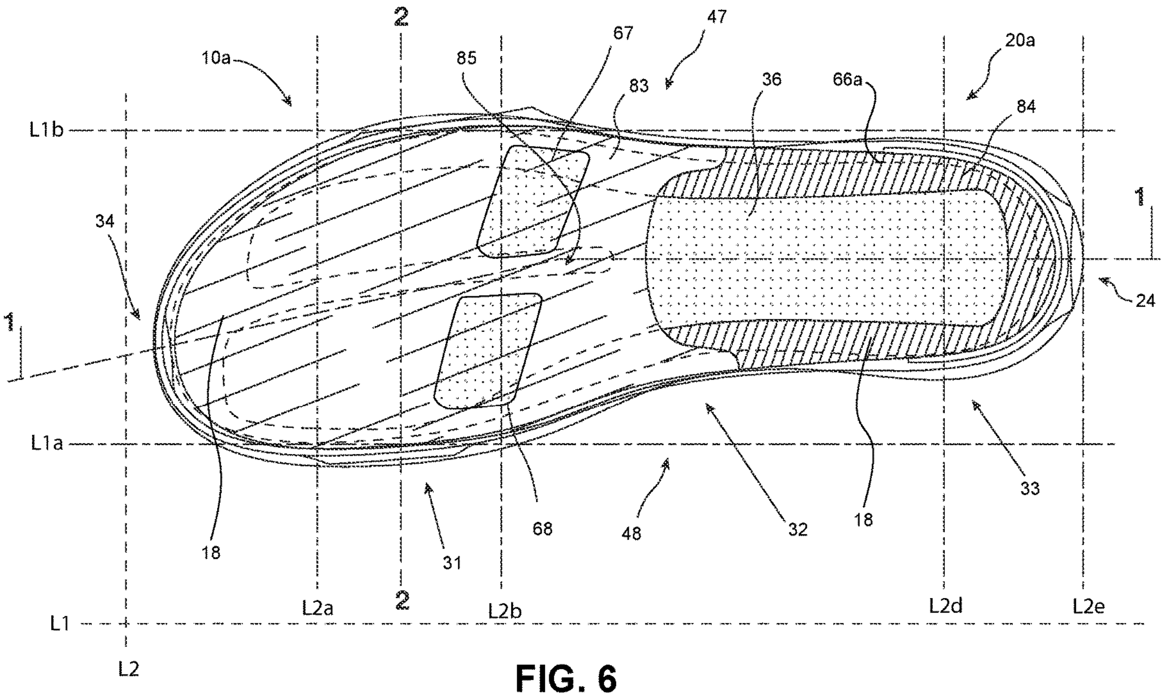
FIG. 6 is a top view of the article of footwear of FIG. 5 excluding a posterior component.

As shown in FIG. 6, the area directly under the foot 66 or the bottom surface of the interior void, as shown from a top view, may include being also vertically under an outline of the foot 66 or the bottom surface of the interior void a. The area directly under the outline of the foot 66 or the bottom surface of the interior void a may include any position within the sole arrangement 20 or 20 *a* from the end of the lateral side of the outline of the foot 66 or the bottom surface of the interior void a to the end of the medial side of the outline of the foot 66 or the bottom surface of the interior void a. For example, the end of the medial side of the foot 66 or the bottom surface of the interior void or the end of the medial side of the outline of the foot 66 or the bottom surface of the interior void a along the lateral axis (L2) at a third position being at an intersection of a first lateral line (L2 *a*) extending through the third position and a first longitudinal line (L1 *a*). As another example, the end of the lateral side of the foot 66 or the bottom surface of the interior void or the end of the lateral side of the outline of the foot 66 or the bottom surface of the interior void a along the lateral axis (L2) at a fourth position along the lateal axis (L2) being at an intersection of a second lateral line (L2 *b*) extending through the fourth position and a second longitudinal line (L1 *b*).

The sole arrangement 20 *a* may comprise a midsole 25, wherein the midsole 25 may comprise one or more portions, layers or segments, and may furthermore be a portion of one or more layers 35. The one or more layers may, for example, comprise the midsole 25, an outsole 26, a strobel, an insole or footbed, a plate 36, or a combination thereof. The strobel and the insole may or may not be specifically included in calculations, measurements or any other obtainable values or numbers due to their generic application in the disclosure. However, For the purpose of this disclosure, the strobel and the insole may be included in calculations, measurements or any other obtainable values or numbers, such as for example when a depth value of the strobel and/or a depth value of the insole is/are not generally or substantially uniform. In some applications, all calculations, measurements or any other obtainable values or numbers may apply to all of the one or more layers 35 combined, such as for example including the strobel, the insole, and/or any additional layers, and may in other applications apply to only a set of the one or more layers 35. The midsole 25 may include a first midsole portion 83 and a second midsole portion 84. The first midsole portion 83 may be formed at least partially on top of the second midsole portion 84. The first midsole portion 83 may also be formed at least partially on top of the second midsole portion 84 only in the anterior area of the sole arrangement 31 and/or the intermediate area of the sole arrangement 32, as shown in FIGS. 5-9.

The sole arrangement 20 *a* may comprise the plate 36. The plate 36 may for example, be formed from a non-foamed polymer or a composite material containing fibers such as, for example, fiberglass or carbon fibers, wherein these fibers may be relatively rigid and may additionally allow to be customized and reproduce a predetermined flexibility value. The plate 36 may be formed in or on the midsole 25 in the anterior area of the sole arrangement 31, the posterior area of the sole arrangement 33, the intermediate area of the sole arrangement 32, or a combination thereof. The plate 36 may also be embedded within the sole arrangement 20 *a*, within the midsole 25, on the upper facing surface 18, on a top surface of the midsole 40, on a bottom surface of the midsole 41, on a top surface of the outsole 26, on the ground engaging surface 19, or a combination thereof, in the anterior area of the sole arrangement 31, the posterior area of the sole arrangement 33, the intermediate area of the sole arrangement 32, or a combination thereof. For example, plate 36 may include a first sub-plate disposed on the bottom surface of the midsole 41 and a second sub-plate on the top surface of the midsole in the anterior area of the sole arrangement 31.

Figure 7:
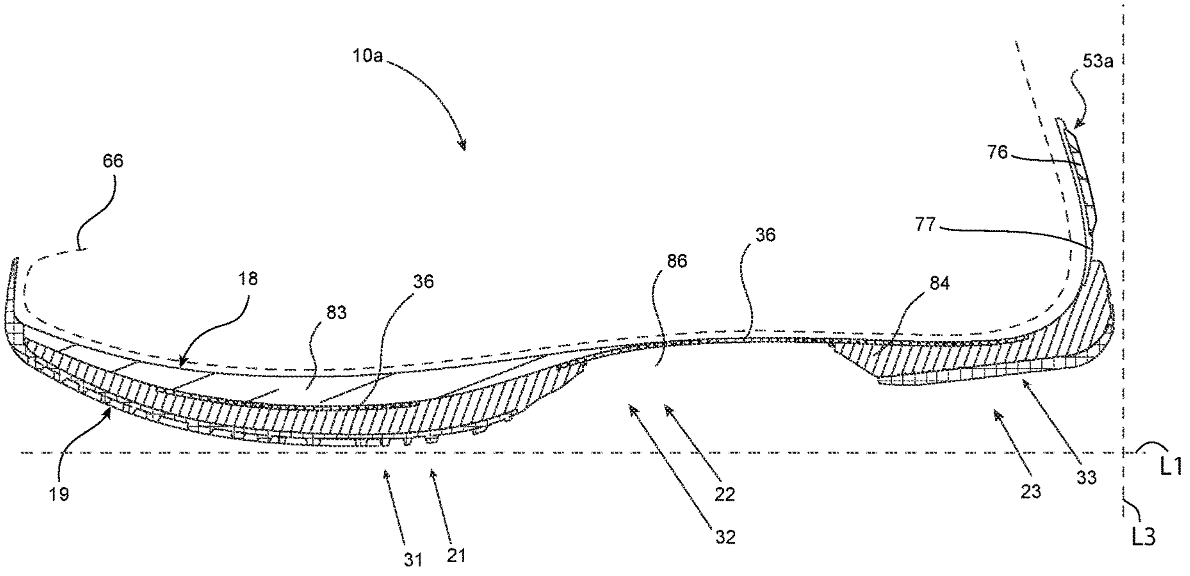
FIG. 7 is a cross-sectional view of the article of footwear of FIG. 5 taken along Line 1-1 of FIG. 6.
Figure 8:
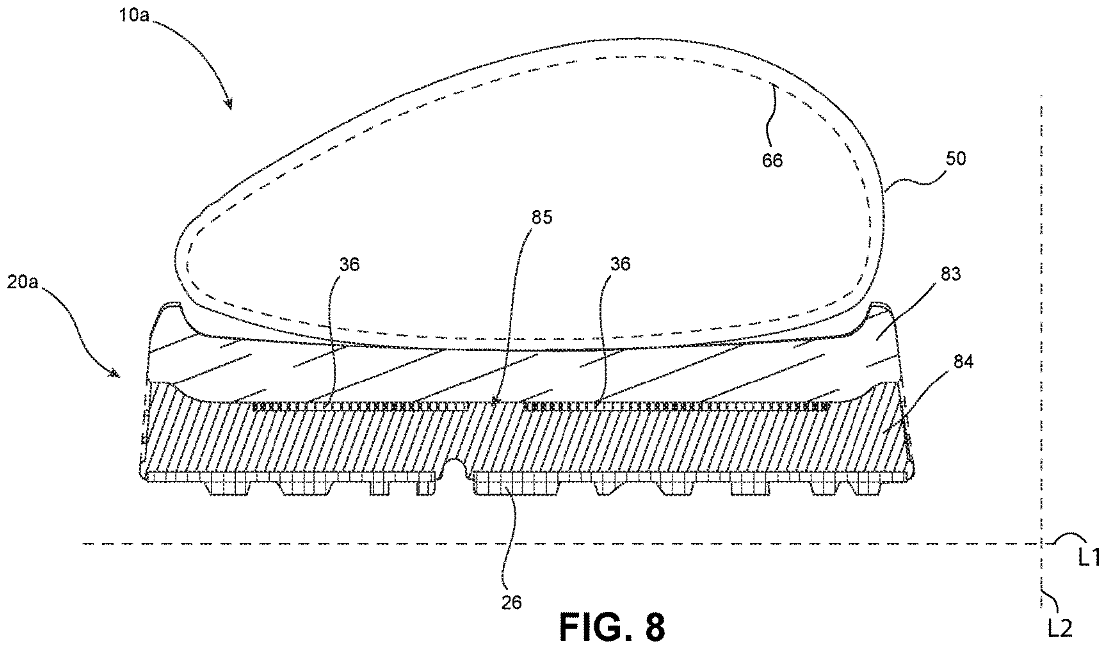
FIG. 8 is a cross-sectional view of the article of footwear of FIG. 5 taken along Line 2-2 of FIG. 6.

As shown in FIGS. 6-8, the plate 36 may be disposed within the anterior area of the sole arrangement 20 and on the top surface of the midsole 40, or be part of the upper facing surface 18, in the posterior area of the sole arrangement 33. The plate 36 may exit out of the midsole 25 in the intermediate area of the sole arrangement 32, as shown in FIGS. 6-7. The midsole 25 may comprise a first midsole portion 83 and a second midsole portion 84. The plate 36 may be disposed on a bottom surface of the first midsole portion 83 or the second midsole portion 84, on a top surface of the first midsole portion 83 or the second midsole portion 84, or a combination thereof. The plate 36 may furthermore be disposed on a bottom surface of the first midsole portion 83 in the anterior area of the sole arrangement 20 *a*, and on the top surface of the second midsole portion 84 in the posterior area of the sole arrangement 20 *a*.

The plate 36 may include one or more splits in between a lateral side 47 of the sole arrangement 20 *a* and a medial side 48 of the sole arrangement 20 *a*, as shown in FIGS. 6 and 8. The split 85 may extend from a direction of the end of the anterior area of the sole arrangement 34 in a direction towards the posterior area of the sole arrangement 33 and may terminate in the intermediate area of the sole arrangement 32. The split 85 may furthermore terminate in a middle area along a lateral axis (L2) of the intermediate area of the sole arrangement 20 *a*, wherein the middle area along a lateral axis (L2) of the intermediate area of the sole arrangement 20 *a* being behind the maximum anterior depth value. An area being behind the maximum anterior depth value may be an area on a side of the maximum anterior depth value closest to the end of the posterior area of the sole arrangement 24 along the longitudinal axis (L1). One or more of the splits in the plate 36 may extend into the intermediate area of the sole arrangement 32, the posterior area of the sole arrangement 33, completely dissect the plate 36, or a combination thereof.

The lateral axis (L2) extending from the end of the medial side 48 of the sole arrangement 20 *a* in a direction toward the lateral side 47 of the sole arrangement 20 *a*, and the longitudinal axis (L1) extending from the end of the posterior area of the sole arrangement 24 in a direction toward the end of the anterior area of the sole arrangement 34. The lowest positions along the lateral axis (L2) of the upper facing surface 18 and at any position of the upper facing surface 18 or the ground engaging surface 19 along the longitudinal axis (L1) directly under the foot 66 or the bottom surface of the interior void, further comprising the upper facing surface 18 transitioning from the posterior area of the sole arrangement 33 to the intermediate area of the sole arrangement 32 in a substantially flat or concave shaped form from a view of the ground engaging surface 19, and the upper facing surface 18 transitioning from the intermediate area of the sole arrangement 32 to the anterior area of the sole arrangement 31 in a substantially flat or convex shaped form from the view of the ground engaging surface 19, and the upper facing surface 18 in the intermediate area of the sole arrangement 32 being shaped in a substantially flat or concave shaped form from the view of the ground engaging surface 19.

A depth value of the anterior area of the sole arrangement 31 gradually decreasing along a longitudinal axis (L2) from a position of the maximum anterior depth value in a direction toward the end of the anterior area of the sole arrangement. The depth value of the anterior area of the sole arrangement 31 may also be decreasing from a first position of the maximum anterior depth value on a lateral side 47 in a direction toward a medial side 48 along the lateral axis (L2). The anterior area of the sole arrangement 31 may comprise the maximum anterior depth value at least at one or more positions including the first position of the maximum anterior depth value which may be positioned of the lateral side 47, wherein being closer to the end of the lateral side 47 as compared to the end of the medial side 48, and be farther away from the end of the posterior area of the sole arrangement 24 as compared to the end of the anterior area of the sole arrangement 34 along the longitudinal axis (L1). For example, the first position of the maximum anterior depth value may be located on the lateral side 47 along the lateral axis (L2) on lateral line L2 *b*. A second position of the maximum anterior depth value may be positioned on the medial side 48, wherein the second position of the maximum anterior depth value may be closer to the end of the medial side 48 as compared to the lateral side 47. The second position of the maximum anterior depth value may also be closer to the end of the medial side 48 as compared to the end of the lateral side 47, and may be farther away from the end of the posterior area of the sole arrangement 24 as compared to the first position of the maximum anterior depth value along the longitudinal axis (L1). The depth value of the anterior area of the sole arrangement 31 may remain substantially steady from the second position of the maximum anterior depth value in a direction toward the first position of the maximum anterior depth value and/or in a direction toward a lateral side 47 along the lateral axis (L2). When hypothetically connecting the first position of the maximum anterior depth value and the second position of the maximum anterior depth value with a straight line, the straight line being a diagonal line along with coordinates within the longitudinal axis (L1) and longitudinal axis (L2). The first position of the maximum anterior depth value may be a position wherein the maximum anterior depth value being formed for a first occurrence or a first time along the longitudinal axis (L2) from the end of the posterior area of the sole arrangement 24 in a direction toward the end of the anterior area of the sole arrangement 34. The second position of the maximum anterior depth value may be a position wherein the maximum anterior depth value being formed for a first occurrence or a first time on the medial side 48 along the longitudinal axis (L2) from the end of the posterior area of the sole arrangement 24 in a direction toward the end of the anterior area of the sole arrangement 34.

A depth value of the posterior area of the sole arrangement 33 gradually decreasing along a longitudinal axis (L1) from a position of the maximum posterior depth value in a direction toward the end of the posterior area of the sole arrangement 24. A lateral segment 67 or the lateral side 47 of the anterior area of the sole arrangement 31 comprising a maximum lateral depth position including a maximum lateral depth value, wherein the maximum lateral depth value being substantially equal to the maximum anterior depth value, a medial segment 68 or the medial side 48 of the anterior area of the sole arrangement 31 comprising a maximum medial depth position including a maximum medial depth value, wherein the maximum medial depth value being substantially equal to the maximum anterior depth value, and the maximum lateral depth position may be farther away from the end of the anterior area of the sole arrangement 34 than the maximum medial depth position by a first difference distance value, wherein the first difference distance value being a predetermined distance value between the maximum lateral depth position and the maximum medial depth position along the longitudinal axis (L1).

The maximum lateral depth position may be closer to the end of the posterior area of the sole arrangement 24 than the maximum medial depth position by a second difference distance value, wherein the second difference distance value being a predetermined distance value between the maximum lateral depth position and the maximum medial depth position along a longitudinal axis. The first difference distance value may be substantially same as the second difference distance value or different. The first difference distance value and the second difference distance value may be different when the lateral segment 67 or the lateral side 47 of the sole arrangement 20 *a* comprises a plurality of positions including a maximum lateral anterior depth value each, and the medial segment 68 or the medial side 48 of the sole arrangement 10 *a* comprises at least one or more positions with a maximum medial anterior depth value each. For a purpose of measuring a distance from an end of the sole arrangement, including an end of the posterior area of the sole arrangement 24 or an end of the anterior area of the sole arrangement 34, to a maximum anterior depth value, including a maximum medial anterior depth value or a maximum lateral anterior depth value, a first maximum anterior depth position comprising the maximum anterior depth value positioned closest or nearest to the end of the sole arrangement may be selected. The sole arrangement 20 *a* may comprise one or more maximum anterior depth positions including the first maximum anterior depth value. From one or more maximum anterior lateral depth positions, a maximum anterior lateral depth position including a maximum anterior lateral depth value positioned or located closest or nearest to the end of the anterior area of the sole arrangement 34 along a longitudinal axis (L1) may be utilized for measuring a distance between the maximum anterior lateral depth position or the maximum anterior lateral depth value and the end of the anterior area of the sole arrangement 34 when calculating a difference distance between the maximum anterior lateral depth position or value and a maximum medial medial depth position or value in relation to the end of the anterior area of the sole arrangement 34. When calculating a difference distance between a maximum anterior medial depth value or position and a maximum anterior lateral depth value or position in relation to the end of the posterior area of the sole arrangement 24, from one or more maximum anterior lateral depth positions, a maximum anterior lateral depth position including a maximum anterior lateral depth value positioned or located closest or nearest to the end of the posterior area of the sole arrangement 24 along a longitudinal axis (L1), and from one or more maximum anterior medial depth positions, a maximum anterior medial depth position including a maximum anterior medial depth value positioned or located closest or nearest to the end of the posterior area of the sole arrangement 24 along a longitudinal axis (L1) may be utilized.

The lateral segment 67 being formed in the lateral side 47 of the anterior area of the sole arrangement 31, wherein the lateral segment 67 including a maximum lateral depth position with a depth value being substantially equal to the maximum anterior depth value, and the medial segment 68 being formed in the anterior area of the sole arrangement 31, wherein the medial segment 68 including a maximum medial depth position with a depth value being substantially equal to the maximum anterior depth value. The maximum lateral depth position being spaced apart from the maximum medial depth position along a longitudinal axis (L1) by a difference distance value, wherein the maximum lateral depth position being closer to the end of the posterior area of the sole arrangement than the maximum medial depth position along a longitudinal axis (L1) by the difference distance value. The lateral segment 67 being formed backward form the medial segment 68, and the medial segment 68 being formed forward of the lateral segment 67.

In an exemplary embodiment, the sole arrangement 20 *a* may include a maximum intermediate depth value, wherein the maximum intermediate depth value measuring a thickest position with a largest depth value within the intermediate area of the sole arrangement 32, along a lateral axis (L2) or direction and a longitudinal axis (L1) or direction, and directly under an intermediate area of the foot. The maximum intermediate depth value being measured at a position being spaced apart along a longitudinal axis (L1) from the anterior area of the sole arrangement by a first distance value, the posterior area of the sole arrangement 33 by a second distance value, or both. The first distance value and the second distance value may be substantially equal to each other or different from each other. The maximum anterior depth value may be larger than the maximum intermediate depth value by a second difference depth value and the maximum posterior depth value may be larger than the intermediate depth value by a third difference depth value.

The intermediate area of the sole arrangement 32 connecting the posterior area of the sole arrangement 33 with the anterior area of the sole arrangement 31 by an arch-shaped or bow-shaped form and may thereby create an intermediate gap 30 between the posterior area of the sole arrangement 33 and the anterior area of the sole arrangement 31. The intermediate gap 30 may also be shaped in any other form. The intermediate gap 30 may provide a disconnection between the intermediate area of the sole arrangement 32 and a ground surface (L4) during a period of time when the posterior area of the sole arrangement 33 and the anterior area of the sole arrangement 31 are in contact with the ground surface. The intermediate gap 30 may be formed in between an anterior facing sidewall 71 of the posterior area of the sole arrangement 33 and a posterior facing sidewall 70 of the anterior area of the sole arrangement 31. The intermediate area of the sole arrangement 32 may be void of an outsole 26, and only comprise an anterior area of the outsole 27 and a posterior area of the outsole 29.

The sole arrangement 20 *a* may further comprise a striking area 72, wherein the striking area 72 may include an area where the intermediate area of the sole arrangement 32 transitioning toward and into the anterior area of the sole arrangement 31. The striking area 72 may be increasing in depth value from a direction of the posterior area of the sole arrangement 33 to and/or beyond a position of the maximum anterior depth value at a predetermined transition rate. The predetermined transition rate may be relative to an increase in depth value over a predetermined striking area distance value, or vice versa. The striking area may include an area in which it may substantially maintain a depth value, decrease in depth value at a second transition rate, or a combination of both, from the position of the maximum anterior depth value in a direction toward the end of the anterior area of the sole arrangement 34. The position of the maximum anterior depth value may be formed in the lateral section 67, medial section 68, or both. The lateral section 67 and medial section 68 may include a plurality of maximum anterior depth values each. The lateral section 67 may include a plurality of maximum anterior depth values and the medial section 68 may include one or more maximum anterior depth values. The first transition rate may be different or substantially same as the second transition rate. The first transition rate may be a higher value than the second transition rate, where the first transition rate creating a steeper slope than a slope of the second transition rate. The lateral section 67 and medial section 68 may be positions or areas within the sole arrangement 20 *a*.

A lateral side 47 of the striking area 72, e.g. lateral section 47, may include the area substantially maintaining the depth value for a first striking distance value. A medial side 48 of the striking area 72, e.g. medial section 48, may include the area substantially maintaining the depth value for a second striking distance value. The second striking distance value may be smaller than the first striking distance value by a difference striking distance value or may be substantially a same striking distance value. The second striking distance value may be smaller than the first striking distance value and thereby enable a faster or higher rate transition from landing and striking to lift off of the sole arrangement 20 *a*, 20, for the medial side 48 of the sole arrangement 20 *a*, 20, as compared to the lateral side 47 of the sole arrangement 20 *a*, 20. The striking area 72 may be formed on the posterior facing sidewall 70, on a sub-surface of the ground engaging surface 19 within the anterior area of the sole arrangement 31 wherein a depth value of the sole arrangement 20 *a*, 20, increasing in value along a direction from the posterior area of the sole arrangement 33 toward the end of the anterior area of the sole arrangement 34 along the longitudinal axis (L1), or a combination of both.

First Component 76 may be formed in the top area of the medial component 51 and may, in an exemplary embodiment, not be present below and/or around the top of the intermediate component 78.

The maximum intermediate depth value may be smaller than the maximum anterior depth value and the maximum posterior depth value. Furthermore, the midsole 25 in the intermediate area of the sole arrangement 32 may include a depth value along the longitudinal axis (L1) and the lateral axis (L2), or a subsection along both the longitudinal axis (L1) and the lateral axis (L2), that is smaller by at least 10% than the maximum anterior depth value and/or the maximum posterior depth value. The midsole may also, for example, comprise a midsole void 86 directly under a foot in the intermediate area of the sole arrangement 32 for a predetermined length along the lateral axis (L2) and for another predetermined length along the longitudinal axis (L1), as shown in FIG. 7.

Figure 9:
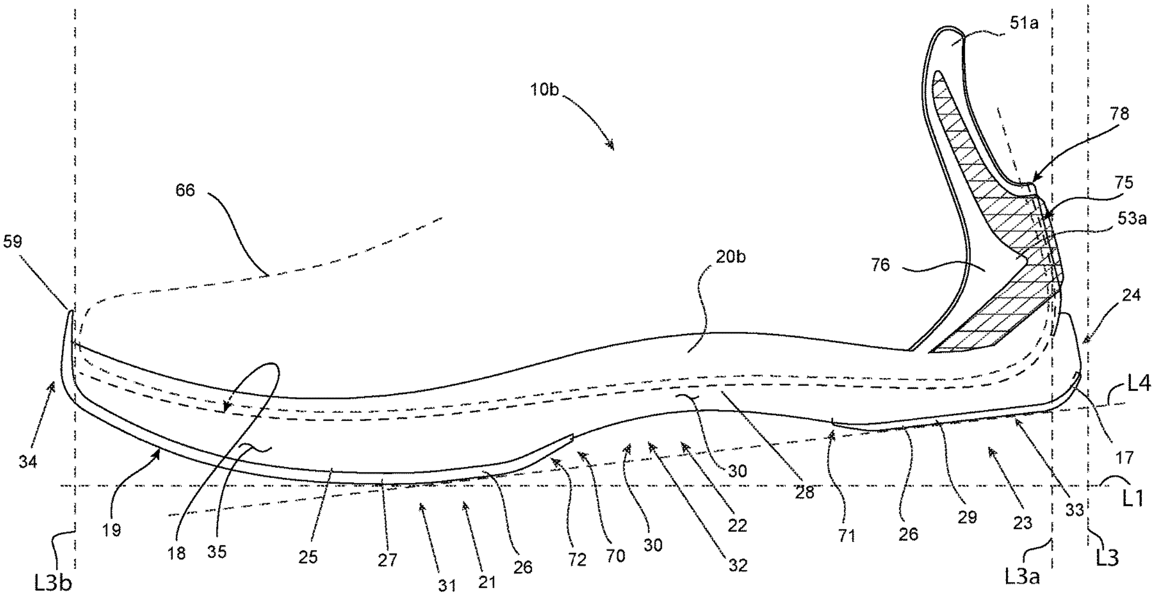
FIG. 9 is a side view of a medial face of an article of footwear incorporating a sole arrangement in accordance with the principles and features of the present disclosure.
Figure 10:
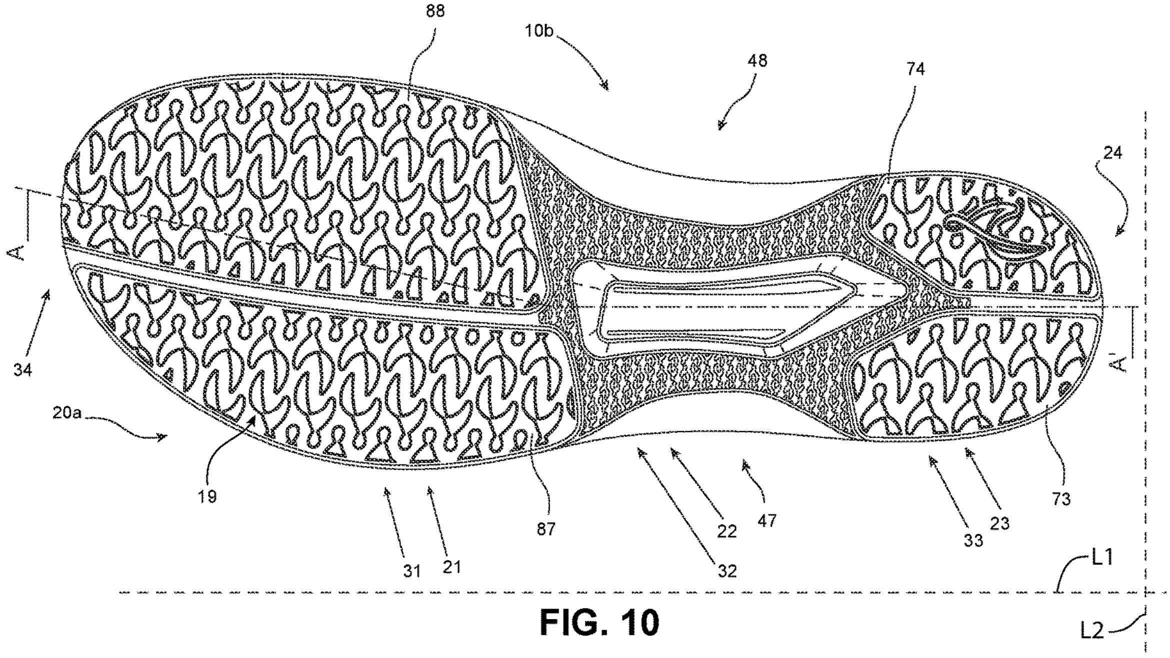
FIG. 10 is a bottom view of the article of footwear of FIG. 9.
Figure 11:
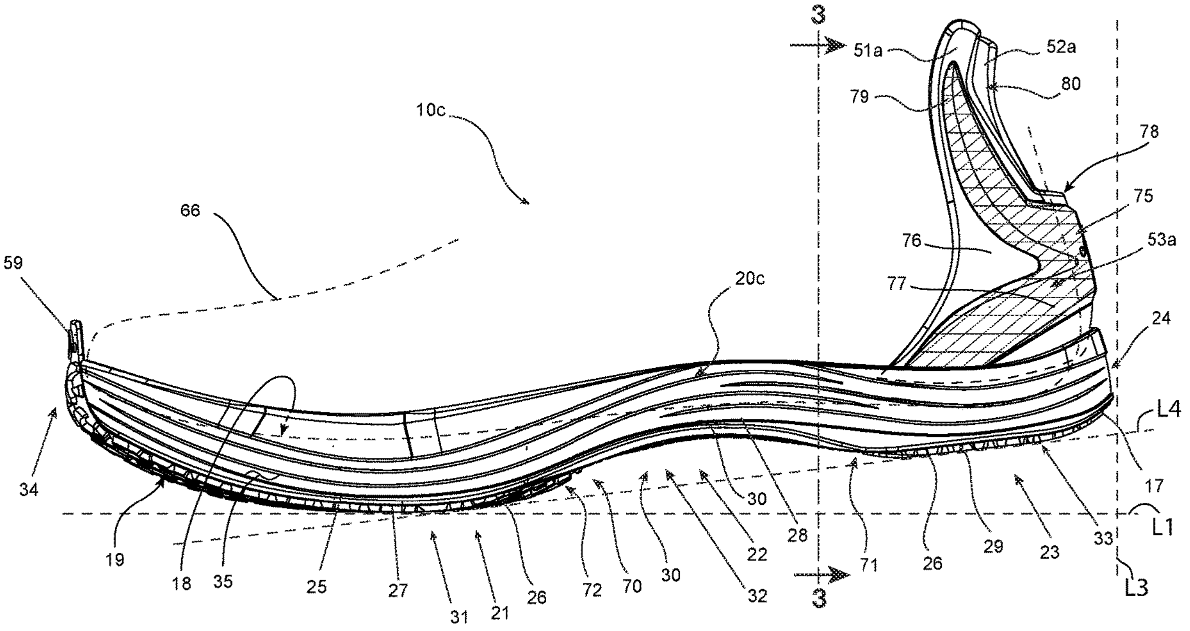
FIG. 11 is a medial side view of an article of footwear incorporating a sole arrangement in accordance with the principles and features of the present disclosure.
Figure 12:
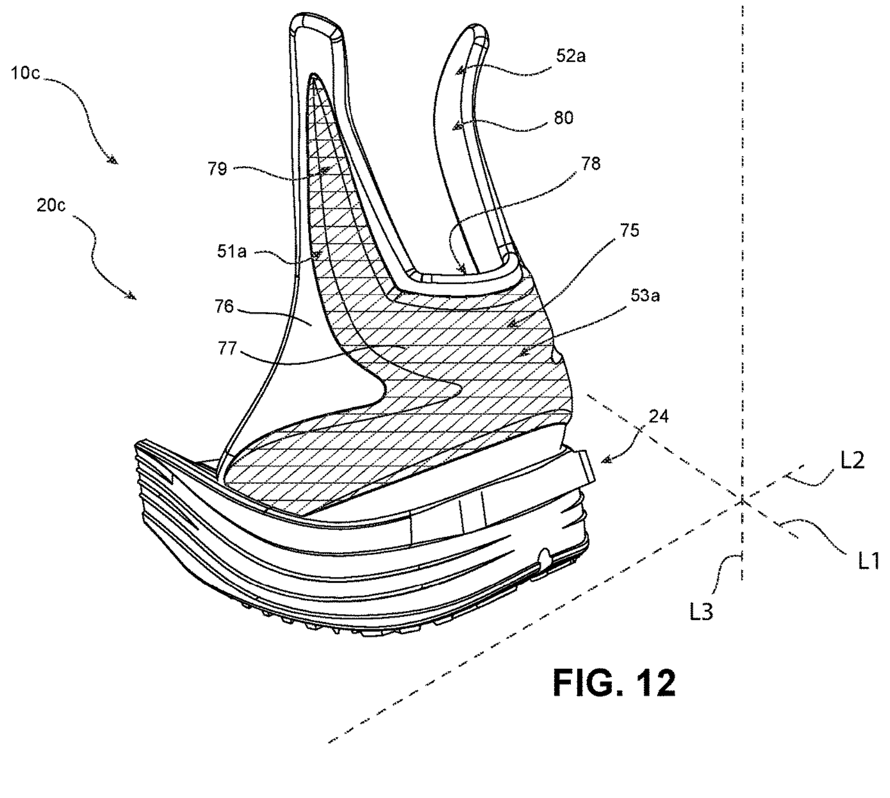
FIG. 12 is a partial perspective view of a back of the article of footwear of FIG. 11 taken along Line 3-3 of FIG. 11.
Figure 13:
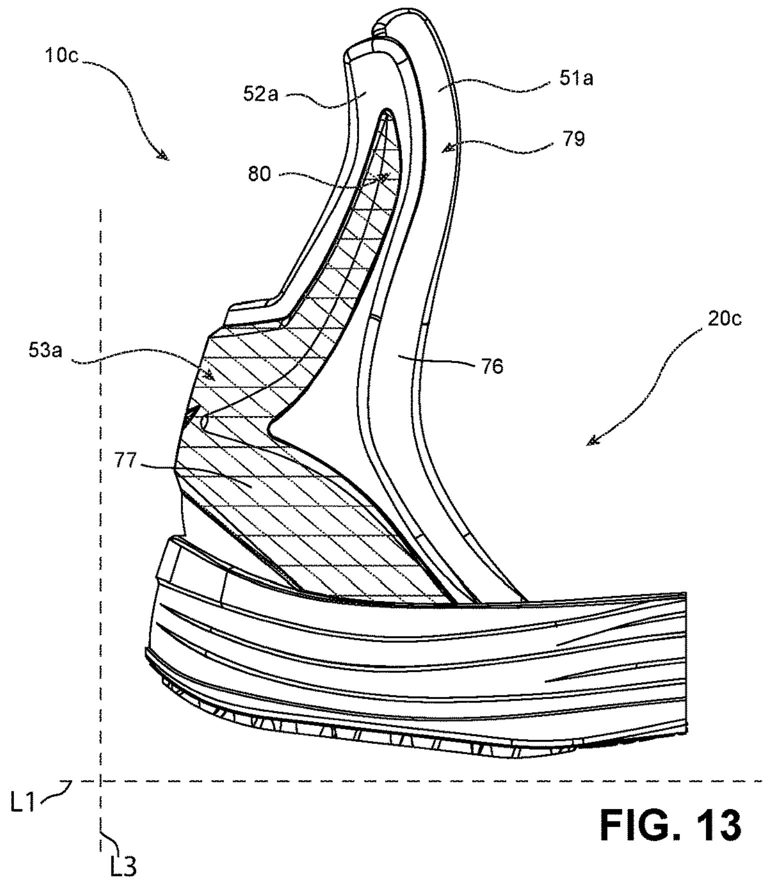
FIG. 13 is a partial lateral side view of the article of footwear of FIG. 11 taken along Line 3-3 of FIG. 11.
Figure 14:
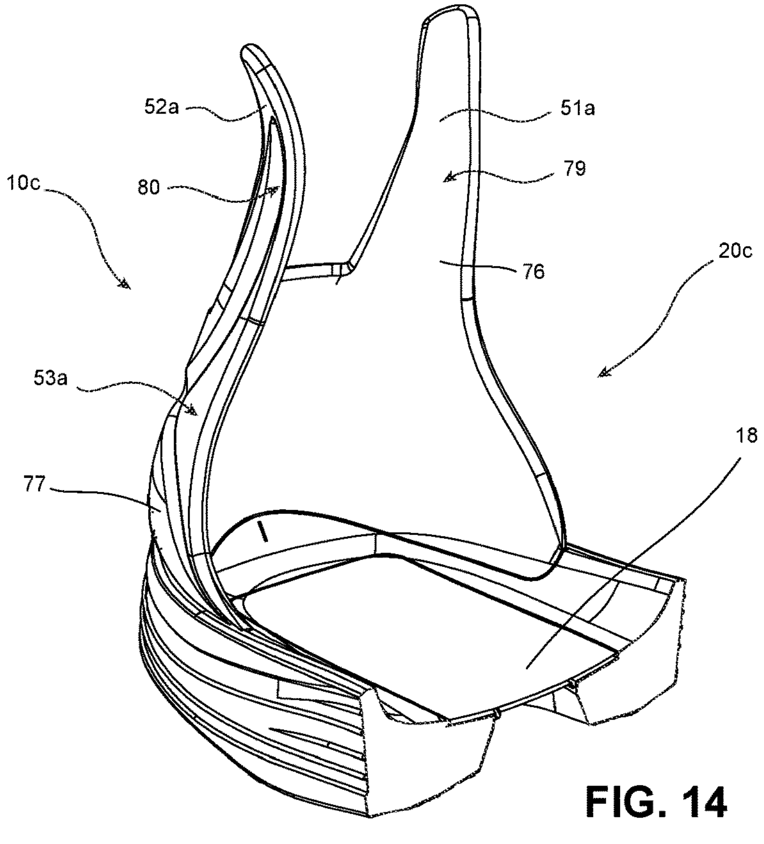
FIG. 14 is a partial perspective view of an interior posterior area of the article of footwear of FIG. 11 taken along Line 3-3 of FIG. 11.
Figure 15:
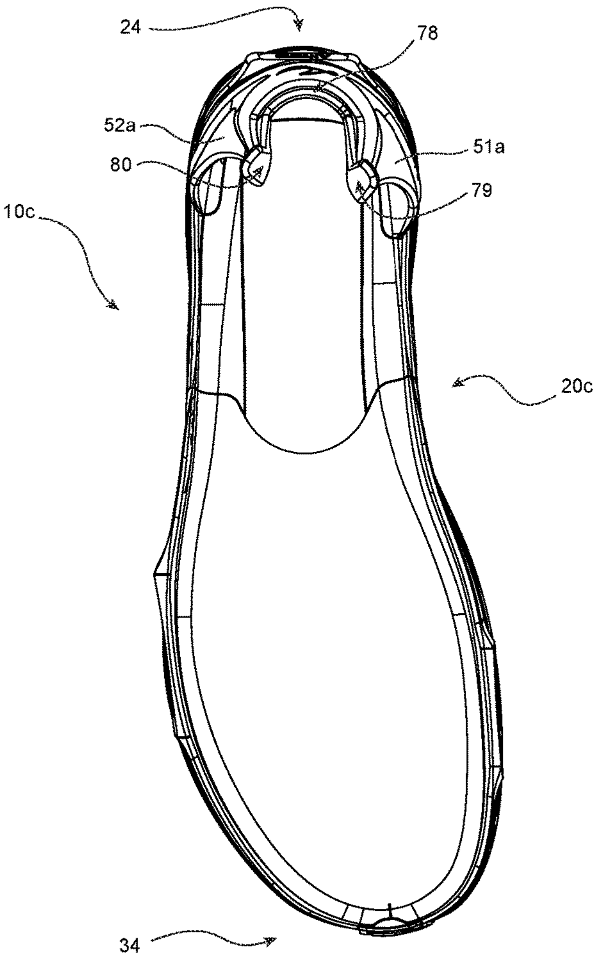
FIG. 15 is a top view of the article of footwear of FIG. 11.
Figure 16:
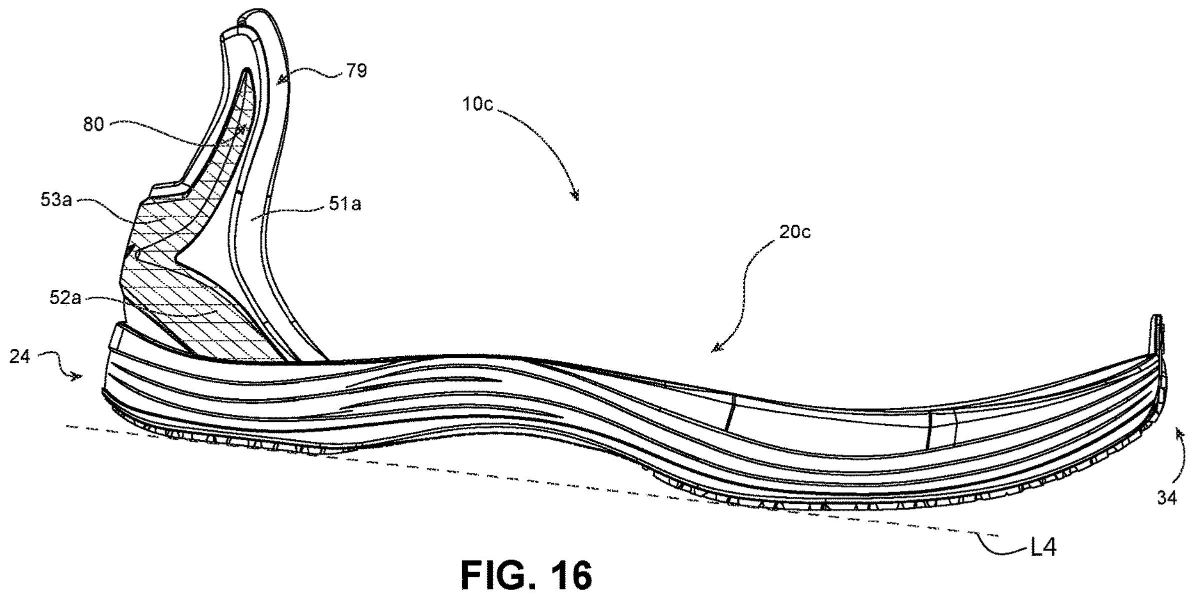
FIG. 16 is a lateral side view of the article of footwear of FIG. 11.

With particular reference to FIGS. 9-10, a sole arrangement for an article of footwear 10 *b* is provided. Due to the substantial similarity between the articles of footwear 10, 10 *a* and 10 *b* in arrangement and functionality of their components, same reference numerals are used hereinafter and in the drawings to identify same or similar components, wherein same reference numerals including letter extensions are used to identify components that may have been modified.

The sole arrangement 20 *a* extending from an end of a posterior area of the sole arrangement 24 to an end of an anterior area of the sole arrangement 34, wherein the posterior area of the sole arrangement 24 being disposed or formed under a heel area of a foot, including a side view surface 66 of the foot and a top view surface 66 *a* of a bottom surface the foot, and the anterior area of the sole arrangement 31 being disposed or formed under a forefoot area of the foot. The sole arrangement 10 *a* including an upper facing surface 18 and a ground engaging surface 19, wherein the upper facing surface 18 being formed on an opposite side of the sole arrangement 20 *a*, 20, than the ground engaging surface. The sole arrangement including a maximum posterior depth value, wherein the maximum posterior depth value measuring a thickest position within the posterior area of the sole arrangement 33 directly under the foot, the top view surface 66 *a* of the bottom surface of the foot, upper facing surface 18, or a combination thereof. The sole arrangement 20 *a* including a maximum anterior depth value, wherein the maximum anterior depth value measuring a thickest position within the anterior area of the sole arrangement 31 directly under the forefoot area of the foot or the upper facing surface 18.

The maximum anterior depth value being substantially equal to the maximum posterior depth value, smaller than the maximum posterior depth value or larger than the maximum posterior depth value by a predetermined difference value. The posterior area of the sole arrangement extending from the end of the posterior area of the sole arrangement 24 to an intermediate area of the sole arrangement 32, wherein the intermediate area of the sole arrangement 32 being a transition area from the posterior area of the sole arrangement 33 to the anterior area of the sole arrangement 31 and may be part of the posterior area of the sole arrangement 33, the anterior area of the sole arrangement 31, both or being a separate area by itself. The anterior area of the sole arrangement 31 extending from the end of the anterior area of the sole arrangement 34 to the intermediate area of the sole arrangement 32.

The ground engaging surface 19 in the posterior area of the sole arrangement 33 including at least a first segment 73 and a second segment 74, wherein the first segment 73 may be of a first length and/or substantially flat and formed at a lateral side 47 of the sole arrangement 20, 20 *a*, and wherein the second segment 74 may be of a second length and/or substantially flat and formed at a medial side 48 of the sole arrangement 20, 20 *a*. The ground engaging surface 19 in the anterior of the sole arrangement 31 including at least a third segment 87 and a fourth segment 88, wherein the third segment 87 may be of a third length and formed at the lateral side 47 of the sole arrangement 20, 20 *a*, and wherein the fourth segment 88 being of a fourth length and formed at the medial side 48 of the sole arrangement 20, 20 *a*. The first segment 73 may be rotated or angled towards the third segment 87 in a manner where during a contact with a ground surface (L4) a first engagement length of the first segment and at least partially or a third engagement length of the third segment may come in contact with, or engage, the ground surface (L4) at substantially a same time. The second segment 74 may be rotated or angled towards the fourth segment 88 in a manner where during the contact with the ground surface (L4) a second engagement length of the second segment 74 and at least partially, or a fourth engagement length, the fourth segment 88 being in contact with the ground surface (L4) substantially simultaneously. The first engagement length and the second engagement length may be along the longitudinal axis (L1) and of a same length or different lengths. The third engagement length and the fourth engagement length may be along the longitudinal axis (L1) and of a same length or different lengths.

The third segment 87 including at least partially the lateral segment 67 and the fourth segment 88 including at least partially the medial segment 68, wherein the third segment 87 and the fourth segment 88 may at least partially come in contact with, or engage, the ground surface substantially simultaneously. The medial segment 68 of the fourth segment 88, or the fourth segment 88, being closer to the end of the anterior area of the sole arrangement 34 than the lateral segment 67 of the third segment 87, or the third segment 87, along a longitudinal axis (L1) by a third length. The fourth segment 88, or the medial segment 68 of the fourth segment 88, may be farther away from the end of the posterior area of the sole arrangement 24 than the third segment 87, or the lateral segment 67 of the third segment 87, along the longitudinal axis (L1) by a fourth length. The first segment 73 may be rotated or angled towards the third segment 87 at a first angle and the second segment 74 may be rotated or angled towards the fourth segment 88 at a second angle, wherein the first angle and the second angle may be measured relative to the upper facing surface 18 or the ground surface 19. The first angle and the second angle may be substantially a same angle or different angles.

A predetermined length of the ground engaging surface 19 in the intermediate area of the sole arrangement 32 along the longitudinal axis (L1) may not be in contact with, or engage, the ground surface (L4), that may be substantially flat, at a same time when the first segment, the second segment, the third segment and the fourth segment may be in contact with the ground surface (L4), which may be substantially flat. A depth value of the intermediate area of the sole arrangement 32 may be gradient and gradually decrease from a direction of the end of the posterior area of the sole arrangement 24 in a direction toward the anterior area 21, and subsequently the depth value of the intermediate area of the sole arrangement 32 may gradually increase from a direction of the posterior area 23 toward the end of the anterior area of the sole arrangement 34, and thereby a lower portion of the sole arrangement 20 *a* may be separated between the posterior area of the sole arrangement 33 and the anterior area of the sole arrangement 31 by a gap within the intermediate area of the sole arrangement 32.

The sole arrangement 20 *a* may comprise a predetermined length of the ground engaging surface 19 in the intermediate area of the sole arrangement 32 along the longitudinal axis (L1) including a depth value that is smaller than the maximum anterior depth value and the maximum posterior depth value by at least a predetermined depth value. Furthermore, the ground engaging surface 19 may comprise a predetermined length along the longitudinal axis (L1) in the first segment 73 and the second segment 74 may be substantially flat, angled at substantially a same angle and including a substantially same maximum depth value along a lateral axis (L2) for the predetermined length, wherein the predetermined length in the first segment 73 and the second segment 74 may be at a same position or different positions along the longitudinal axis (L1).

In one implementation, the article of footwear 10 *b* and/or the sole arrangement 20 *b* may comprise a first component 76 of a posterior component 53 *a* being formed jointly with a component of the sole arrangement 20 *b* having a depth value and being part of one or more layers 35, such as a midsole 25, a plate 36, an outsole 25 or a combination thereof. In another implementation, the article of footwear 10 *b* and/or the sole arrangement 20*b* may comprise the first component 76 of the posterior component 53*a* being formed separately from any component of the sole arrangement 20*b* having a depth value and being part of one or more layers 35, such as a midsole 25, a plate 36, an outsole 25 or a combination thereof.

With particular reference to FIGS. 11-16, a sole arrangement 20*c* for an article of footwear 10*c* is provided. Due to the substantial similarity between the articles of footwear 10, 10*a*, 10 *b* and 10*c* in arrangement and functionality of their components, same reference numerals are used hereinafter and in the drawings to identify same or similar components, wherein same reference numerals including letter extensions are used to identify components that may have been modified.

The article of footwear 10*c* may include an upper 50 (see FIG. 1), where the upper 50 may be attached to the sole arrangement 20*c*. The sole arrangement 20*c* extending from an end of a posterior area of the sole arrangement 24 to an end of an anterior area of the sole arrangement 34, wherein the posterior area of the sole arrangement 24 being formed in and/or under a heel area of a foot and the anterior area of the sole arrangement 34 being formed under and/or in a forefoot area of the foot, an intermediate area of the foot, or both. The sole arrangement 20*c* including an upper facing surface 18 and a ground engaging surface 19, wherein the upper facing surface 18 being formed on an opposite side of the sole arrangement 20*c* than the ground engaging surface 19. The sole arrangement 20*c* may include a posterior component 53*a*, wherein the posterior component 53*a* may extend from a direction of the upper facing surface 18 of the posterior area of the sole arrangement 24 in a direction away from the upper facing surface 18 and away from the ground engaging surface 19. The posterior component 53*a* may at least partially extend vertically above the upper facing surface 18 along a vertical axis (L3), wherein the upper facing surface may be above the ground engaging surface 19. The posterior component 53*a* comprising a lateral component 52, a medial component 51, a middle component 75 or a combination thereof. The lateral component 52 and the medial component 51 may be extending beyond and above the middle component 75, a back portion of an upper, the end of the posterior area of the sole arrangement 24, or a combination thereof. The lateral component 52 may be extending into or through an area in-between a lateral malleolus bone of the foot and an Achilles tendon of the foot, the medial component 51 may be extending into or through an area in-between a medial malleolus bone of the foot and the Achilles tendon of the foot, and the intermediate component 75 may be extending to an area of an end of a top of a calcaneus bone of the foot.

The posterior component 53*a* may comprise a first component 76, wherein the first component 76 may include a first predetermined compression hardness value or hardness value (compression hardness value and hardness value may be used interchangeably throughout the disclosure). The posterior component 53*a* may also comprise a second component 77, wherein the second component 77 may include a second predetermined compression hardness value. The first component 76 may include a lower compression hardness value than the second component 77, and may thereby cause the first component 76 to be softer than the second component 77. The first component 76 may be disposed between the second component 77 and an interior void 60 of the article of footwear 10*c*.

The posterior component 53*a* may be attached to an upper. The posterior component 53, 53*a* may be attached to a surface on an opposite side of an interior surface 61 of the upper 50 or it may be embedded within upper 50. As shown in FIG. 1, posterior component 53*a*, 53 may include a medial internal component 63, a lateral internal component 64, an intermediate internal component or a combination thereof. The medial internal component 63, the lateral internal component 64 and the intermediate internal component may have the same functionalities and properties as the medial component 51*a*, the lateral component 52*a* and the intermediate component 75, respectively. However, the medial internal component 63, the lateral internal component 64 and/or the intermediate internal component may be at least partially be embedded with the upper 50 or internal and thereby may at least partially be hidden from an external view.

The posterior component 53*a* may include the first component 76, the second component 77, or both. The medial component 51*a* may include a medial portion of the first component 76, the second component 77, or both. The lateral component 52*a* may include a lateral portion of the first component 76, second component 77, or both. The medial component 51*a* may also include a medial portion and at least partially the intermediate component 75 of the first component 76, second component 77, or both. The lateral component 52*a* may include a lateral portion and at least partially the intermediate component 75 of the first component 76, second component 77, or both.

The posterior component 53*a* of the sole arrangement 20*c* may furthermore include that the first component 76 being constructed by a first material with a first hardness value, wherein the first material may be formed by thermosetting polymers, elastomers or rubbers, wherein the thermosetting polymers, elastomers or rubbers may form a closed-cell foam or construction, or on the other hand an open-cell foam or construction. The first material may generally include a first hardness value. The second component 77 may be constructed by a second material with a second hardness value, wherein the second material may be formed by thermoplastic polymers, elastomers or rubbers, wherein the thermoplastic polymers, elastomers or rubbers may form a closed-cell foam or construction, or on the other hand an open-cell foam or construction. The second component 77 may also be formed or constructed with the second material being a semi-rigid material such as, for example, a non-foamed polymer or a composite material containing fibers such as, for example, fiberglass or carbon fibers, wherein these fibers may be relatively rigid and may additionally allow to be customized and reproduce a predetermined flexibility value. The second material may generally include a second hardness value, wherein the second hardness value may be larger than the first hardness value by a predetermined value.

A compression hardness value or a hardness value may fall on a certain scale where higher values or numbers on the scale indicate a greater resistance to indentation and therefore harder materials. On the other hand, lower numbers indicate less resistance and therefore softer materials. Therefore, the first component 76 may be formed from a softer material and/or more susceptible to deformation as compared to the second component 77, and the second component 77 may be formed form a harder material and/or less susceptible to deformation as compared to the first component 76.

The first component 76 may extend from a direction of the upper facing surface 18 in a direction away and/or above from the upper facing surface 18 and away from the ground engaging surface 19. The first component 76 may be part of the intermediate component 75, the lateral component 52*a*, the medial component 51*a*, or a combination thereof. The first component 76 in the lateral component 52*a* may extend beyond and/or above the intermediate component 75 by a first lateral distance from a top of the intermediate component 75. The first component 76 in the medial component

51*a* may extend beyond and/or above the intermediate component 75 by a first medial distance from the top of the intermediate component 75. The first component 76 in the lateral component 52*a* may extend into and/or through an area in-between a lateral malleolus bone of the foot and an Achilles tendon of the foot. The first component 76 in the medial component 51*a* may be extending through and/or into an area in-between a medial malleolus bone of the foot and the Achilles tendon of the foot. The first lateral distance may be smaller than the first medial distance by a predetermined first component difference value or amount.

The second component 77 may extend from a direction of the upper facing surface 18 in a direction away and/or above from the upper facing surface 18 and away from the ground engaging surface 19. The second component 77 may be part of the intermediate component 75, the lateral component 52*a*, the medial component 51*a*, or a combination thereof. The second component 77 in the lateral component 52*a* may extend beyond and/or above the intermediate component 75 by a second lateral distance from the top of the intermediate component 75. The second component 77 in the medial component 51*a* may extend beyond and/or above the intermediate component 75 by a second medial distance from the top of the intermediate component 75. The second component 77 in the lateral component 52*a* may extend into and/or through the area in-between the lateral malleolus bone of the foot and the Achilles tendon of the foot. The second component 77 in the medial component 51*a* may be extending through and/or into the area in-between the medial malleolus bone of the foot and the Achilles tendon of the foot. The second lateral distance may be smaller than the second medial distance by a second component difference amount or value. The second lateral distance may be smaller than the first lateral distance by a lateral component difference amount or value. The second medial distance may be smaller than the first medial distance by a medial component difference amount or value. The lateral component difference value and the medial component difference value may be along a vertical axis (L3).

A top area of the lateral component 80, and/or the lateral component 52*a*, and a top area of the medial component 79, and/or the medial component 51*a*, may be spaced apart along the longitudinal axis (L1). The top area of the medial component 79, and/or the medial component 51*a*, may be formed forward from the top area of the lateral component 80, and/or the lateral component 52*a*, along the longitudinal axis (L1) by a first longitudinal distance value. The first longitudinal distance value may for example be within a range of 2.5 millimeters and 12.5 millimeters. The first longitudinal distance value may in another example be within a range of 2.5 millimeters and 7.5 millimeters.

The intermediate component 75 may include an intermediate component height value, wherein the intermediate component height value may be measured along the vertical axis (L3) from a lowest point of the upper facing surface 18 in the posterior area of the sole arrangement 33 to a top of the intermediate component 78. The lateral component 52*a* may include a lateral component height value, wherein the lateral component height value may be measured along the vertical axis (L3) from the lowest point of the upper facing surface 18 in the posterior area of the sole arrangement 33 to a most forward point of the top area of the lateral component 80, wherein the most forward point of the top area of the lateral component 80 being along the longitudinal axis (L1). The medial component 51*a* may include a medial component height value, wherein the medial component height value may be measured along the vertical axis (L3) from the lowest point of the upper facing surface 18 in the posterior area of the sole arrangement 33 to a most forward point of the top area of the medial component 79, wherein the most forward point of the top area of the medial component 79 being along the longitudinal axis (L1). The lowest point of the upper facing surface 18 may a lowest resting point where the foot may directly rest on or be seated on.

The lateral component 52*a* and the medial component 51*a* may be disposed above the intermediate component 75 by at least a first height difference value, wherein the first height difference value may be a height value being a smallest height value from a set of components difference height measurements, wherein the set of components difference height measurements include height values along the vertical axis (L3) being measured from the top of the intermediate component 78 to the top of the lateral component or to the most forward point of the top area of the lateral component along the longitudinal axis (L1), and from the top of the intermediate component 78 to the top of the lateral component or to the most forward point of the top area of the medial component along the longitudinal axis (L1). The first height difference value may include in its measurements either the top of the lateral component and the top of the medial component, or the most forward point of the top area of the lateral component along the longitudinal axis (L1) and the most forward point of the top area of the medial component along the longitudinal axis (L1). The first height difference value may be a value that is at least 5% of the intermediate component height value. In one example, the first height difference value being at least 15% of the intermediate component height value. In another example, the first height difference value may be within a range of 7 millimeters and 53 millimeters.

The posterior component 53*a* may be comprising a second height difference value, wherein the second height difference value being a difference in height value along the vertical axis (L3) between the top of the medial component 51*a* height value and the top of the lateral component 52*a* height value, or a difference in height value between the most forward point of the top area of the medial component 79 along the longitudinal axis (L1) and the most forward point of the top area of the lateral component 80 along the longitudinal axis (L1). The medial component 51*a* height value being larger than the lateral component 52*a* height value by the second height difference value. The second height difference value may be a value that is at least 1% of the first height difference value. For example, the second height difference value may be within a range of 2 millimeters and 23 millimeters.

The posterior component 53*a* may be comprising the top area of the medial component 79 being disposed or formed farther away from the end of the posterior area of the sole arrangement 33 along the longitudinal axis (L1) as compared to the top area of the lateral component 80. The top area of the medial component 79 may be disposed or formed within an area at least partially in-between the Achilles tendon and the medial malleolus bone of the foot and the top area of the lateral segment 80 may be disposed or formed in an area at least partially in-between the Achilles tendon and the lateral malleolus bone of the foot.

The posterior component 53*a* of the sole arrangement 20*c* may be comprising the top area of the lateral component 80 and the top area of the medial component 79 being separated by a gap along a lateral axis (L2).

The posterior component 53*a* may furthermore be comprising the top area of the medial component 79 at least partially including the first component and the second medial segment, and the top area of the lateral component 80 at least partially including the first component and the second component.

Figure 17:
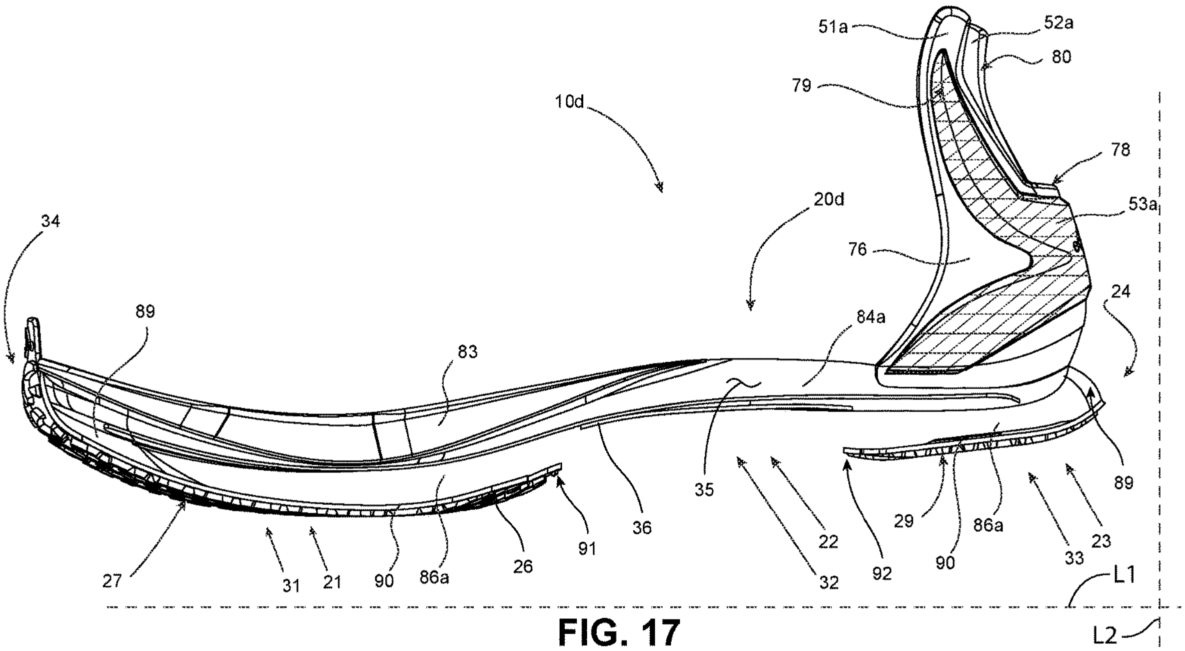
FIG. 17 is a medial side view of an article of footwear incorporating a sole arrangement in accordance with the principles and features of the present disclosure.

With particular reference to FIG. 17, a sole arrangement 20*d* for an article of footwear 10*d* is provided. Due to the substantial similarity between the articles of footwear 10, 10*a*, 10*b*, 10*c* and 10*d* in arrangement and functionality of their components, same reference numerals are used hereinafter and in the drawings to identify same or similar components, wherein same reference numerals including letter extensions are used to identify components that may have been modified.

The article of footwear 10*d* may include an upper 50 (see FIG. 1), where the upper 50 may be attached to the sole arrangement 20*d*. The sole arrangement 20*d* extending from an end of a posterior area of the sole arrangement 24 to an end of an anterior area of the sole arrangement 34, wherein the posterior area of the sole arrangement 24 being formed in and/or under a heel area of a foot and the anterior area of the sole arrangement 34 being formed under and/or in a forefoot area of the foot, an intermediate area of the foot, or both. The sole arrangement 20*d* including an upper facing surface 18 and a ground engaging surface 19, wherein the upper facing surface 18 being formed on an opposite side of the sole arrangement 20*d* than the ground engaging surface 19. The sole arrangement 20*d* may include a posterior component 53*a*, wherein the posterior component 53*a* may extend from a direction of the upper facing surface 18 of the posterior area of the sole arrangement 24 in a direction away from the upper facing surface 18 and away from the ground engaging surface 19. The posterior component 53*a* may at least partially extend vertically above the upper facing surface 18 along a vertical axis (L3), wherein the upper facing surface may be above the ground engaging surface 19. The posterior component 53*a* comprising a lateral component 52, a medial component 51, a middle component 75 or a combination thereof. The lateral component 52 and the medial component 51 may be extending beyond and above the middle component 75, a back portion of an upper, the end of the posterior area of the sole arrangement 24, or a combination thereof. The lateral component 52 may be extending into or through an area in-between a lateral malleolus bone of the foot and an Achilles tendon of the foot, the medial component 51 may be extending into or through an area in-between a medial malleolus bone of the foot and the Achilles tendon of the foot, and the intermediate component 75 may be extending to an area of an end of a top of a calcaneus bone of the foot.

The sole arrangement 20*d* for the article of footwear 10*d* comprising, the sole arrangement extending from an end of a posterior area of the sole arrangement 24 to an end of an anterior area of the sole arrangement 34, wherein the posterior area of the sole arrangement 33 being disposed under a heel area of a foot and the anterior area of the sole arrangement 31 being disposed under a forefoot area of the foot, the sole arrangement including an upper facing surface 18 and a ground engaging surface 19, wherein the upper facing surface 18 being on an opposite side of the sole arrangement than the ground engaging surface19. The sole arrangement including a maximum posterior depth value, wherein the maximum posterior depth value measuring a thickest position or a position with a largest depth value within the posterior area of the sole arrangement, the thickest position or a position with a largest depth value being measured at a lowest position of the upper facing surface along a lateral axis (L2) and at any position of the upper facing surface or the ground engaging surface along a longitudinal axis (L1) directly under the heel area of the foot. For example, the maximum posterior depth value may be formed within the posterior area 23 at a position of H3*a*, H3*b* (similar to as shown in FIG. 3) or at any position within the posterior area of the sole arrangement 33 at a lowest position of the upper facing surface 18 along a lateral axis (L2) and at any position of the upper facing surface 18 or the ground engaging surface 19 along a longitudinal axis (L1) directly under a heel area of the foot, or according to a requirement for measuring a maximum depth value, described in detail above. The sole arrangement 20*d* including a maximum anterior depth value, wherein the maximum anterior depth value measuring a thickest position within the anterior area of the sole arrangement 31, the thickest position being measured at a lowest position of the upper facing 18 surface along a lateral axis (L2) and at any position of the upper facing surface 18 or the ground engaging surface 19 along a longitudinal axis (L1) directly under the forefoot area of the foot. For example, the maximum anterior depth value may be formed within the posterior area of the sole arrangement 31 at a position of H1*a*, H1*b* (similar to as shown in FIG. 3) or at any position within the anterior area of the sole arrangement 33 at a lowest position of the upper facing surface 18 along a lateral axis (L2) and at any position of the upper facing surface 18 or the ground engaging surface 19 along a longitudinal axis (L1) directly under a forefoot area of the foot, or according to a requirement for measuring a maximum depth value, described in detail above. The maximum anterior depth value being larger than the maximum posterior depth value by a difference depth value, the difference depth value being a predetermined depth value, the posterior area of the sole arrangement extending from the end of the posterior area of the sole arrangement 24 to an intermediate area of the sole arrangement 32, wherein the intermediate area of the sole arrangement 32 connecting the posterior area of the sole arrangement 33 with the anterior area of the sole arrangement 31, the anterior area of the sole arrangement extending from the end of the anterior area of the sole arrangement 34 to the intermediate area of the sole arrangement 32, the ground engaging surface 19 transitioning from the posterior area of the sole arrangement 33 to the intermediate area of the sole arrangement 32 in a substantially concave shaped form from a view of the upper facing surface 18, the ground engaging surface 19 being shaped in the intermediate area of the sole arrangement 32 in a substantially convex shaped form from the view of the upper facing surface 18, and the ground engaging surface 19 transitioning from the intermediate area of the sole arrangement 32 to the anterior area of the sole arrangement 31 in a substantially concave shaped form from the view of the upper facing surface 18.

With further reference to FIG. 17, the article of footwear 10*d* may differ from the article of footwear 10, 10*a*, 10 *b* or 10*c* merely in an arrangement of one or more layers 35 of the sole arrangement 20, 20*a*, 20*b* or 20*c* resulting in a sole arrangement 20*d*.

The sole arrangement 20*d* may comprise a midsole 25, wherein the midsole 25 may comprise one or more portions, layers or segments, and may furthermore be a portion of one or more layers 35. The one or more layers may, for example, comprise the midsole 25, an outsole 26, a strobel, an insole or footbed, a plate 36, or a combination thereof. The midsole 25 may include a first midsole portion 83 and a second midsole portion 84*a*. The first midsole portion 83 may be formed at least partially on top of the second midsole portion 84*a*. The first midsole portion 83 may also be formed at least partially on top of the second midsole portion 84*a* only in the anterior area of the sole arrangement 31 and/or the intermediate area of the sole arrangement 32, similar to as shown in FIGS. 1-16.

The sole arrangement 20*d* may comprise a bottom midsole layer 89 within the one or more layers 35. The bottom midsole layer 89 may extend from a direction of the end of the anterior area of the sole arrangement 34 in a direction towards the intermediate area of the sole arrangement 32 in an anterior area of the bottom midsole layer 89, and may extend from a direction of the end of the posterior area of the sole arrangement 24 in a direction towards the intermediate area of the sole arrangement 32 in a posterior area of the bottom midsole layer 89.

The midsole may also, for example, comprise a midsole void 86*a* directly under a foot in the intermediate area of the sole arrangement 32 for a predetermined length along the lateral axis (L2) and for another predetermined length along the longitudinal axis (L1). For example, the predetermined length along the lateral axis (L2) and the another predetermined length along the longitudinal axis (L1) may overlap and create a complete void under a certain area within the bottom midsole layer 89.

The sole arrangement 20*d* may also comprise a top outsole layer 90 within the one or more layers 35. The top outsole layer 90 may be formed on top of the outsole 26. The top outsole layer 90 may extend from a direction of the end of the anterior area of the sole arrangement 34 in a direction towards the intermediate area of the sole arrangement 32 in an anterior area 21 and/or an intermediate area 22 of the top outsole layer 90, and may extend from a direction of the end of the posterior area of the sole arrangement 24 in a direction towards the intermediate area of the sole arrangement 32 in a posterior area 23 of the top outsole layer 90. The top outsole layer 90 may be formed of a rigid material, such as a composite material or a carbon material similar to a carbon fiber plate, at least partially in the posterior area 33, in the intermediate area 32, in the anterior area 31, or a combination thereof, of the sole arrangement 20*d*. A rear end of an anterior portion of the top outsole layer 91 may extend into the intermediate area of the sole arrangement 32 and/or posterior area of the sole arrangement 33 and being formed under the midsole void 86*a*. Furthermore, a front end of a posterior portion of the top outsole layer 92 may extend into the intermediate area of the sole arrangement 32 and/or anterior area of the sole arrangement 31 and being formed under the midsole void 86*a*.

The top outsole layer 90 may be more rigid compared to the first midsole portion 83 and/or a second midsole portion 84*a*, and the top outsole layer 90 may be located below the midsole void 86*a*, which may thereby create a spring-like effect during a landing motion of the article of footwear 10*d* on a ground surface storing an energy and at least partially releasing the energy during a take-off motion of the article of footwear 10*d* from the ground surface. This storing of and release of the energy may take be created in an anterior area 21 of the top outsole layer 90, a posterior area 23 of the top outsole layer 90, an intermediate area 22 of the top outsole layer 90 or a combination thereof.

The foregoing articles of footwear 10-10*d* each incorporate a sole arrangement 20-20*d* with a predetermined degree of support, guidance, protection and cushioning to a foot of a wearer of one of the foregoing articles of footwear 10-10*d* during an application thereof. Accordingly, the articles of footwear 10-10*d* may be applied to a variety of athletic activities such as, for example, walking, running, or sprinting, or any sport that may involve one of these activities.

Figure 18:
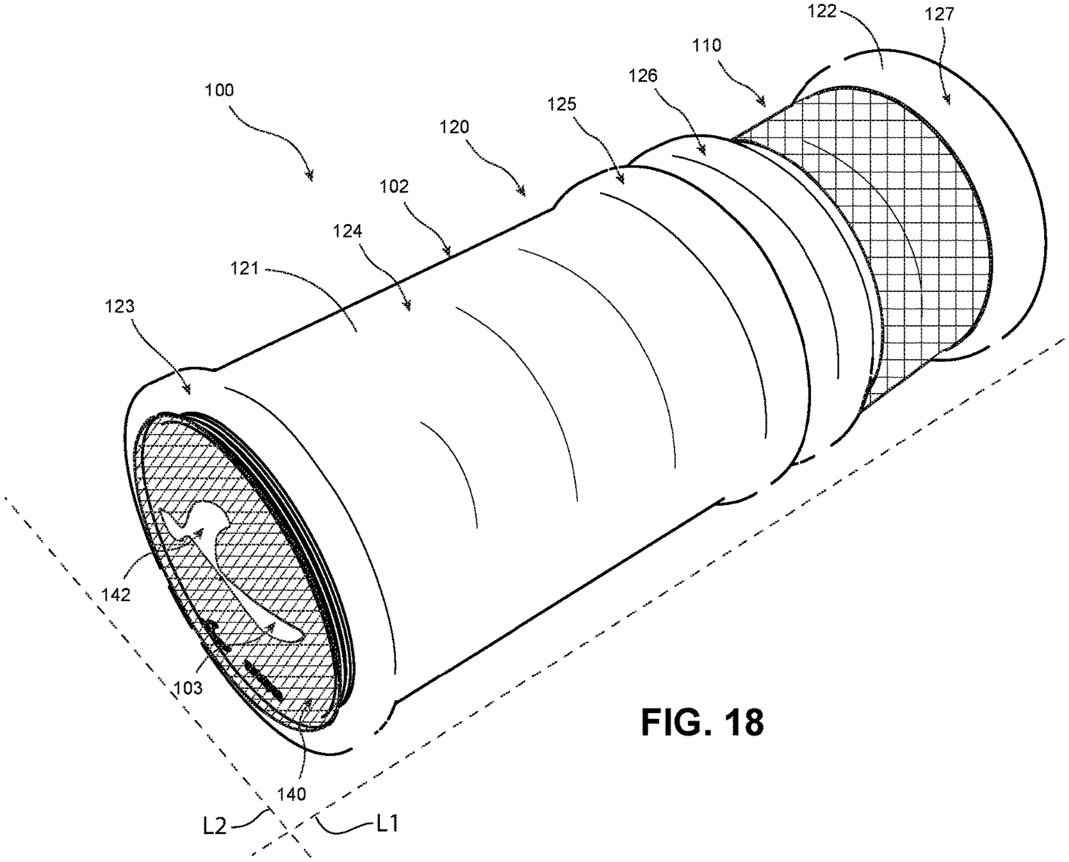
FIG. 18 is a perspective view of an article of exercise equipment incorporating a longitudinal arrangement of circular components in accordance with the principles and features of the present disclosure.
Figure 19:
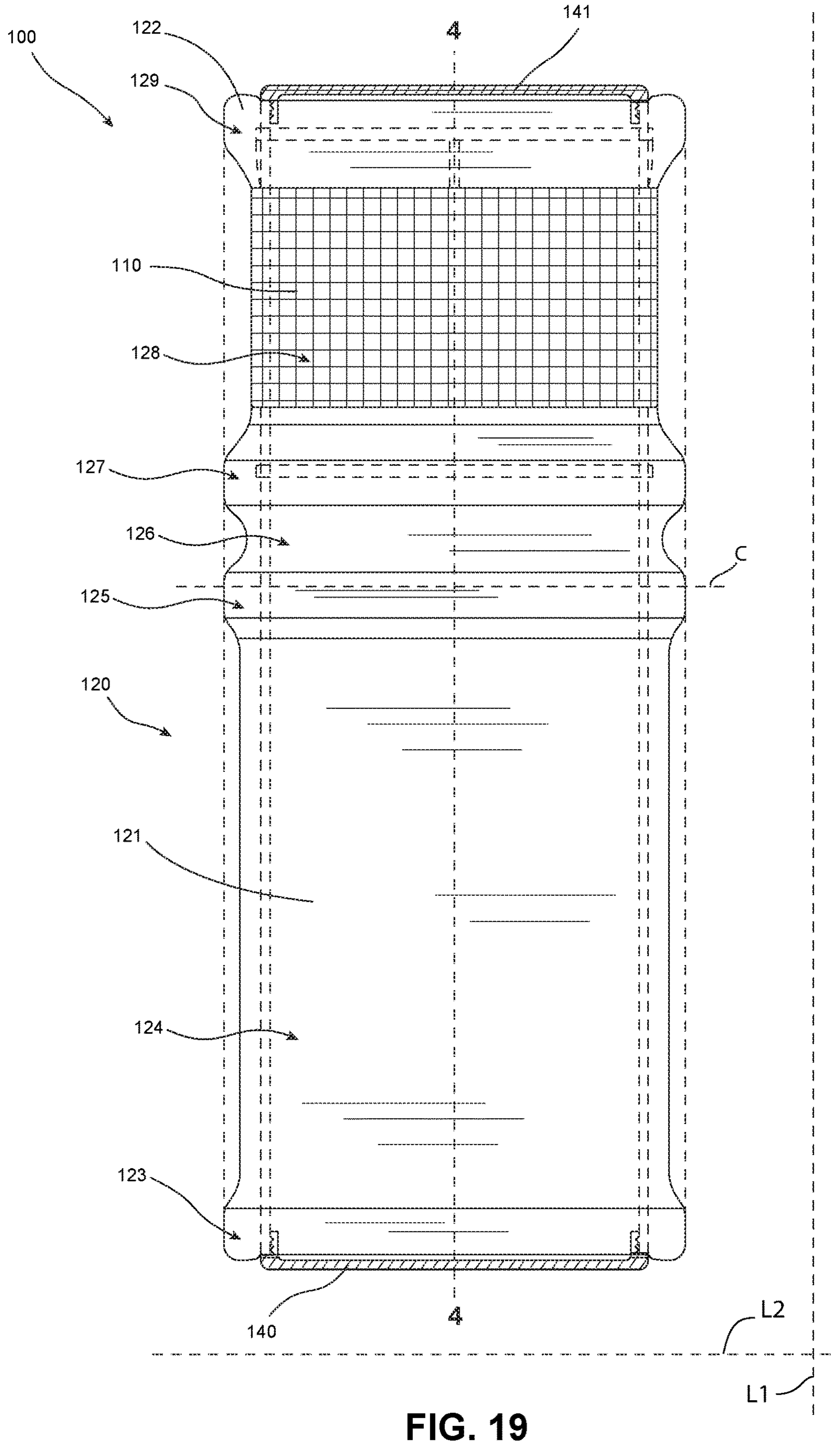
FIG. 19 is a side view of the article of exercise equipment of FIG. 18.
Figure 20:
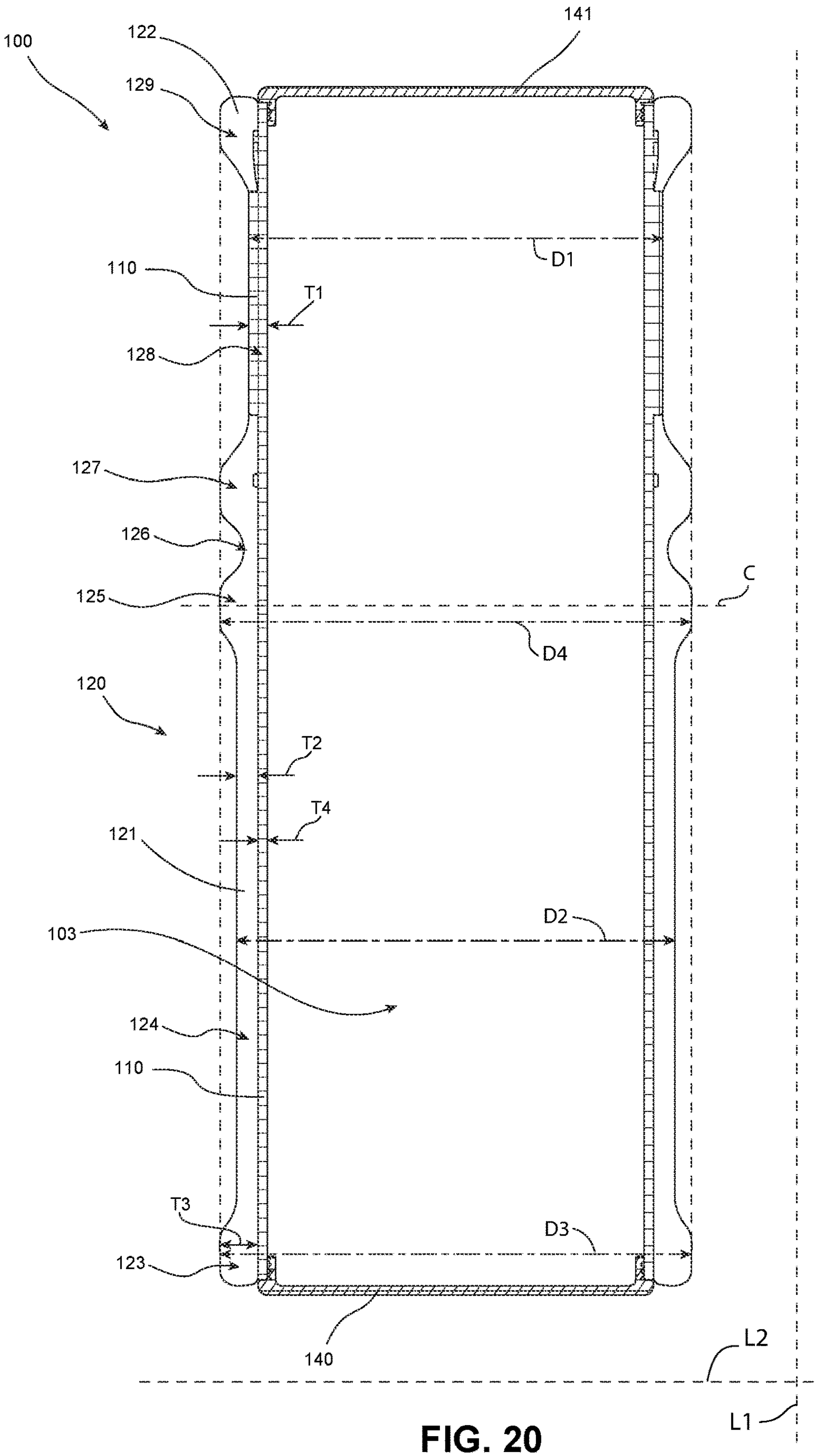
FIG. 20 is a cross-sectional view of the article of exercise equipment of FIG. 18 taken along Line 4-4 of FIG. 19.

With particular reference to FIGS. 18-20, an article of exercise equipment 100 for therapeutic massage is provided. The article of exercise equipment 100 may include an interior surface 101 and an exterior surface 102, wherein the interior surface 101 being formed on an opposite side of the article of exercise equipment 100 than the exterior surface 102. The interior surface 101 may be facing an interior void 103, wherein the interior void 103 being at least partially hollowed out and may receive an article for storage or transportation.

The article of exercise equipment 100 may comprise a first component 110 being formed of a first material and a second component 120 being formed of a second material. The article of exercise equipment 100 may additionally comprise a first cap 140 and/or a second cap 141 being formed of a third material. The first component 110 may be formed by the first material including a first hardness value and the second component 120 may be formed by the second material including a second hardness value.

The first material may be formed by a composite material, a thermoplastic material, a material allowing minimal to no compression set or a combination thereof, such as, for example, thermoplastic polyurethane (TPU), propylene (PP), acrylonitrile butadiene styrene (ABS) or a combination of such materials. The second material may be formed by thermoplastic or thermosetting polymers, elastomers or rubbers, wherein the thermoplastic or thermosetting polymers, elastomers or rubbers may form a closed-cell foam or construction, or on the other hand an open-cell foam or construction, such as, for example, softer polymers, polyamides, ethylene vinyl acetate (EVA), expanded thermoplastic polyurethane (ETPU) or a combination of such materials.

The second hardness value may be smaller or lower than the first hardness value by a first hardness difference value. The first component 110 may be harder to compress or deform as compared to the second component. The exterior surface 102 of the article of exercise equipment 100 may be formed by the first component 110 comprising the first material including the first hardness value and the second component 120 comprising the second material including the second hardness value. The first hardness value may be larger or higher than the second hardness by the first hardness difference value.

A composition of polymers or molecular bindings of the first material of the first component 110 may be different from a composition of polymers or molecular bindings of the second material of the second component 120. For example, the composition of polymers or molecular bindings of the first material of the first component 110 may be of ABS or PP polymers or molecular bindings, and the composition of polymers or molecular bindings of the second material of the second component 120 may be of EVA polymers or molecular bindings.

The first component 110 may comprise a substantially circular shape for a first length along the longitudinal axis (L1) and the second component 120 may comprise a substantially circular shape for a second length along the longitudinal axis (L1). The second component 120 may comprise a first portion 121 and a second portion 122. The first portion 121 including a first portion length, and the second portion including a second portion length. The second length may be a combined length of the first portion length and the second portion length. The first component being formed between the first portion 121 and the second portion 122. The first length may be equal to, smaller or larger than the second length. As shown in FIGS. 18-20, the first length may be smaller than the second length by a predetermined length.

The article of exercise equipment 100 may comprise the first cap 140 and/or a second cap 141 being formed of the third material. The third material may be similar to or substantially the same as the first material, the second material or may be formed by a different material than the first material and the second material. The third component may at least partially be inserted into the second component 120, the first component 110, or both. The third component may be inserted at an end closest to a portion of the exterior surface 102 containing at least partially the first component 110, at an end farthest away from the portion of the exterior surface 102 containing at least partially the first component 110, or both. The first cap 140 and/or a second cap 141 may include a first cap void 142 with a predetermined surface area size to allow for receiving a user's hand into an interior void 103 of the article of exercise equipment 100 for removal of the first cap 140 and/or a second cap 141.

The article of exercise equipment 100 may comprise on the exterior surface 102 at least partially the first component 110 and the second component 120. Optionally, the article of exercise equipment 100 may comprise on the exterior surface 102 at least partially a fourth component, wherein the fourth component may be attached to or placed on a top of or above the first component 110, be at least partially disjoint from the first component 110, comprise similar material properties as to first component, or combination thereof. In this option, the second component 120 may additionally be formed in between the first component 110 and the fourth component.

With continued reference to FIGS. 19-20, the article of exercise equipment 100 may comprise a first end segment 123, a first body segment 124, a first raised segment 125, a spine segment 126, a second raised segment 127, an exposed internal segment 128, a second end segment 129, or a combination thereof. The first end segment 123 may be formed at the end of the article of exercise equipment 100 farthest away from the portion of the exterior surface 102 containing at least partially the first component 110. The second end segment 129 may be formed at the end of the article of exercise equipment 100 closest to the portion of the exterior surface 102 containing at least partially the first component 110. The exposed internal segment 128 may include the exterior surface 102 containing at least partially the first component 110, the fourth component, or a combination thereof. The first body segment 124 and the exposed internal segment 128 may be formed in between the first end segment 123 and the second end segment 129 along the longitudinal axis (L1). The first body segment 124 may furthermore optionally be formed in between the first end segment 123 and the first raised segment 125 along the longitudinal axis (L1). The exposed internal segment 128 may furthermore optionally be formed in between the second end segment 129 and the first raised segment 125 along the longitudinal axis (L1).

As shown in FIG. 20, an outer diameter of the exposed internal segment D1 of the article of exercise equipment 100 measuring a diameter of the exposed internal segment 128 from a point on the exterior surface 102 through a mid-point of the exposed internal segment 128 along a lateral axis (L2) to another point on the exterior surface 102 on the opposite side of the point on the exterior surface 102. An outer diameter of the first body segment D2 of the article of exercise equipment 100 measuring a diameter of the first body segment 124 from a point on the exterior surface 102 through a mid-point of the first body segment 124 along a lateral axis (L2) to another point on the exterior surface 102 on the opposite side of the point on the exterior surface 102. An outer diameter of the first end segment D3 of the article of exercise equipment 100 measuring a diameter of the first end segment 123 from a point on the exterior surface 102 through a mid-point of the first end segment 123 along a lateral axis (L2) to another point on the exterior surface 102 on the opposite side of the point on the exterior surface 102. An outer diameter of the first raised segment D4 of the article of exercise equipment 100 measuring a diameter of the first raised segment 125 from a point on the exterior surface 102 through a mid-point of the first raised segment 125 along a lateral axis (L2) to another point on the exterior surface 102 on the opposite side of the point on the exterior surface 102.

The outer diameter of the exposed internal segment D1 may be equal to, smaller or larger than the outer diameter of the first body segment D2 by a first diameter difference value. As shown in FIGS. 19-20, the outer diameter of the exposed internal segment D1 may be smaller than the outer diameter of the first body segment D2 by the first diameter difference value. The outer diameter of the exposed internal segment D1 may also be smaller than the outer diameter of the first end segment D3 by a second diameter difference value. The outer diameter of the exposed internal segment D1 may additionally or interchangeably be smaller than the outer diameter of the first raised segment D4 by a third diameter difference value. The outer diameter of the first end segment D3 may be larger than the outer diameter of the first body segment D2 by a fourth diameter difference value. Therefore, the outer diameter of the first body segment D2 may be larger than the outer diameter of the exposed internal segment D1, but smaller than the outer diameter of the first end segment D3.

However, in another example, the outer diameter of the exposed internal segment D1, the outer diameter of the first body segment D2, the outer diameter of the first end segment D3 and the outer diameter of the first raised segment D4 may include a substantially same diameter value. The exposed internal segment 128 may be formed between the first portion 121 and the second portion 122, wherein the exposed internal segment 128 comprising the first component 110 or the fourth component may include the first hardness value being higher or larger than a hardness value of the first portion 121 and a hardness value of the second portion 122. The second hardness value of the second component 120 being a lower one of the hardness value of the first portion 121 and the hardness value of the second portion 122.

The first component 110 may include in the exposed internal segment 128*a* first sidewall thickness value T1, the second component 120 may include a second sidewall thickness value T2 and the second component 120 may further include in the first end segment 123*a* third sidewall thickness value T3. In a first example, the first sidewall thickness value T1 may be substantially equal to the second sidewall thickness value T2 and the third sidewall thickness value T3. In another exemplary application, the first sidewall thickness value T1 may be equal to, smaller than or larger than the second sidewall thickness value T2 by a first sidewall thickness difference value and smaller than the third sidewall thickness value T3 by a second sidewall thickness difference value. The third sidewall thickness value T3 may be larger than the second sidewall thickness value T2 by a third sidewall thickness difference value. The first sidewall thickness difference value may be substantially equal to, smaller than, or larger than the second sidewall thickness difference value.

The first component 110 may include in an unexposed internal segment a fourth sidewall thickness value T4. The first sidewall thickness value T1 may be a total sidewall thickness value in the exposed internal segment 128. The fourth sidewall thickness value T4 being added to the second sidewall thickness value T2 may be a total sidewall thickness value in the first body segment 124. The fourth sidewall thickness value T4 being added to the third sidewall thickness value T3 may be a total sidewall thickness value in the first end segment 123. The total sidewall thickness value in the first end segment 123 may be substantially equal to a total sidewall thickness value in the first raised segment 125, the second raised segment 127, the second end segment 129, or a combination thereof.

The article of exercise equipment 100 may be used by a user for massaging purposes of a muscle or fascia at a certain position of a body of the user. The article of exercise equipment 100 may additionally be an article of transportation equipment, an article of storage equipment or a combination thereof.

The disclosed embodiments and described elements and functional steps, including exemplary functional steps or elements, may all be interchangeable from one aspect of the disclosure, an embodiment, a functional step or an element into another or multiple other aspects of the disclosure, embodiments, elements or functional steps.

The following Clauses provide configurations for an article of footwear and an article of therapeutic exercise equipment including a transportation and storage equipment for the article of footwear, as described above.

Clause 1: A sole arrangement for an article of footwear, the sole arrangement comprising, first bottom outsole disposed in a posterior area of the sole arrangement, the posterior area of the sole arrangement extending from an end of the posterior area of the sole arrangement to at least a intermediate area of the sole arrangement, a second bottom outsole disposed in an anterior area of the sole arrangement, the anterior area of the sole arrangement extending from an end of the anterior area of the sole arrangement to at least the intermediate area of the sole arrangement, the first bottom outsole, disposed in the posterior area of the sole arrangement, having a first thickness value, the second bottom outsole, disposed in the anterior area of the sole arrangement, having a second thickness value, the second thickness value is larger than the first thickness value, an upper component attaching to at least one location of the posterior area of the sole arrangement, wherein the at least one location of the posterior area of the sole arrangement extending from the end of the posterior area of the sole arrangement to a lower heel region of the sole arrangement, the lower heel region of the sole arrangement being disposed in a middle area of the posterior area of the sole arrangement, wherein the middle area of the posterior area of the sole arrangement extending from the end of the posterior area of the sole arrangement to a first transition area, wherein the first transition area is located within the posterior area of the sole arrangement and adjacent to the intermediate area of the sole arrangement, the first transition area separates the lower heel region of the sole arrangement and the intermediate area of the sole arrangement by a first predetermined distance value, the posterior area of the sole arrangement encompasses the lower heel region of the sole arrangement, and the upper component extending from the at least one location of the posterior area of the sole arrangement to at least one of the following, a posterior area of an upper heel region, wherein the upper heel region extending from the lower heel region of the sole arrangement away from the sole arrangement for a second predetermined distance value, an anterior area of the upper heel region, or a medial and a lateral area of the upper heel region.

Clause 2: A sole arrangement for an article of footwear, the sole arrangement comprising, a first bottom outsole disposed in a posterior area of the sole arrangement, the posterior area of the sole arrangement extending from an end of the posterior area of the sole arrangement to at least a intermediate area of the sole arrangement, a second bottom outsole disposed in an anterior area of the sole arrangement, the anterior area of the sole arrangement extending from an end of the anterior area of the sole arrangement to at least the intermediate area of the sole arrangement, the first bottom outsole, disposed in the posterior area of the sole arrangement, having a first thickness value, the second bottom outsole, disposed in the anterior area of the sole arrangement, having a second thickness value, the second thickness value is larger than the first thickness value, an upper component attaching to the posterior area of the sole arrangement, and the upper component extending from a medial area of the posterior area of the sole arrangement to a lateral area of the posterior area of the sole arrangement.

Clause 3: The sole arrangement of Clause 1, the upper component attaching to the posterior area of the sole arrangement further comprising, the upper component attaching to at least one location of the posterior area of the sole arrangement, wherein the at least one location of the posterior area of the sole arrangement extending from the end of the posterior area of the sole arrangement to a lower heel region of the sole arrangement, the lower heel region of the sole arrangement being disposed in a middle area of the posterior area of the sole arrangement, wherein the middle area of the posterior area of the sole arrangement extending from the end of the posterior area of the sole arrangement to a first transition area, wherein the first transition area is located within the posterior area of the sole arrangement and adjacent to the intermediate area, the first transition area separates the lower heel region of the sole arrangement and the intermediate area of the sole arrangement by a first predetermined distance value, and the posterior area of the sole arrangement encompasses the lower heel region of the sole arrangement.

Clause 4: A sole arrangement for an article of footwear, the sole arrangement comprising, a first bottom outsole disposed in a intermediate area of the sole arrangement, the intermediate area of the sole arrangement extending from an end of the intermediate area of the sole arrangement to at least an anterior area of the sole arrangement, a second bottom outsole disposed in the anterior area of the sole arrangement, the anterior area of the sole arrangement extending from an end of the anterior area of the sole arrangement to at least the intermediate area of the sole arrangement, the first bottom outsole, disposed in the intermediate area of the sole arrangement, having a first thickness value, the second bottom outsole, disposed in the anterior area of the sole arrangement, having a second thickness value, the second thickness value is larger than the first thickness value, an upper component attaching to the intermediate area of the sole arrangement, and the upper component extending from a medial area of the intermediate area of the sole arrangement to a lateral area of the intermediate area of the sole arrangement.

Clause 5: The sole arrangement of Clause 4, the upper component attaching to the intermediate area of the sole arrangement further comprising, the upper component attaching to at least one location of the intermediate area of the sole arrangement, wherein the at least one location of the intermediate area of the sole arrangement extending from the end of the intermediate area of the sole arrangement to a lower heel region of the sole arrangement, the lower heel region of the sole arrangement being disposed in a middle area of the intermediate area of the sole arrangement, wherein the middle area of the intermediate area of the sole arrangement extending from the end of the intermediate area of the sole arrangement to a first transition area, wherein the first transition area is located within the intermediate area of the sole arrangement and adjacent to the intermediate area, the first transition area separates the lower heel region of the sole arrangement and the intermediate area of the sole arrangement by a first predetermined distance value, and the intermediate area of the sole arrangement encompasses the lower heel region of the sole arrangement.

Clause 6: A sole arrangement for an article of footwear, the sole arrangement comprising, a first bottom outsole having a first ground-facing surface and a first top-facing surface, wherein the first top-facing surface is on an opposite side of the first ground-facing surface of the first bottom outsole, the first bottom outsole disposed in a posterior area of the sole arrangement, the posterior area of the sole arrangement extending from an end of the posterior area of the sole arrangement to at least a intermediate area of the sole arrangement, a second bottom outsole having a second ground-facing surface and a second top-facing surface, wherein the second top-facing surface is on an opposite side of the second ground-facing surface of the second bottom outsole, the second bottom outsole disposed in an anterior area of the sole arrangement, the anterior area of the sole arrangement extending from an end of the anterior area of the sole arrangement to at least the intermediate area of the sole arrangement, a first midsole disposed and joined to the first top-facing surface, the first midsole having a first thickness value, a second midsole disposed and joined to the second top-facing surface, the second midsole having a second thickness value, the second thickness value is larger than the first thickness value, an upper component attaching to the posterior area of the sole arrangement, and the upper component extending from a medial area of the posterior area of the sole arrangement to a lateral area of the posterior area of the sole arrangement.

Clause 7: A sole arrangement for an article of footwear, the sole arrangement comprising, an outsole having a ground-facing surface and a top-facing surface, wherein the top-facing surface is on an opposite side of the ground-facing surface of the outsole, a first midsole disposed in a posterior area of the sole arrangement, the posterior area of the sole arrangement extending from an end of the posterior area of the sole arrangement to at least an intermediate area of the sole arrangement, a second midsole disposed in an anterior area of the sole arrangement, the anterior area of the sole arrangement extending from an end of the anterior area of the sole arrangement to at least the intermediate area of the sole arrangement, the first midsole disposed and joined to a first segment of the top-facing surface, the first midsole having a first thickness value, the second midsole disposed and joined to a second segment of the top-facing surface, the second midsole having a second thickness value, the second thickness value is larger than the first thickness value, an upper component attaching to the posterior area of the sole arrangement, and the upper component extending from a medial area of the posterior area of the sole arrangement to a lateral area of the posterior area of the sole arrangement.

Clause 8: The sole arrangement of Clause 7, further comprising, the first thickness value measuring a thickest portion of the first midsole, and the second thickness value measuring a thickest portion of the second midsole.

Clause 9: A sole arrangement for an article of footwear, the sole arrangement comprising, an outsole having a ground-engaging surface and a top-facing surface, wherein the top-facing surface is on an opposite side of the ground-engaging surface of the outsole, a midsole disposed in an anterior area of the sole arrangement, the anterior area of the sole arrangement extending from an end of the anterior area of the sole arrangement to at least a intermediate area of the sole arrangement, the midsole disposed and joined to an anterior segment of the top-facing surface, wherein the anterior segment of the top-facing surface is disposed in the anterior area of the sole arrangement, the midsole having a midsole thickness value, a posterior segment of the top-facing surface is disposed in a posterior area of the sole arrangement, the outsole having an outsole thickness value, an outsole-plus-midsole thickness value being greater than the midsole thickness value and greater than the outsole thickness value, wherein the outsole-plus-midsole thickness value is a sum of the outsole thickness value and the midsole thickness value, an anterior thickness value, wherein the anterior thickness value is the thickness of the anterior area of the sole arrangement, a posterior thickness value, wherein the posterior thickness value is the thickness of the posterior area of the sole arrangement, the anterior thickness value being greater than the posterior thickness value, an upper component attaching to the posterior area of the sole arrangement, and the upper component extending from a medial side of the posterior area of the sole arrangement to a lateral side of the posterior area of the sole arrangement.

Clause 10: The sole arrangement of Clause 9, further comprising, the midsole thickness value measuring a thickest portion of the midsole, and the outsole thickness value measuring a thickest portion of the outsole.

Clause 11: The sole arrangement of Clause 9, further comprising, the anterior thickness value measuring a thickest portion of the anterior area of the sole arrangement, and the posterior thickness value measuring a thickest portion of the posterior area of the sole arrangement.

Clause 12: The sole arrangement of Clause 9, further comprising, the end of the anterior area of the sole arrangement is disposed in a toe area of the sole arrangement.

Clause 13: The sole arrangement of Clause 9, further comprising, the intermediate area of the sole arrangement including a foot-arch area of the sole arrangement.

Clause 14: The sole arrangement of claim 9, further comprising, the intermediate area of the sole arrangement being at least an arc-shaped transitional area, the arc-shaped transitional area connecting the anterior area of the sole arrangement with the posterior area of the sole arrangement, wherein creating the arc-shaped transitional area by an elevation change between the anterior area of the sole arrangement and the posterior area of the sole arrangement, the anterior area of the sole arrangement comprising at least an anterior segment of the outsole and a first segment of the midsole, wherein the anterior area of the sole arrangement having a third thickness value, the posterior area of the sole arrangement comprising at least a posterior segment of the outsole and a posterior end of the midsole, wherein the posterior area of the sole arrangement having a fourth thickness value, and the third thickness value is greater than the fourth thickness value.

Clause 15: The sole arrangement of Clause 14, wherein the intermediate area of the sole arrangement being at least the arc-shaped transitional area, further comprising, a posterior segment of the midsole being disposed, joined and tapering in the intermediate area of the sole arrangement, the tapering in the intermediate area of the sole arrangement starting from a side facing the anterior area of the sole arrangement towards a side facing the posterior area of the sole arrangement, the midsole having a second midsole thickness disposed and joined in the intermediate area in the side facing the anterior area of the sole arrangement, the midsole having a third midsole thickness disposed and joined in the side facing the posterior area of the sole arrangement, and the second midsole thickness is greater than the third midsole thickness.

Clause 16: The sole arrangement of Clause 9, further comprising, no midsole is disposed and joined to the posterior segment of the top-facing surface.

Clause 17: The sole arrangement of Clause 9, further comprising, a second midsole is disposed and joined to the posterior segment of the top-facing surface, the second midsole having a second midsole thickness value, the midsole thickness value is greater than the second midsole thickness value.

Clause 18: The sole arrangement of Clause 9, further comprising, the outsole thickness value being substantially uniform in the anterior area of the sole arrangement and the posterior area of the sole arrangement.

Clause 19: The sole arrangement of Clause 9, further comprising, a posterior segment of the outsole having a posterior outsole thickness value, the posterior outsole thickness value being greater than the outsole thickness value, wherein the outsole thickness value is a thickness value of an anterior segment of the outsole.

Clause 20: The sole arrangement of Clause 9, further comprising, a plate disposed adjacent to the outsole, at an opposite side of the sole arrangement than the outsole, and coupled with the midsole or partially disposed within the midsole, along the top-facing surface or at least along a second top-facing surface of the midsole.

Clause 21: A sole arrangement for an article of footwear, the sole arrangement comprising, a first bottom outsole placed in a posterior of the sole arrangement extending from an end of the posterior to at least a intermediate area of the sole arrangement, a second bottom outsole placed in an anterior of the sole arrangement extending from an end of the anterior to at least the intermediate area of the sole arrangement, the first bottom outsole, placed in the posterior of the sole arrangement, having a first thickness value, and the second bottom outsole, placed in the anterior of the sole arrangement, having a second thickness value, the second thickness value is larger than the first thickness value.

Clause 22: A sole arrangement for an article of footwear comprising, the sole arrangement extending from an end of a posterior area of the sole arrangement to an end of an anterior area of the sole arrangement, wherein the posterior area of the sole arrangement positioning under a heel area of a foot and the anterior area of the sole arrangement positioning under a forefoot area of the foot, the sole arrangement having an upper facing surface and a ground engaging surface, wherein the upper facing surface being on an opposite side of the sole arrangement than the ground engaging surface, the sole arrangement having a maximum posterior depth value, wherein the maximum posterior depth value measuring a thickest point of the posterior area of the sole arrangement directly under the heel area of the foot, the sole arrangement having a maximum anterior depth value, wherein the maximum anterior depth value measuring a thickest point of the anterior area of the sole arrangement directly under the forefoot area of the foot, the maximum posterior depth value being smaller than the maximum anterior depth value by a first margin, the posterior area of the sole arrangement extending from the end of the posterior area of the sole arrangement to a intermediate area of the sole arrangement, wherein the intermediate area of the sole arrangement connecting the posterior area of the sole arrangement with the anterior area of the sole arrangement, the anterior area of the sole arrangement extending from the end of the anterior area of the sole arrangement to the intermediate area of the sole arrangement, the posterior area of the sole arrangement transitioning to the intermediate area of the sole arrangement in a substantially convex shaped form in view of the ground engaging surface, the intermediate area of the sole arrangement transitioning to the anterior area of the sole arrangement in a substantially concave shaped form in view of the ground engaging surface, the posterior area of the sole arrangement transitioning to the intermediate area of the sole arrangement in a substantially concave shaped form in view of the upper facing surface, the intermediate area of the sole arrangement transitioning to the anterior area of the sole arrangement in a substantially convex shaped form in view of the upper facing surface, the intermediate area of the sole arrangement connecting the posterior area of the sole arrangement and the anterior area of the sole arrangement in a substantially diagonal form.

Clause 23: The sole arrangement of Clause 22, further comprising, a plate at least partially coupled to the upper facing surface or at least partially disposed within the sole arrangement, or the plate being disposed within the sole arrangement in the anterior area of the sole arrangement, in the posterior area of the sole arrangement, in the intermediate area of the sole arrangement, or a combination thereof.

Clause 24: The sole arrangement of Clause 22, further comprising, a plate disposed proximate to, adjacent to or within the sole arrangement extending from the posterior area of the sole arrangement to the anterior area of the sole arrangement, the plate coupled proximate or adjacent to the upper facing surface in the posterior area of the sole arrangement and the plate being coupled proximate or adjacent to the ground engaging surface in the anterior area of the sole arrangement.

Clause 25: A sole arrangement for an article of footwear comprising, the sole arrangement extending from an end of a posterior area of the sole arrangement to an end of an anterior area of the sole arrangement, wherein the posterior area of the sole arrangement being disposed under a heel area of a foot and the anterior area of the sole arrangement being disposed under a forefoot area of the foot, the sole arrangement including an upper facing surface and a ground engaging surface, wherein the upper facing surface being on an opposite side of the sole arrangement than the ground engaging surface, the sole arrangement including a maximum posterior depth value, wherein the maximum posterior depth value measuring a thickest position within the posterior area of the sole arrangement, the thickest position being measured at a lowest position of the upper facing surface along a lateral axis and at any position of the upper facing surface or the ground engaging surface along a longitudinal axis directly under the heel area of the foot, the sole arrangement including a maximum anterior depth value, wherein the maximum anterior depth value measuring a thickest position within the anterior area of the sole arrangement, the thickest position being measured at a lowest position of the upper facing surface along a lateral axis and at any position of the upper facing surface or the ground engaging surface along a longitudinal axis directly under the forefoot area of the foot, the maximum anterior depth value being larger than the maximum posterior depth value by a difference depth value, the difference depth value being a predetermined depth value, the posterior area of the sole arrangement extending from the end of the posterior area of the sole arrangement to a intermediate area of the sole arrangement, wherein the intermediate area of the sole arrangement connecting the posterior area of the sole arrangement with the anterior area of the sole arrangement, the anterior area of the sole arrangement extending from the end of the anterior area of the sole arrangement to the intermediate area of the sole arrangement, the ground engaging surface transitioning from the posterior area of the sole arrangement to the intermediate area of the sole arrangement in a substantially concave shaped form from a view of the upper facing surface, the ground engaging surface being shaped in the intermediate area of the sole arrangement in a substantially convex shaped form from the view of the upper facing surface, and the ground engaging surface transitioning from the intermediate area of the sole arrangement to the anterior area of the sole arrangement in a substantially concave shaped form from the view of the upper facing surface.

Clause 26: The sole arrangement of Clause 25, further comprising, the lateral axis extending from a medial side of the sole arrangement in a direction toward a lateral side of the sole arrangement, and the longitudinal axis extending from the end of the posterior area of the sole arrangement in a direction toward the end of the anterior area of the sole arrangement.

Clause 27: The sole arrangement of Clause 25, wherein the lowest positions further comprising, the upper facing surface transitioning from the posterior area of the sole arrangement to the intermediate area of the sole arrangement in a substantially flat or concave shaped form from a view of the ground engaging surface, the upper facing surface transitioning from the intermediate area of the sole arrangement to the anterior area of the sole arrangement in a substantially flat or convex shaped form from the view of the ground engaging surface, and the upper facing surface in the intermediate area of the sole arrangement being shaped in a substantially flat or concave shaped form from the view of the ground engaging surface.

Clause 28: The sole arrangement of Clause 25, further comprising, a depth value of the anterior area of the sole arrangement gradually decreasing along a longitudinal axis from a position of the maximum anterior depth value in a direction toward the end of the anterior area of the sole arrangement.

Clause 29: The sole arrangement of Clause 25, further comprising, a depth value of the posterior area of the sole arrangement gradually decreasing along a longitudinal axis from a position of the maximum posterior depth value in a direction toward the end of the posterior area of the sole arrangement.

Clause 30: The sole arrangement of Clause 25, further comprising, a lateral segment of the anterior area of the sole arrangement including a maximum lateral depth position with a depth value being substantially equal to the maximum anterior depth value, a medial segment of the anterior area of the sole arrangement including a maximum medial depth position with a depth value being substantially equal to the maximum anterior depth value, and the maximum lateral depth position being farther away from the end of the anterior area of the sole arrangement than the maximum medial depth position by a difference distance value, wherein the difference distance value being a predetermined distance value between the maximum lateral depth position and the maximum medial depth position along a longitudinal axis.

Clause 31: The sole arrangement of Clause 25, further comprising, a lateral segment of the anterior area of the sole arrangement comprising a maximum lateral depth position including a maximum lateral, wherein the maximum lateral depth value being substantially equal to the maximum anterior depth value, a medial segment of the anterior area of the sole arrangement comprising a maximum medial depth position including a maximum medial depth value, wherein the maximum medial depth value being substantially equal to the maximum anterior depth value, and the maximum lateral depth position being spaced apart from the maximum medial depth position along a longitudinal axis by a difference distance value, wherein the maximum lateral depth position being closer to the end of the posterior area of the sole arrangement than the maximum medial depth position along a longitudinal axis by the difference distance value.

Clause 32: The sole arrangement of Clause 25, further comprising, the sole arrangement including a maximum intermediate depth value, wherein the maximum intermediate depth value measuring a thickest position within the intermediate area of the sole arrangement along a lateral and longitudinal direction and directly under an intermediate area of the foot, and the maximum intermediate depth value being measured at a position being spaced apart along a longitudinal axis from the anterior area of the sole arrangement, the posterior area of the sole arrangement, or both, by a predetermined distance value.

Clause 33: The sole arrangement of Clause 25, further comprising, the maximum anterior depth value being larger than the maximum intermediate depth value by a second difference depth value, and the maximum posterior depth value being larger than the intermediate depth value by a third difference depth value.

Clause 34: The sole arrangement of Clause 25, further comprising, a striking area, wherein the striking area being an area where the intermediate area of the sole arrangement transitioning to and into the anterior area of the sole arrangement, the striking area including an area increasing in depth value from a direction of the posterior area of the sole arrangement to a position of the maximum anterior depth value at a predetermined transition rate, and the striking area including an area substantially maintaining a depth value, or decreasing in depth value at a second transition rate, from the position of the maximum anterior depth value in a direction toward the end of the anterior area of the sole arrangement.

Clause 35: The sole arrangement of Clause 34, further comprising, a lateral side of the striking area including the area substantially maintaining a depth value for a predetermined distance.

Clause 36: A sole arrangement for an article of footwear comprising, the sole arrangement extending from an end of a posterior area of the sole arrangement to an end of an anterior area of the sole arrangement, wherein the posterior area of the sole arrangement being disposed under a heel area of a foot and the anterior area of the sole arrangement being disposed under a forefoot area of the foot, the sole arrangement including an upper facing surface and a ground engaging surface, wherein the upper facing surface formed on an opposite side of the sole arrangement than the ground engaging surface, the sole arrangement including a maximum posterior depth value, wherein the maximum posterior depth value measuring a thickest position within the posterior area of the sole arrangement directly under the heel area of the foot, the sole arrangement including a maximum anterior depth value, wherein the maximum anterior depth value measuring a thickest position within the anterior area of the sole arrangement directly under the forefoot area of the foot, the maximum anterior depth value being substantially equal to the maximum posterior depth value, smaller than the maximum posterior depth value or larger than the maximum posterior depth value by a predetermined difference value, the posterior area of the sole arrangement extending from the end of the posterior area of the sole arrangement to an intermediate area of the sole arrangement, wherein the intermediate area of the sole arrangement being a transition area from the posterior area of the sole arrangement to the anterior area of the sole arrangement and being part of the posterior area of the sole arrangement, the anterior area of the sole arrangement, both or a separate area, the anterior area of the sole arrangement extending from the end of the anterior area of the sole arrangement to the intermediate area of the sole arrangement, the ground engaging surface in the posterior area of the sole arrangement including at least a first segment and a second segment, wherein the first segment being of a first length, substantially flat and formed at a lateral side of the sole arrangement, and wherein the second segment being of a second length, substantially flat and formed at a medial side of the sole arrangement, the ground engaging surface in the anterior of the sole arrangement including at least a third segment and a fourth segment, wherein the third segment being of a third length and formed at a lateral side of the sole arrangement, and wherein the fourth segment being of a fourth length and formed at a medial side of the sole arrangement, the first segment being rotated towards the third segment wherein during a contact with a ground surface a first length of the first segment and at least partially the third segment being in contact with the ground surface substantially at substantially a same time, the second segment being rotated towards the fourth segment wherein during the contact with the ground surface a second length of the second segment and at least partially the fourth segment being in contact with the ground surface at substantially the same time, the third segment and the fourth segment being in contact with, or engaging, the ground surface at substantially the same time, wherein the fourth segment being closer to the end of the anterior area of the sole arrangement than the third segment along a longitudinal axis by a third length and the fourth segment being farther away from the end of the posterior area of the sole arrangement than the third segment along the longitudinal axis by a fourth length, the first segment being rotated towards the third segment at a first angle, the second segment being rotated towards the fourth segment at a second angle, and the first angle and the second angle being measured relative to the upper facing surface.

Clause 37: The sole arrangement of Clause 36, further comprising, the first length and the second length being along the longitudinal axis.

Clause 38: The sole arrangement of Clause 36, further comprising, the third length and the fourth length being substantially a same length or different lengths.

Clause 39: The sole arrangement of Clause 36, further comprising, the first angle and the second angle being substantially a same angle or different angles.

Clause 40: The sole arrangement of Clause 36, further comprising, a predetermined length of the ground engaging surface in the intermediate area of the sole arrangement along the longitudinal axis not being in contact with a substantially flat ground surface at the same time when the first segment, the second segment, the third segment and the fourth segment being in contact with the substantially flat ground surface.

Clause 41: The sole arrangement of Clause 36, further comprising, a predetermined length of the ground engaging surface in the intermediate area of the sole arrangement along the longitudinal axis including a depth value that is smaller by at least a predetermined depth value than the maximum anterior depth value and the maximum posterior depth value.

Clause 42: The sole arrangement of Clause 36, further comprising, a predetermined length of the first segment and the second segment being substantially flat along the longitudinal axis, angled at substantially a same angle and including a substantially same maximum depth value along a lateral axis at each position along the longitudinal axis for the predetermined length.

Clause 43: A sole arrangement for an article of footwear comprising, the sole arrangement extending from an end of a posterior area of the sole arrangement to an end of an anterior area of the sole arrangement, wherein the posterior area of the sole arrangement being disposed in a heel area of a foot and the anterior area of the sole arrangement being disposed in a forefoot area of the foot, an intermediate area of the foot, or both, the sole arrangement including an upper facing surface and a ground engaging surface, wherein the upper facing surface being formed on an opposite side of the sole arrangement than the ground engaging surface, the sole arrangement including a posterior component, wherein the posterior component extending from the upper facing surface of the posterior area of the sole arrangement in a direction away from the upper facing surface, away from the ground engaging surface and extend above the upper facing surface along a vertical axis, the posterior component comprising a lateral component, a medial component, a middle component or a combination thereof, and the lateral component and the medial component extending beyond and above a back portion of an upper, the middle component, the end of the posterior area of the sole arrangement, or a combination thereof, the lateral component extending into or through an area in-between a lateral malleolus bone of the foot and an Achilles tendon of the foot and the medial component extending into or through an area in-between a medial malleolus bone of the foot and the Achilles tendon of the foot.

Clause 44: The sole arrangement of Clause 43, wherein the posterior component further comprising, a first component, wherein the first component including a first predetermined compression hardness value, a second component, wherein the second component including a second predetermined compression hardness value, the first component being of a lower compression hardness value than the second component, and creating the first component being softer than the second component, and the first component being disposed between the second component and an interior void of an upper.

Clause 45: The sole arrangement of Clause 43, wherein the sole arrangement further comprising, the posterior component attaching to an upper.

Clause 46: The sole arrangement of Clause 44, wherein the posterior component further comprising, the first component being constructed by thermosetting polymers or a first semi-rigid material, wherein the thermosetting polymers or the first semi-rigid material forming a closed-cell foam with a first hardness value, the second component being constructed by thermoplastic polymers or a second semi-rigid material, wherein the thermoplastic polymers or the second semi-rigid material including a second hardness value, and the second hardness value being larger than the first hardness value by a predetermined value.

Clause 47: The sole arrangement of Clause 44, wherein the posterior component further comprising, the first component extending from a direction of the upper facing surface in a direction away from the upper facing surface and away from the ground engaging surface, the first component being part of an intermediate component, a lateral component, a medial component, or a combination thereof, and the lateral component and the medial component extending beyond the intermediate component by a predetermined distance, wherein the lateral component extending into an area in-between a lateral malleolus bone of the foot and an Achilles tendon of the foot and the medial component extending into an area in-between a medial malleolus bone of the foot and the Achilles tendon of the foot.

Clause 48: The sole arrangement of Clause 44, wherein the posterior component further comprising, the second component extending from a direction of the upper facing surface in a direction away from the upper facing surface and away from the ground engaging surface, the second component being included in an intermediate component, a lateral component, a medial component, or a combination thereof, and the lateral component and the medial component extending beyond the intermediate component by a predetermined distance, wherein the lateral component extending into an area in-between a lateral malleolus bone of the foot and an Achilles tendon of the foot and the medial component extending into an area in-between a medial malleolus bone of the foot and the Achilles tendon of the foot.

Clause 49: The sole arrangement of Clause 43, wherein the posterior component further comprising, an intermediate component, wherein the intermediate component including an intermediate component height value, wherein the intermediate component height value being measured along a vertical axis from a lowest point of the upper facing surface in the posterior area of the sole arrangement to a top of the intermediate component, the lateral component including a lateral component height value, wherein the lateral component height value being measured along the vertical axis from the lowest point of the upper facing surface in the posterior area of the sole arrangement to a top of the lateral component, the medial component including a medial component height value, wherein the medial component height value being measured along the vertical axis from the lowest point of the upper facing surface in the posterior area of the sole arrangement to a top of the medial component, the lateral component and the medial component being disposed above the intermediate component by at least a first height difference value, wherein the first height difference value being a difference in height value between the intermediate component height value and the lateral component height value or the medial component height value, and the first height difference value being a value at least 10% of the medial component height value.

Clause 50: The sole arrangement of Clause 43, wherein the posterior component further comprising, a second height difference value, wherein the second height difference value being a difference in height value between the medial component height value and the lateral component height value, and the medial component height value being larger than the lateral component height value by the second height difference value.

Clause 51: The sole arrangement of Clause 43, wherein the posterior component further comprising, a top area of the medial component, wherein the top area of the medial component being an area disposed in-between the Achilles tendon and the medial malleolus bone of the foot, a top area of the lateral component, wherein the top area of the lateral component being an area disposed in-between the Achilles tendon and the lateral malleolus bone of the foot, and the top area of the medial component being formed farther away along a longitudinal axis from the end of the posterior area of the sole arrangement than the top area of the lateral component by a predetermined distance value.

Clause 52: The sole arrangement of Clause 51, wherein the posterior component further comprising, the top area of the lateral component and the top area of the medial component being separated by a gap along a lateral axis.

Clause 53: The sole arrangement of Clause 51, wherein the posterior component further comprising, the top area of the medial component at least partially including the first medial component and the second medial component, and the top area of the lateral component at least partially including the first lateral component and the second lateral component.

Clause 54: An article of exercise equipment for therapeutic massage comprising, an interior surface and an exterior surface, wherein the interior surface being formed on an opposite side of the article of exercise equipment than the exterior surface, the interior surface facing an interior void, wherein the interior void being at least partially hollow, a first component, wherein the first component being formed of a first material, a second component, wherein the second component being formed of a second material, the first material including a first hardness value and the second component including a second hardness value, the first hardness value being larger than the second hardness by a predetermined hardness difference value, the first component being of a substantially circular shape for a first length along a longitudinal axis on the exterior surface, the second component being of a substantially circular shape for a second length along the longitudinal axis on the exterior surface, the second component comprising a first portion and a second portion, and the first component being formed adjacent to the first portion and the second portion.

Clause 55: The article of exercise equipment of Clause 54, further comprising, the first component being formed between the first portion and the second portion.

Clause 56: The article of exercise equipment of Clause 54, further comprising, the first component including a first outer diameter, wherein the first outer diameter measuring a diameter in-between the exterior surface of the first component along the longitudinal axis, the second component including a second outer diameter, wherein the second outer diameter measuring a diameter in-between the exterior surface of the second component along the longitudinal axis, the first outer diameter being equal to the second outer diameter or being smaller than the second outer diameter by a predetermined outer diameter difference.

Clause 57: The article of exercise equipment of Clause 54, further comprising, the first component including a first sidewall thickness value, wherein the first sidewall thickness value measuring a thickness value of the first component along the longitudinal axis within a first segment, the first component including a second sidewall thickness value, wherein the second sidewall thickness value measuring a thickness value of the first component along the longitudinal axis within a second segment, the second component including a third sidewall thickness value, wherein the third sidewall thickness value measuring a thickness value of the second component along the longitudinal axis within a third segment, wherein the third segment being part of and a sub-segment of the second segment, the second component including a fourth sidewall thickness value, wherein the fourth sidewall thickness value measuring a thickness value of the second component along the longitudinal axis within an end segment, wherein the end segment being part of the second segment and proximate to an end of the second segment, the first sidewall thickness value being equal to the third sidewall thickness value or being larger than the third sidewall thickness value by a predetermined by a predetermined sidewall thickness value.

Clause 58: The article of exercise equipment of Clause 54, further comprising, the first component including one or more layers along a lateral axis within a first segment, wherein the first segment includes the exterior surface being formed by the first component.

Clause 59: The article of exercise equipment of Clause 54, further comprising, the first length being equal to the second length or being smaller than the second length by a predetermined difference length.

Clause 60: The article of exercise equipment of Clause 54, further comprising, a first raised segment, wherein the first raised segment being formed within the second segment and formed at a distance away from a center of the article of exercise equipment by a first center difference distance, a second raised segment, wherein the second raised segment being formed within the second segment and formed at a distance away from the center of the article of exercise equipment by a second center difference distance, and the first center difference distance and the second center difference distance being different.

Clause 61: The article of exercise equipment of Clause 54, further comprising, a removable end cap, wherein the removable end cap being formed at an end of the first component.

Clause 62: The article of exercise equipment of Clause 61, further comprising, the removable end cap including a cap void, wherein the cap void being of a predetermined void area size.

What is claimed is:

1. A sole arrangement for an article of footwear comprising:

the sole arrangement extending from an end of a posterior area of the sole arrangement to an end of an anterior area of the sole arrangement, wherein the posterior area of the sole arrangement being configured to be proximate to a heel area of a foot and the anterior area of the sole arrangement being configured to be proximate to a forefoot area of the foot, an intermediate area of the foot, or both;

the sole arrangement including an upper facing surface and a ground engaging surface, wherein the upper facing surface being formed on an opposite side of the sole arrangement than the ground engaging surface;

the sole arrangement including a posterior component, wherein the posterior component extending from the upper facing surface of the posterior area of the sole arrangement in a direction away from the upper facing surface, away from the ground engaging surface and extend above the upper facing surface along a vertical axis;

the posterior component comprising a lateral component, a medial component, a middle component or a combination thereof;

the lateral component or the medial component extending beyond and above a top of a back portion of an upper or the middle component by at least a predetermined length, wherein the upper being attached to the sole arrangement; and the lateral component being configured to extend from a top area of a calcaneus bone of the foot and into and through an area in-between a lateral malleolus bone of the foot and an Achilles tendon of the foot above the middle component along a longitudinal axis, or the medial component being configured to extend from the top area of the calcaneus bone of the foot into and through an area in-between a medial malleolus bone of the foot and the Achilles tendon of the foot above the middle component along the longitudinal axis.

2. The sole arrangement of claim 1, wherein the sole arrangement further comprising:

the posterior component attaching to an upper.

3. The sole arrangement of claim 1, wherein the posterior component further comprising:

a first component, wherein the first component including a first predetermined compression hardness value;

a second component, wherein the second component including a second predetermined compression hardness value;

the first component being of a lower compression hardness value than the second component, and creating the first component being softer than the second component; and the first component being disposed between the second component and an interior void of an upper.

4. The sole arrangement of claim 3, wherein the posterior component further comprising:

the first component being constructed by thermosetting polymers or a first semi-rigid material, wherein the thermosetting polymers or the first semi-rigid material forming a closed-cell foam with a first hardness value;

the second component being constructed by thermoplastic polymers or a second semi-rigid material, wherein the thermoplastic polymers or the second semi-rigid material including a second hardness value; and the second hardness value being larger than the first hardness value by a predetermined value.

5. The sole arrangement of claim 3, wherein the posterior component further comprising:

the first component extending from a direction of the upper facing surface in a direction away from the upper facing surface and away from the ground engaging surface;

the first component being part of an intermediate component, a lateral component, a medial component, or a combination thereof; and the lateral component and the medial component extending beyond the intermediate component by a predetermined distance, wherein the lateral component configured to extend into an area in-between a lateral malleolus bone of the foot and an Achilles tendon of the foot and the medial component configured to extend into an area in-between a medial malleolus bone of the foot and the Achilles tendon of the foot.

6. The sole arrangement of claim 3, wherein the posterior component further comprising:

the second component extending from a direction of the upper facing surface in a direction away from the upper facing surface and away from the ground engaging surface;

the second component being included in an intermediate component, a lateral component, a medial component, or a combination thereof; and the lateral component and the medial component extending beyond the intermediate component by a predetermined distance, wherein the lateral component configured to extend into an area in-between a lateral malleolus bone of the foot and an Achilles tendon of the foot and the medial component configured to extend into an area in-between a medial malleolus bone of the foot and the Achilles tendon of the foot.

7. The sole arrangement of claim 1, wherein the posterior component further comprising:

an intermediate component, wherein the intermediate component including an intermediate component height value, wherein the intermediate component height value being measured along a vertical axis from a lowest point of the upper facing surface in the posterior area of the sole arrangement to a top of the intermediate component;

the lateral component including a lateral component height value, wherein the lateral component height value being measured along the vertical axis from the lowest point of the upper facing surface in the posterior area of the sole arrangement to a top of the lateral component;

the medial component including a medial component height value, wherein the medial component height value being measured along the vertical axis from the lowest point of the upper facing surface in the posterior area of the sole arrangement to a top of the medial component;

the lateral component and the medial component being disposed above the intermediate component by at least a first height difference value, wherein the first height difference value being a difference in height value between the intermediate component height value and the lateral component height value or the medial component height value; and the first height difference value being a value at least 10% of the medial component height value.

8. The sole arrangement of claim 1, wherein the posterior component further comprising:

a second height difference value, wherein the second height difference value being a difference in height value between the medial component height value and the lateral component height value; and the medial component height value being larger than the lateral component height value by the second height difference value.

9. The sole arrangement of claim 1, wherein the posterior component further comprising:

a top area of the medial component, wherein the top area of the medial component being an area configured to be proximately in-between the Achilles tendon and the medial malleolus bone of the foot;

a top area of the lateral component, wherein the top area of the lateral component being an area configured to be proximately in-between the Achilles tendon and the lateral malleolus bone of the foot; and the top area of the medial component being formed farther away along a longitudinal axis from the end of the posterior area of the sole arrangement than the top area of the lateral component by a predetermined distance value.

10. The sole arrangement of claim 1, wherein the posterior component further comprising:

the top area of the lateral component and the top area of the medial component being separated by a gap along a lateral axis.

11. The sole arrangement of claim 3, wherein the posterior component further comprising:

the top area of the medial component at least partially including the first medial component and the second medial component; and the top area of the lateral component at least partially including the first lateral component and the second lateral component.

12. A posterior component for an article of footwear comprising:

the posterior component being a part of or attaching to a sole arrangement, wherein the sole arrangement extending from an end of a posterior area of the sole arrangement to an end of an anterior area of the sole arrangement, wherein the posterior area of the sole arrangement being configured to be proximate to a heel area of a foot and the anterior area of the sole arrangement being configured to be proximate to a forefoot area of the foot, an intermediate area of the foot, or both;

the sole arrangement including an upper facing surface and a ground engaging surface, wherein the upper facing surface being formed on an opposite side of the sole arrangement than the ground engaging surface;

the posterior component extending from the upper facing surface of the posterior area of the sole arrangement in a direction away from the upper facing surface, away from the ground engaging surface and extend above the upper facing surface;

the posterior component comprising a lateral component, a medial component, a middle component or a combination thereof;

the lateral component or the medial component extending beyond and above a top of a back portion of an upper or the middle component by at least a predetermined length, wherein the upper being attached to the sole arrangement; and the lateral component being configured to extend from a top area of a calcaneus bone of the foot into and through an area in-between a lateral malleolus bone of the foot and an Achilles tendon of the foot above the middle component and along a longitudinal axis, or the medial component being configured to extend from the top area of the calcaneus bone of the foot into or through an area in-between a medial malleolus bone of the foot and the Achilles tendon of the foot above the middle component and along the longitudinal axis.

13. The sole arrangement of claim 12, wherein the sole arrangement further comprising:

the posterior component being formed on an interior surface of an upper, on an exterior surface of the upper, within one or more layers of the upper, or a combination thereof.

14. The sole arrangement of claim 12, wherein the posterior component further comprising:

a first component, wherein the first component including a first predetermined compression hardness value;

a second component, wherein the second component including a second predetermined compression hardness value;

the first component being of a lower compression hardness value than the second component, and creating the first component being softer than the second component; and the first component being disposed between the second component and an interior void of an upper.

15. The sole arrangement of claim 14, wherein the posterior component further comprising:

the first component being constructed by thermosetting polymers or a first semi-rigid material, wherein the thermosetting polymers or the first semi-rigid material forming a closed-cell foam with a first hardness value;

the second component being constructed by thermoplastic polymers or a second semi-rigid material, wherein the thermoplastic polymers or the second semi-rigid material including a second hardness value; and the second hardness value being larger than the first hardness value by a predetermined value.

16. The sole arrangement of claim 14, wherein the posterior component further comprising:

the first component extending from a direction of the upper facing surface in a direction away from the upper facing surface and away from the ground engaging surface;

the first component being part of an intermediate component, a lateral component, a medial component, or a combination thereof; and the lateral component and the medial component extending beyond the intermediate component by a predetermined distance, wherein the lateral component configured to extend into an area in-between a lateral malleolus bone of the foot and an Achilles tendon of the foot and the medial component configured to extend into an area in-between a medial malleolus bone of the foot and the Achilles tendon of the foot.

17. The sole arrangement of claim 14, wherein the posterior component further comprising:

the second component extending from a direction of the upper facing surface in a direction away from the upper facing surface and away from the ground engaging surface;

the second component being included in an intermediate component, a lateral component, a medial component, or a combination thereof; and the lateral component and the medial component extending beyond the intermediate component by a predetermined distance, wherein the lateral component configured to extend into an area in-between a lateral malleolus bone of the foot and an Achilles tendon of the foot and the medial component configured to extend into an area in-between a medial malleolus bone of the foot and the Achilles tendon of the foot.

18. The sole arrangement of claim 12, wherein the posterior component further comprising:

an intermediate component, wherein the intermediate component including an intermediate component height value, wherein the intermediate component height value being measured from a lowest point of the upper facing surface in the posterior area of the sole arrangement to a top of the intermediate component;

the lateral component including a lateral component height value, wherein the lateral component height value being measured from the lowest point of the upper facing surface in the posterior area of the sole arrangement to a top of the lateral component;

the medial component including a medial component height value, wherein the medial component height value being measured from the lowest point of the upper facing surface in the posterior area of the sole arrangement to a top of the medial component;

the lateral component and the medial component being disposed above the intermediate component by at least a first height difference value, wherein the first height difference value being a difference in height value between the intermediate component height value and the lateral component height value or the medial component height value; and the first height difference value being a value at least 10% of the medial component height value.

19. The sole arrangement of claim 12, wherein the posterior component further comprising:

a second height difference value, wherein the second height difference value being a difference in height value between the medial component height value and the lateral component height value; and the medial component height value being larger than the lateral component height value by the second height difference value.

20. The sole arrangement of claim 12, wherein the posterior component further comprising:

a top area of the medial component, wherein the top area of the medial component being an area configured to be proximately in-between the Achilles tendon and the medial malleolus bone of the foot;

a top area of the lateral component, wherein the top area of the lateral component being an area configured to be proximately in-between the Achilles tendon and the lateral malleolus bone of the foot; and the top area of the medial component being formed farther away from the end of the posterior area of the sole arrangement than the top area of the lateral component by a predetermined distance value.

* * * * *